(12) United States Patent
Sugiura et al.

(10) Patent No.: US 7,611,815 B2
(45) Date of Patent: Nov. 3, 2009

(54) EXTERNAL ADDITIVE FOR TONER FOR ELECTROPHOTOGRAPHY, TONER FOR ELECTROPHOTOGRAPHY, DOUBLE-COMPONENT DEVELOPER FOR ELECTROPHOTOGRAPHY, IMAGE-FORMING PROCESS USING THE TONER, AND IMAGE-FORMING APPARATUS USING THE TONER

(75) Inventors: Hideki Sugiura, Shizuoka (JP); Satoshi Mochizuki, Shizuoka (JP); Kazuhiko Umemura, Shizuoka (JP); Shinya Nakayama, Shizuoka (JP); Yasuo Asahina, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/618,640

(22) Filed: Jul. 15, 2003

(65) Prior Publication Data

US 2004/0067189 A1 Apr. 8, 2004

(30) Foreign Application Priority Data

Jul. 15, 2002 (JP) ............................. 2002-205196

(51) Int. Cl.
G03G 9/08 (2006.01)
C09C 1/28 (2006.01)
C01B 33/113 (2006.01)

(52) U.S. Cl. .............. 430/108.7; 430/108.3; 430/108.6; 430/123.51; 106/426; 106/446; 106/450; 106/454; 106/457; 106/466; 106/470; 106/479; 106/480; 106/482; 106/483; 106/490; 423/327.1; 423/331; 423/335

(58) Field of Classification Search .............. 430/108.6, 430/108.7, 109.1, 109.4, 108.3, 123.51; 106/446, 106/482, 490; 428/405; 423/335, 326
See application file for complete search history.

(56) References Cited

U.S. PATENT DOCUMENTS

| | | | | | |
|---|---|---|---|---|---|
| 2,297,691 | A | * | 10/1942 | Carlson | 430/55 |
| 4,983,369 | A | * | 1/1991 | Barder et al. | 423/338 |
| 5,395,604 | A | * | 3/1995 | Harris et al. | 423/335 |
| 5,430,526 | A | * | 7/1995 | Ohkubo et al. | 399/159 |
| 5,554,478 | A | * | 9/1996 | Kuramoto et al. | 430/109.2 |
| 5,705,303 | A | * | 1/1998 | Ichimura et al. | 430/108.6 |
| 6,013,405 | A | * | 1/2000 | Takano et al. | 430/108.23 |
| 6,080,519 | A | * | 6/2000 | Ishiyama et al. | 430/110.3 |
| 6,248,495 | B1 | * | 6/2001 | Inokuchi et al. | 430/108.7 |
| 6,403,271 | B1 | | 6/2002 | Suzuki et al. | 430/108.6 |
| 7,083,770 | B2 | * | 8/2006 | Shibasaki et al. | 423/335 |
| 2001/0051270 | A1 | * | 12/2001 | Yamashita et al. | 428/405 |
| 2002/0024161 | A1 | | 2/2002 | Konya et al. | 264/15 |
| 2002/0041963 | A1 | | 4/2002 | Konya et al. | 428/402 |
| 2003/0031946 | A1 | * | 2/2003 | Sugiura et al. | 430/108.3 |
| 2003/0044706 | A1 | * | 3/2003 | Konya et al. | 430/108.6 |

FOREIGN PATENT DOCUMENTS

| | | |
|---|---|---|
| EP | 1 246 022 | 10/2002 |
| EP | 1 316 589 | 6/2003 |
| EP | 1 319 992 | 6/2003 |
| JP | 52-86334 | 7/1977 |
| JP | 52-156632 | 12/1977 |
| JP | 57-130043 | 8/1982 |
| JP | 57-130044 | 8/1982 |
| JP | 60-263951 | 12/1985 |
| JP | 61-24025 | 2/1986 |
| JP | 61-219051 | 9/1986 |
| JP | 61-235852 | 10/1986 |
| JP | 1-267560 | 10/1989 |
| JP | 1-304467 | 12/1989 |
| JP | 3-294864 | 12/1991 |
| JP | 4-204665 | 7/1992 |
| JP | 4-335357 | 11/1992 |
| JP | 5-341617 | 12/1993 |
| JP | 7-3600 | 1/1995 |
| JP | 7-43930 | 2/1995 |
| JP | 7-271087 | 10/1995 |
| JP | 8-29598 | 2/1996 |
| JP | 8-202071 | 8/1996 |
| JP | 8-211755 | 8/1996 |
| JP | 2568244 | 12/1996 |
| JP | 9-258474 | 10/1997 |
| JP | 11-189646 | 7/1999 |

(Continued)

OTHER PUBLICATIONS

Grant, R., et. al., ed., Grant & Hackh's Chemical Dictionary, fifth edition, McGraw-Hill Book Company, NY (1987), p. 531.*

(Continued)

*Primary Examiner*—Janis J Dote
(74) *Attorney, Agent, or Firm*—Oblon, Spivak, McClelland, Maier & Neustadt, L.L.P.

(57) ABSTRACT

An external additive for a toner for electrophotography which contains oxide fine particles which contain silicon, in which the oxide fine particles have a primary particle diameter of 30 nm to 300 nm in number average, a standard deviation $\sigma$ of a particle size distribution of the primary particle diameter satisfies a relation of: $R/4 \leq \sigma \leq R$, in which the R expresses the primary particle diameter,
the oxide fine particles are substantially spherical having a circularity SF1 defined as equation (1) of 100 to 130 and a circularity SF2 defined as equation (2) of 100 to 125;

$$SF1=(L^2/A)\times(\pi/4)\times 100 \qquad \text{equation (1)}$$

$$SF2=(P^2/A)\times(1/4\pi)\times 100 \qquad \text{equation (2),}$$

in the equations, "L" expresses the absolute maximum length of the oxide fine particles; "A" expresses a projected area of the oxide fine particles; and "P" expresses a maximum perimeter of the oxide fine particles.

16 Claims, 6 Drawing Sheets

FOREIGN PATENT DOCUMENTS

| | | |
|---|---|---|
| JP | 11-212299 | 8/1999 |
| JP | 2000-3063 | 1/2000 |
| JP | 3002063 | 1/2000 |
| JP | 3040310 | 5/2000 |
| JP | 2000-267422 | 9/2000 |
| JP | 2000-352840 | 12/2000 |
| JP | 3148950 | 3/2001 |
| WO | WO 01/98211 A1 * | 12/2001 |

OTHER PUBLICATIONS

Lewis, R.J., Sr., ed., Hawley's Condensed Chemical Dictionary, 13th edition, Van Nostrand Reinhold, NY (1997), pp. 996-997.*
U.S. Appl. No. 10/729,960, filed Dec. 9, 2003, Tomita et al.
U.S. Appl. No. 10/740,665, filed Dec. 22, 2003, Nagashima et al.
U.S. Appl. No. 10/844,442, filed May 13, 2004, Yamashita et al.
U.S. Appl. No. 10/960,084, filed Oct. 8, 2004, Yamada, et al.
U.S. Appl. No. 10/959,663, filed Oct. 7, 2004, Sugiura, et al.
U.S. Appl. No. 11/181,844, filed Jul. 15, 2005, Sugiura.
U.S. Appl. No. 10/318,109, filed Dec. 13, 2002, Sugiura, et al.
U.S. Appl. No. 10/875,402, filed Jun. 25, 2004, Sugiura et al.
U.S. Appl. No. 11/227,566, filed Sep. 16, 2005, Nagatomo, et al.
U.S. Appl. No. 11/519,057, filed Sep. 12, 2006, Nakayama, et al.
U.S. Appl. No. 11/558,736, filed Nov. 10, 2006, Osamu Uchinokura, et al.
U.S. Appl. No. 12/050,502, filed Mar. 18, 2008, Yamada, et al.
U.S. Appl. No. 12/047,807, filed Mar. 13, 2008, Honda, et al.
The Society of Powder Technology, Japan (1994), Measurement technology of particle size: Nikkan Kogyo Shimbun Ltd., pp. 13-15 (with English Translation).

* cited by examiner

EXTERNAL ADDITIVE FOR TONER FOR ELECTROPHOTOGRAPHY, TONER FOR ELECTROPHOTOGRAPHY, DOUBLE-COMPONENT DEVELOPER FOR ELECTROPHOTOGRAPHY, IMAGE-FORMING PROCESS USING THE TONER, AND IMAGE-FORMING APPARATUS USING THE TONER

BACKGROUND OF THE INVENTION

1. Field of the Invention

The present invention relates to an external additive for use in a toner for electrophotography, a toner for electrophotography, a developer for electrophotography, an image-forming process, and an image-forming apparatus.

2. Description of the Related Art

A typical image-forming process according to electrophotography or electrostatic printing comprises a developing step, a transferring step, and an image-fixing step. The developing step includes uniformly charging a photoconductive insulative layer, irradiating radiation to the insulative layer, dissipating charges on exposed portions to thereby form a latent electrostatic image, and supplying toners formed of charged fine particles to the latent electrostatic image to thereby visualize the image. The transferring step includes transferring the visualized image onto an image transfer member such as a transfer paper. The image-fixing step includes fixing the image by heating and/or pressurizing generally using a heat roller. Developers for developing latent electrostatic images formed on a latent electrostatic image bearing member, used in the developing step, include double-component developers each comprising a carrier and a toner, and single-component developers (magnetic toners and non-magnetic toners) that do not require a carrier. Popular full-color image forming apparatus are of a system in which toner images of individual colors formed on a photoconductor are sequentially transferred and disposed to an intermediate transfer, and all of the transferred images are transferred again to a transfer paper by one operation.

A toner for use in such electrophotography and electrostatic printing mainly comprise a binder resin and a coloring agent and may further comprise a charge control agent, an offset-preventing agent, and other additives according to necessity. These components of the toner must have various capabilities and properties in the individual steps. For example, to allow toners to be disposed to a latent electrostatic image in the developing step, the toner particles and the binder resins must maintain an appropriate charge suitable for use in copying machines or printers regardless of temperature, humidity, and other surrounding conditions. In the image-fixing step using a heat roller, the toners must have satisfactory anti-offset performance so as not to adhere to a heat roller having temperature of about 100° C. to 230° C., and must have high image-fixing properties to paper. In addition, the toners must have satisfactory blocking resistance so as not to induce blocking during storage in a copying machine.

Various attempts have been made in the electrophotographic technologies to improve image quality further. Among them, downsized and spherical toners are believed to be very effective to improve image quality. However, such downsized toners may invite decreased image transfer properties and thereby yield images of poor quality. In contrast, spherical toners have improved image transfer properties (Japanese Patent Application Laid-Open (JP-A) No. 09-258474). Under these circumstances, demands have been made on image formation procedures at a higher speed in color copying machines and color printers. To form images at a higher speed, a "tandem system" is effective (refer to, for example, JP-A No. 05-341617). In the tandem system, images formed by an image-forming unit are sequentially transferred and superimposed onto a single transfer paper transported by a transfer belt (transfer) to thereby form a full-color composite image on the transfer paper. Such a color image forming apparatus according to the tandem system can use a wide variety of transfer papers and can yield full-color images with high quality at a high speed. In particular, the apparatus can yield full-color images at a higher speed than conventional color image forming apparatus according to the other systems. Another attempt has been made to form images at a high speed while yielding high image quality using a spherical toner. If an apparatus according to this system is operated at a higher speed, the toner must pass through the development unit in a shorter time. A toner for use herein must therefore be transferred at a higher pressure so as to yield similar image transfer capabilities to conventional equivalents. However, transfer at such a higher pressure invites aggregation of the toner particles. As a result, the toner cannot be transferred satisfactorily and may invite hollow defects in the formed images. To solve these problems and to achieve higher image quality, the circularity, particle diameter, specific gravity, BET specific surface area of the toner are specified, and the deposition stress of the toners when compressed at 1 kg/cm$^2$ is specified to 6 g/cm$^2$ or less (e.g., JP-A No. 2000-3063, or the like).

However, when the deposition stress of the toners under compression at 1 kg/cm$^2$ is used as a specific parameter, the compression pressure is too low to thereby invite insufficient image transfer properties and hollow defects of characters when the transfer pressure increases by the use of, for example, overhead projector (OHP) films or sheets, cardboard or surface coated paper, or the like. In addition, such a low deposition stress of the toners may invite transfer dust, or the like. To exhaust the toners more sufficiently, an attempt has been made to specify the deposition force per particle of the toners at 3.0 dyne/contact-point or less (JP-A No. 2000-352840). However, this technique does not specify the deposition force of the toner under compression and thereby does not effectively improve image transfer properties and image quality to avoid, for example, hollow defects of characters, although the toner is exhausted more sufficiently.

To develop images more satisfactorily with higher stability with time, the aggregation degree of toners under compression is specified (Japanese Patent (JP-B) No. 3002063). However, specifying the aggregation degree of the toners under compression may still invite hollow defects of character images, may invite insufficient image quality and does not sufficiently improve the image transfer properties and transfer ratio. Another attempt to solve the problems on hollow defects of character images has been made by specifying the product of the aggregation degree and the loose apparent density of a toner at 7 or less (JP-A No. 2000-267422). However, this technique does not take physical behaviors of the toners under compression into consideration and does not yield sufficient effect in an intermediate image transfer system or a development system with strong stirring in which the toners undergo higher stress. Yet another attempt has been made to specify the ratio of the loosen apparent density to the hardened apparent density of a toner at 0.5 to 1.0 and to specify the aggregation degree at 25% or less (JP-A No. 2000-352840). The hardened apparent density used in this technique is the bulk density of the toners after tapping 50 times. The hardened apparent density is substantially a physical property reflecting the fluidity of the toners and does not reflect factors to increase the bulk density of the toner when mechanical stress is applied thereto. Accordingly, the technique does not yield sufficient effect in an intermediate image transfer system or a development system with strong stirring in which the toners undergo higher stress.

To improve fluidity and electrostatic properties of toners, "external additives" such as metal oxide particles and other inorganic powder (particles) are added to the toners. To modify hydrophobicity, electrostatic properties, and other properties of the surface of the inorganic powders, the surface of the inorganic particles is treated with a specific silane coupling agent, a titanate coupling agent, silicone oil, an organic acid, or the like, or is coated with a specific resin. Examples of the inorganic powder (particles) are powders of silicon dioxide (silica), titanium dioxide (titania), aluminum oxide, zinc oxide, magnesium oxide, cerium oxide, iron oxide, copper oxide, tin oxide, and the like.

Among them, hydrophobic silica fine particles or titanium oxide fine particles are often used. Such hydrophobic silica fine particles or titanium oxide fine particles are prepared by allowing fine particles of silica or titanium oxide to react with an organosilicon compound such as dimethyldichlorosilane, hexamethyldisilazane, silicone oil, or the like, to substitute silanol groups on the surface of fine particles with organic groups.

Among such hydrophobing agents, silicone oil has sufficient hydrophobicity and enables a toner which contains the silicone oil to exhibit satisfactory image transfer properties due to its low surface energy. For example, Japanese Patent Application Publication (JP-B) No. 07-3600 and Japanese Patent (JP-B) No. 2568244 disclose the degree of hydrophobicity of silica treated with silicone oil. JP-A No. 07-271087 and JP-A No. 08-29598 disclose the amount of the silicone oil or the carbon content in the additive. The specified silicone oil content and degree of hydrophobicity disclosed in these publications are sufficient to make the treated inorganic fine particles hydrophobic and to ensure stable electrostatic properties of the developer at high humidity. However, no positive attempt has been made to utilize such specific low surface energy of the silicone oil to thereby reduce deposition of a developer to members to be in contact with the developer. Such members include a contact charging device, a developer-bearing member (development sleeve), a doctor blade, a carrier, a latent electrostatic image-bearing member (photoconductor), an Intermediate transfer, and the like. In particular, strong deposition of the developer to the photoconductor invites toner deposition on the background of images, and dropout or hollow defects after transfer (portions where the developer is not transferred) in edges or centers of characters, lines, and dots in images. In addition, when an image transfer member has considerable depressions and protrusions, images cannot satisfactorily be transferred to the depressions, thus inviting hollow defects. Simple control of the amount of the silicone oil or the degree of hydrophobicity cannot solve these problems. JP-A No. 11-212299 discloses inorganic fine particles containing a specific amount of silicone oil as a liquid component. However, the use of the silicone oil in the specified amount does not satisfy the above requirements.

The toner for electrophotography must be charged uniformly and stably. If not, the toners invite toner deposition on the background of images or non-uniform image density to thereby deteriorate image quality. A development unit has been downsized with a decreasing size of an image-forming apparatus. Sharp toner charge raise thereby increases in its importance to obtain high image quality in such a downsized development unit. To satisfy these requirements, various proposals have been made. For example, to improve electrostatic properties of toners for electrophotography by additives, JP-A No. 03-294864 discloses a non-magnetic single-component developer comprising inorganic powder treated with silicone oil; JP-A No. 04-204665 discloses a magnetic single-component developer in which an additive covers 3% to 30% of a toner; and JP-A No. 04-335357 discloses an electrostatic developer comprising a toner and an external additive, in which toner has fine particles with a BET specific surface area of 5 $m^2/g$ to 100 $m^2/g$ fixed on its surface, and the external additive comprises particles having a specific surface area of 1.2 times or more that of the fine particles fixed on the toner. JP-A No. 07-43930 discloses a developer using a non-magnetic single-component toner including hydrophobic silica fine particles and specific hydrophobic titanium oxide; and JP-A No. 08-202071 discloses a developer which contains a toner additive comprising organic-inorganic composite particles having an organic polymer skeleton and a polysiloxane skeleton.

However, even these techniques cannot yield sufficiently uniform charges and satisfactorily sharp toner charging rise and are not sufficient in stability in surroundings of toner charge, particularly in stability of toner charge at high humidity. Most of these techniques employ an additive having improved hydrophobicity as a result of a surface treatment of regular oxide particles. The use of such an additive, however, invites deterioration of the toner due to a varying composition of the additive with time during operation, although the toner exhibits a desired stable charging at early stages. The composite particles prepared by a liquid phase process as disclosed in JP-A No. 08-202071 may not have sufficient hydrophobicity and may exhibit varying hydrophobicity with time due to a mediating substance (medium) remained inside the particles.

To avoid color misregistration, to stabilize image densities and image transfer properties for a long time and to avoid toner contamination, large-diameter inorganic fine particles having an average particle diameter of 50 nm to 120 nm are added to a toner (Japanese Patent No. 3148950). However, this technique does not have the effects of improving sharp charging rise after printing a number of sheets and of avoiding toner deposition on the background of images at high temperatures and high humidity or at low temperatures and low humidity.

A toner additive for electrophotography has been developed. This toner additive comprises oxide fine particles obtained by oxidizing solid solution fine particles containing two or more elements, has a minimum difference in first ionization potential between elements contained in the solid solution fine particles of from 1.20 eV to 4.20 eV and a maximum first ionization potential among the elements contained in the solid solution fine particles of 9.00 eV or less. However, this technique does not sufficiently consider the particle diameter and shape of the inorganic fine particles and does not yield satisfactory fluidity, image transfer properties, and the toner according to this technique is not sufficiently stirred upon development, merely by specifying the ionization potential alone.

Binder resins for use in toners must have transparency, insulating properties, water resistance, fluidity (fluidability) as a powder, mechanical strength, glossiness, thermoplasticity, grindability, and or the like. To satisfy these requirements, polystyrenes, styrene-acrylic copolymers, polyester resins, and epoxy resins are generally used as the binder resins. Among them, styrenic resins are widely used for their satisfactory grindability, water resistance, and fluidity. However, when a copy obtained by using a toner which contains a styrenic resin is stored in a paper holder made of a vinyl chloride resin sheet, an image-bearing surface of the copy is left in intimate contact with the sheet. A plasticizer contained in the vinyl chloride resin sheet then migrates into and plasticizes the fixed toner image to thereby allow the toner image to adhere to the sheet. When the copy is taken out from the sheet, a part or whole of the toner image is peeled off from the copy and causes toner deposition on the sheet. This problem also occurs in a toner which contains a polyester resin.

To avoid adhesion of the toner to such a vinyl chloride resin sheet, JP-A No. 60-263951 and JP-A No. 61-24025 disclose blending of an epoxy resin with a styrenic resin or polyester resin, since such an epoxy resin is not plasticized by a plasticizer for vinyl chloride resins.

However, when the blended resin is used in a color toner, the resulting toner cannot satisfy all the requirements in anti-offset performance, resistance to curling of fixed images, glossiness, colorability, transparency, and color reproducibility. For example, if a color toner image has insufficient glossiness, it is seen unsubstantial. Conventional epoxy resins and acetylated modified epoxy resins disclosed in JP-A No. 61-235852 do not satisfy all these requirements.

A possible solution to these problems is a single use of an epoxy resin. However, such epoxy resins have high reactivity with amines. The epoxy resins are generally used as curable resins having satisfactory mechanical strength and chemical resistance. These properties are derived from their crosslinked structure formed as a result of a reaction between epoxy groups and a curing agent. Such curing agents are roughly classified into amine curing agents and organic acid anhydride curing agents. Naturally, an epoxy resin for use in a toner for electrostatic development is used as a thermoplastic resin. However, some of dyes, pigments, and charge control agents to be kneaded with the resin to yield a toner are amine-containing agents and invite a crosslinking reaction during kneading. The resulting crosslinked article cannot be used as a toner. In addition, the chemical activity of the epoxy groups may potentially induce biochemical toxicity such as skin irritation that must be avoided.

In addition, such epoxy groups are hydrophilic and the resulting toner markedly absorbs water at high temperatures and high humidity, thus causing a decreased charge, toner deposition on the background of images, and insufficient cleaning. The epoxy resins also have insufficient electrostatic stability.

Regular toners each comprise a binder resin, a coloring agent, a charge control agent, and the like. Such coloring agents include various dyes and pigments, and some of them have charge control properties and thereby play a role both as a coloring agent and a charge control agent. Such toners having the above composition are often prepared using an epoxy resin as the binder resin. In these toners, the dye or pigment, the charge control agent, and other additives must be sufficiently dispersed. More specifically, the dye or pigment and the charge control agent are generally kneaded with the binder resin in a heat roll mill and must be uniformly dispersed in the binder resin. However, it is difficult to disperse these components uniformly. If the dye or pigment as the coloring agent is not sufficiently dispersed, the toner may exhibit insufficient color development and decreased colorability (degree of coloring). If the charge control agent is not sufficiently dispersed, charges distribute non-uniformly, thus inviting various defects or failures such as charging failure, toner deposition on the background of images, scattering of toners, insufficient image density, lack of ID, fuzzing, and insufficient cleaning. JP-A No. 61-219051 discloses a toner using an ester-modified epoxy resin, which is modified with $\epsilon$-caprolactone, as the binder resin. The epoxy resin used herein is modified in a high magnitude of 15% by weight to 90% by weight, and the resulting toner has an excessively low softening point and excessively high glossiness, although it has improved resistance to vinyl chloride resins and fluidity.

JP-A No. 52-86334 discloses an epoxy resin having positive charges prepared by allowing terminal epoxy groups of a prepared epoxy resin to react with an aliphatic primary or secondary amine. However, the epoxy group may crosslink with such an amine as described above, and the resulting resin may not be used as a toner. JP-A No. 52-156632 discloses that one or both of terminal epoxy groups of an epoxy resin are allowed to react with alcohol, phenol, a Grignard reagent, an organic acid sodium acetylide, or an alkyl chloride. However, a residual epoxy group, if any, may invite problems such as reactivity with amines, toxicity, and hydrophilicity. In addition, some of the aforementioned reaction products are hydrophilic, affect electrostatic properties, or affect grindability in the preparation of toners, and are not always effective to satisfy all of the requirements.

JP-A No. 01-267560 discloses a modified epoxy resin prepared by allowing both of terminal epoxy groups of an epoxy resin to react with a monovalent compound having an active hydrogen and esterifying the reaction product with a monocarboxylic acid, an ester derivative or a lactone derivative thereof. The resulting epoxy resin does not exhibit sufficiently improved resistance to curling in image-fixing although problems in the reactivity, toxicity and hydrophilicity of the epoxy resin are solved.

Xylene and other solvents are often used in preparation of epoxy resins or polyol resins as disclosed in JP-A No. 11-189646, for example. However, these solvents and unreacted residual monomers such as bisphenol A remain in a significantly large amount in the produced resins and consequently in toners using the resins.

Toners for electrophotography are generally produced by a process comprising the steps of mixing all materials in one step, heating, melting, and dispersing the resulting mixture to yield a homogenous composition, cooling, pulverizing, and classifying the composition to thereby yield a toner having a volume-average particle diameter of 6 μm to 10 μm. A typical disclosure of the method can be found in JP-A No. 01-304467. In particular, color toners for electrophotography for use in the formation of color images generally comprise a chromatic dye or pigment dispersed in a binder resin and require more strict performances than those for use in the formation of black images. Specifically, the color toners must have satisfactory and appropriate color development (colorability), and optical transparency when used in over head projector (OHP) transparencies, in addition to mechanical and electrical stability to external factors such as impact and humidity. Certain toners using a dye as a coloring agent are disclosed, for example, in JP-A No. 57-130043, JP-A No. 57-130044, or the like.

However, these toners using a dye as a coloring agent have insufficient lightfastness and undergo discoloring or fading when they are left under direct radiation, although they can yield sharp color images with high transparency and good color development.

Image-forming apparatus according to an intermediate image transfer system are typically known, in which visible toner images of different colors sequentially disposed on an image bearing member, are then sequentially primarily transferred onto an Intermediate transfer moved on an endless member and are temporarily held thereon, and the transferred images (toner images) are then secondly transferred onto a transfer sheet by one operation. These image forming apparatus according to the intermediate image transfer system are advantageous in that they can be downsized and a wide variety of transfer materials (transfer paper) can be used for transferring visible images and are therefore frequently used as color image forming apparatus. Such image-forming apparatus may invite worm-eaten defects in images (hollow defects of characters) on an image transferring medium such as transfer paper serving as a final image forming medium. In these hollow defects, no toner is transferred to certain locations due to local omission of transferred toner images constituting the color developed images in primary transfer and secondary transfer. In solid images, the worm-eaten images form transfer omission with certain areas. In line images, they invite transfer omission to thereby form broken line images.

Such irregular images often occur in the formation of full four-color images. This is because a toner layer herein has a larger thickness and strong non-Coulomb mechanical adhesive force (van der Waals force and other force except electrostatic force) produces due to contact pressure between the surface of an image bearing member and the toners, or between the surface of the intermediate transfer and the toners, since the primary transfer procedure is repeated at maximum four times. In addition, filming phenomenon occurs in the repeated image forming process. In the filming phenomena, a film of the toner is deposited on the surface of the Intermediate transfer and thereby adhesive force between the Intermediate transfer and the toner increases.

To avoid such images with hollow defects, commercially available machines have already employed techniques of applying a lubricant to the surface of an image bearing member and Intermediate transfer to thereby reduce the adhesive force between the toner and these members, or of adding an external additive to a toner to thereby reduce the adhesive force of the toner itself. However, these techniques do not consider the adhesive force among toner particles, tensile strength at break, and other parameters upon increased transfer contact pressure during full four-color image formation or transfer at a high speed. In particular, they cannot yield stable image quality when the toner is transferred to cardboard, surface-coated paper or OHP transparencies.

JP-A No. 08-211755 discloses a technique for improving image transfer properties and for preventing abnormal images with hollow defects by controlling relative balance between the adhesive force of an image bearing member to a toner and that of an Intermediate transfer to the toner. However, the adhesive force of the toner used herein is determined by a centrifugal method using a powdery toner, and the resulting toner has different physical properties from the one under increased transfer contact pressure.

Toners after their production are exposed to severe conditions such as high temperatures and high humidity or low temperature and low humidity during storage and transportation. The toners must therefore have high storage stability with no or little deterioration in electrostatic properties, fluidity, image transfer properties, and image-fixing properties without aggregation of toners even after storage under those conditions. However, no effective solution to these requirements has been found.

SUMMARY OF THE INVENTION

Accordingly, an object of the present invention is to provide an external additive, a toner for electrophotography, a developer for electrophotography, and an image-forming process, in which the external additive is not embedded in the toner and can sufficiently exhibit functions as a fluidizing agent and a charge auxiliary agent even in charging with stirring after storage at high temperatures and high humidity, and the toner can prevent charges from extraordinarily increasing and can thereby yield images with stable quality even after storage at low temperatures and low humidity.

Another object of the present invention is to provide an external additive, a toner, and a developer for electrophotography, and an image-forming process which can appropriately control the aggregation and adhesive force among toners after undergoing stress in transfer and compression of the toner or in a developing device (an image-developer), have excellent image transfer properties, development properties, and image-fixing properties and can form high-quality images without being influenced by materials for transferring media (transfer paper).

Still another object of the present invention is to provide an image-forming process and an image forming apparatus, in which the toner exhibits satisfactory electrostatic stability, includes less weakly charged particles and inversely charged particles and does not invite toner deposition on the background of images and scattering of toners into the apparatus even at high temperatures and high humidity or at low temperatures and low humidity.

Yet another object of the present invention is to provide an image-forming process having high durability and good maintainability as an image forming system.

Another object of the present invention is to provide an image-forming process, in which the toner has satisfactory image transfer properties under compression as well as sufficient fluidity when it is not compressed, can be supplied satisfactorily and can be sharply charged.

Still another object of the present invention is to provide an image-forming process and an image forming apparatus that can stably charge the toner and developer even under severe conditions, can form good-quality images as a result of printing in a range from low speed to high speed, can form images without decreased image density even when images are continuously formed and output and show well-balanced image-fixing properties and anti-offset performance.

Yet another object of the present invention is to provide an image-forming process that can form images with satisfactory transfer of the toner having excellent color reproducibility, color sharpness (chromaticness), and color transparency and stable glossiness without non-uniformess.

Another object of the present invention is to provide an image-forming process that can form images stable even under severe conditions, according which toners can be stored satisfactorily even under severe conditions.

Still another object of the present invention is to provide an image-forming process which does not invite migration of toner images to a vinyl chloride resin sheet, even when a fixed image bearing surface is brought into intimate contact with the sheet.

Yet another object of the present invention is to provide an image-forming process that can form fixed images substantially without curling.

A further object of the present invention is to provide an image-forming process that can prevent irregular images such as images with hollow defects, dust deposition on images, and poorly reproduced thin line images, with the use of an image-forming apparatus according to the intermediate image transfer system in which toner images formed on a latent electrostatic image bearing member are primarily transferred onto an intermediate transfer, and the toner images are secondly transferred onto a transferring medium and/or an image forming apparatus according to the tandem system that can output images at a high speed.

After intensive investigations, the inventors of the present invention have found that these objects can be achieved by using an external additive for a toner for electrophotography, including oxide fine particles containing at least a silicon element, the oxide fine particles having a primary particle diameter (R) of from 30 nm to 300 nm and having a standard deviation σ of particle size distribution of within a range from R/4 to R, namely, σ satisfies the relation of: $R/4 < \sigma \leq R$, having a circularity SF1 of from 100 to 130 and a circularity SF2 of from 100 to 125 and being substantially spherical. Specifically, the resulting toner exhibits sufficient fluidity without embedding of the external additive therein, and the external additive can sufficiently exhibit functions as a fluidizing agent and a charge auxiliary agent, even after storage of the toner at high temperatures and high humidity, and the resulting toner can suppress irregularly or abnormally increased charges and can thereby form images with stable quality even after storage of the toner at low temperatures and low humidity. In addition, the aggregation of the toner particles upon transfer and compression of the toner, and the adhesive force among the toner particles after undergoing stress in a developing device can be appropriately controlled, the toner has excellent image transfer properties and development properties and can form high-quality images.

While a detail mechanism has been clarified, some analysis data show the followings. By specifying the primary particle diameter of the oxide fine particles within a range of 30 nm to 300 nm, the oxide fine particles can sufficiently serve as a spacer so as to prevent aggregation among toner particles and can prevent embedding of the external additive in the toner when the toner is stored at high temperatures or is deteriorated as a result of vigorous stirring. By specifying the standard deviation σ of the particle size distribution (R) within a range from R/4 to R, the oxide fine particles comprise those having large particle diameters, those having medium particle diameters, and those having small particle diameters in appropriate proportions. Thus, particles having small particle diameters ensure the fluidity of the toner, and those having medium and large particle diameters effectively serve as a spacer. The inventors of the present invention have found that this technique is more effective than simple mixing of particles having large particle diameters, those having medium particle diameters and those having small particle diameters. In addition, by specifying the oxide fine particles to have a circularity SF1 of 130 or less and a circularity SF2 of 125 or less and to be substantially spherical, the oxide fine particles can serve to improve the fluidity of the toner, has increased affinity for the toner, becomes resistant to removal from the toner and can thereby exhibit inherent functions as an external additive.

The spherical silica fine particles having the above-specified circularities can be prepared by heating and evaporating an alkoxysilane and/or its partially hydrolyzed condensate and allowing the gas to flow with an inert gas such as nitrogen gas or by spraying the alkoxysilane and/or its partially hydrolyzed condensate into flames such as oxyhydrogen flames and burning and decomposing the sprayed material. In these procedures, control of individual raw materials, gases, and temperatures is important, and the oxide fine particles having the above-specified configurations and particle size distribution can be obtained by strictly controlling these conditions and parameters.

Such spherical silica has been conventionally produced by a sol-gel method. In the sol-gel method, an alkoxysilane is hydrolyzed in an alcohol solvent in the presence of an acidic catalyst to thereby yield a silica sol, the silica sol is converted into a gel, is dried, is calcined and sintered to thereby yield silica particles (refer to, for example, Japanese Patent No. 3040310). However, the resulting silica particles prepared by the sol-gel method have a particle size distribution out of the above-specified range and have a more sharp distribution, in which the standard deviation a of the particle diameter R is about R/10. In contrast, spherical silica particles having the above-specified particle size distribution cannot be obtained according to a conventional combustion method. In addition, conventional small-diameter silica particles are generally amorphous, and spherical silica particles having a small diameter of, for example, 10 nm cannot be significantly selectively produced. Accordingly, a technique of producing spherical small-diameter silica particles alone and mixing the same with silica particles having larger particle diameters is substantially difficult and is not practical.

In the external additive for electrophotographic toner, the oxide fine particles may include at least a silicone element and a metal element. Thus, the external additive can sufficiently exhibit functions as a charge auxiliary agent, an agent for imparting appropriate electric resistance, and a fluidizing agent for the toner. In addition, the metal element (dopant compound) can serve to control the charge level and resistance level of the toner. Oxide fine particles having different dielectric properties and resistance properties can be easily prepared by controlling the composition of material fine particles of solid solution and the degree of oxidization of the fine particles. By using such oxide fine particles, the electrostatic properties of the toner for electrophotography can be easily controlled within desired ranges.

To avoid electrostatic image lag formed during development, it is preferred to ensure a developer bearing member to have a relatively low electric resistance to thereby immediately leak residual charges in the developer bearing member. However, such a developer bearing member having a relatively low electric resistance may invite leakage of charges to be held by the toner. In a toner for electrophotography according to the present invention, fine particles of the external additive can stably prevent charges from leaking and can avoid the aforementioned problems by using the silicon element and metal element.

When the oxide fine particles include at least a silicon element, the charge level and the resistance level can be more appropriately controlled, and the resulting toner can have improved electrostatic stability even under severe conditions. The oxide fine particles may include a general substance in addition to $SiO_2$, as long as it satisfies the requirements in the configuration in the present invention. Examples of the substance include MgO, CaO, BaO, $Al_2O_3$, $TiO_2$, $SnO_2$, combinations of these substances, and the like. Among them, oxide fine particles including at least a silicon oxide in combination with a titanium oxide can impart excellent fluidity, electrostatic properties and satisfactory durability upon vigorous stirring to the toners.

The oxide fine particles preferably have a composition uniformly dispersed over their surface and inside thereof. Thus, the external additive for a toner for electrophotography has excellent stability with less non-uniformess in dielectric properties and resistance properties.

The oxide fine particles are preferably treated on their surface with at least an organosilicon compound. Thus, the external additive can have further stable electrostatic properties. Oxide fine particles obtained by the process according to the present invention may become an unsaturated oxide under some conditions for oxidizing the solid solution fine particles. In this case, the external additive may have varying properties with time due to proceeding of oxidization with time. To avoid these variation with time, reactive portions of the oxide fine particles are preferably inactivated. The oxide fine particles are more preferably subjected to a surface treatment with an organosilicon compound surface treatment agent (coupling agent) and/or an organotitanium compound surface treatment agent (coupling agent). They are further more preferably subjected to a surface treatment using a hydrophobing agent.

The oxide fine particles may be hydrophobic oxide fine particles having a $R^1_3SiO_{1/2}$ unit on a surface thereof, in which the $R^1$ is an identical monovalent carbon hydrogen group having 1 to 8 carbon atoms.

The oxide fine particles are preferably hydrophobed spherical silica fine particles having $R^1_3SiO_{1/2}$ units on their surface so as to improve electrostatic stability even under severe conditions. In the formula above, $R^1$ is an identical or different monovalent hydrocarbon group each having from 1 to 8 carbon atoms. Examples of such monovalent hydrocarbon groups are methyl group, ethyl group, propyl group, butyl group, pentyl group, hexyl group, heptyl group, octyl group, cyclohexyl group, phenyl group, vinyl group, allyl group, and the like. Of these, methyl group is preferred.

The oxide fine particles are preferably treated on their surface with at least silicone oil, and the silicone oil has a liberation degree of from 10% to 95%. Thus, the toner can have a surface covered with an appropriately controlled amount of the silicone oil and thereby has improved storage stability even under severe conditions. If the liberation degree is less than 10%, the silicone oil may not sufficiently exhibit its functions. If it is more than 95%, the silicone oil may adhere to the latent electrostatic image bearing member to thereby cause filming and other problems and may invite reduced fluidity of the toner.

The toner according to the present invention may include base toner particles having a small-particle diameter and the oxide fine particles, in which the base toner particle having a small-particle diameter, contain at least a binder resin and a coloring agent and have a volume average particle diameter of from 2 μm to 7 μm. Thus, the base toner particles having a small-particle diameter can be prevented from aggregating and decreasing their fluidity and can have increased electrostatic stability and storage stability even under severe conditions. In the present invention, the term "a base toner particle" refers to a primary toner particle to which the external additive of the present invention is added.

In addition to the oxide fine particles, other type of external additives having an average particle diameter of primary particles smaller than that of the oxide fine particles, may be added to the toner. By incorporating these external additives to the toner, the toner can have improved fluidity and an increased coverage of the external additives over the toner. Such satisfactory fluidity may not be obtained by single use of large-diameter oxide fine particles having an average particle diameter of from 30 nm to 150 nm. In addition, the particles of the external additives have increased affinity for each other and can cover the toner more satisfactorily.

The binder resin of the toner preferably includes at least one polyol resin. Thus, the toner can have excellent charge matching with the oxide fine particles, sufficient compressive strength, tensile strength at break, stability even under severe conditions and stable image-fixing properties. The binder resin of the toner more preferably includes at least one polyol resin having an epoxy resin moiety and a polyoxyalkylene moiety at least in its main chain. Thus, the toner can have further excellent stability even under severe conditions and further stable image-fixing properties. The resulting toner can prevent transfer of toner images to a vinyl chloride resin sheet, even when an image bearing surface is brought into intimate contact with the sheet. When the toner is used as a color toner, the color toner can have satisfactory color reproducibility, stable glossiness and can prevent curling of copied and fixed images.

The binder resin of the toner more preferably further includes at least one polyester resin moiety. The resulting toner has further improved compressive strength and well-balanced stretching properties and adhesion and exhibits further stable image transfer properties, development properties and image-fixing properties.

When the toner is used in combination with a carrier including magnetic particles to constitute a double-component development system, the resulting development system can exhibit well-balanced adhesion to the carrier, less stress variation and a sufficient bulk density as a developer and shows satisfactorily sharp toner charging and excellent electrostatic stability even under severe conditions. The development system can satisfactorily control its toner concentration using, for example, a bulk density sensor.

In an image forming apparatus, latent electrostatic images on a latent electrostatic image bearing member are developed using a developer for electrostatic development to thereby form toner images; a transfer is brought into contact with the surface of the latent electrostatic image bearing member, via a transferring medium, to electrostatically transfer the toner images onto the transferring medium. By incorporating a double-component developer including a carrier which contains magnetic particles and the aforementioned toner for electrophotography into the image forming apparatus, the resulting image forming apparatus can have excellent properties.

Specifically, the present invention provides the following (1) to (14).

Figure 1:
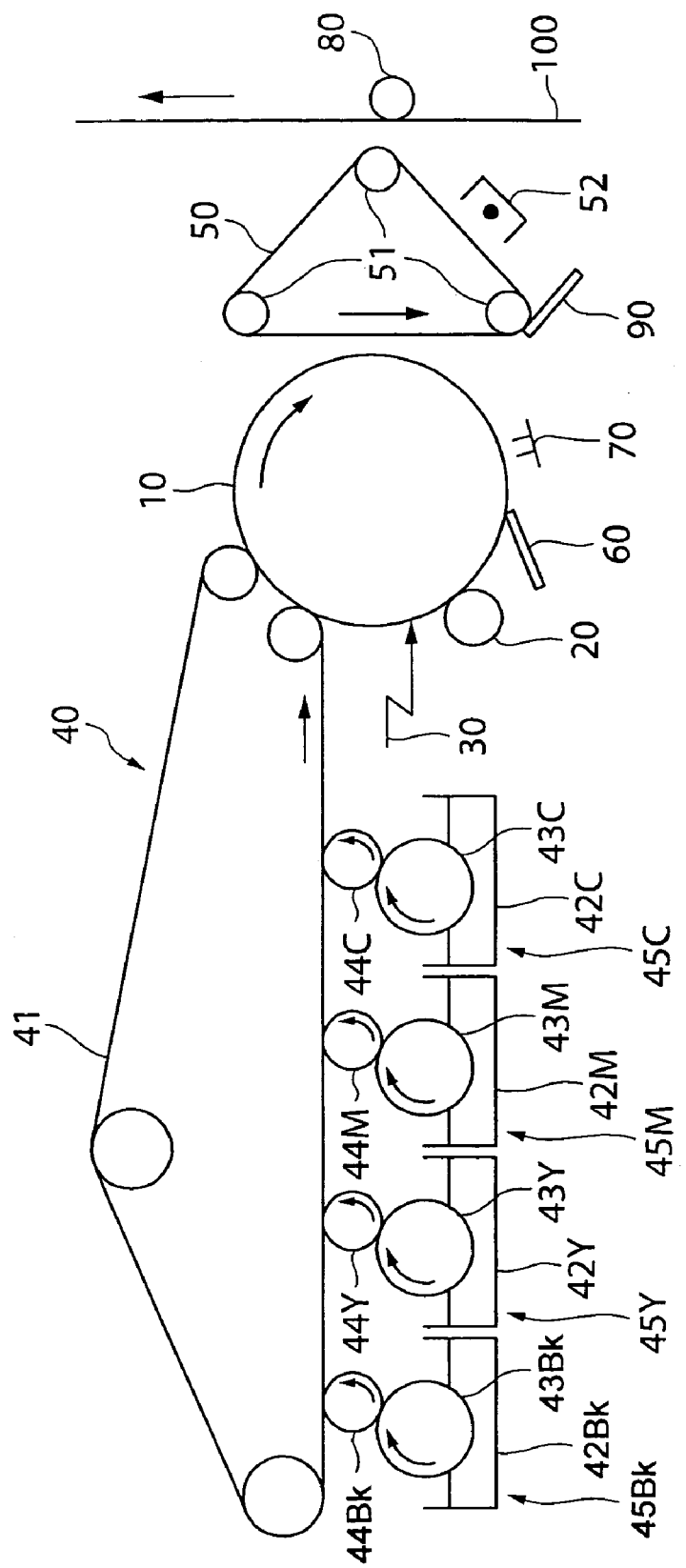
FIG. 1 is a schematic view showing an example of a preferable embodiment in which the toner for electrophotography of the present invention and the developer of the present invention are used.

DESCRIPTION OF THE PREFERRED EMBODIMENTS (Oxide Fine Particles)

The oxide fine particles for use in the present invention are spherical silica fine particles and can be prepared by burning and decomposing an alkoxysilane and/or its partially hydrolyzed condensate in flames. They are preferably non-crystalline fine particles.

The alkoxysilane is expressed by a formula: $R^2{}_a Si(OR^3)_{4-a}$ wherein each of $R^2$ and $R^3$ is a monovalent hydrocarbon group having from 1 to 4 carbon atoms; and "a" is an integer of from 0 to 4. Such alkoxysilanes include, but are not limited to, tetramethoxysilane, tetraethoxysilane, tetrapropoxysilane, tetrabutoxysilane, methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, butyltrimethoxysilane, butyltriethoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, dipropyldimethoxysilane, dipropyldiethoxysilane, dibutyldimethoxysilane, dibutyldiethoxysilane, trimethylmethoxysilane, trimethylethoxysilane, trimethylpropoxysilane, trimethylbutoxysilane, triethylmethoxysilane, triethylethoxysilane, triethylpropoxysilane, triethylbutoxysilane, tripropylmethoxysilane, tripropylethoxysilane, tributylmethoxysilane, tributylethoxysilane, and the like. Among them, tetramethoxysilane and methyltrimethoxysilane are preferred.

The spherical silica fine particles can be prepared by heating and evaporating an alkoxysilane and/or its partially hydrolyzed condensate and allowing the gas to flow with an inert gas such as nitrogen gas or by spraying the alkoxysilane and/or its partially hydrolyzed condensate into flames such as oxyhydrogen flames and burning and decomposing the sprayed material.

The oxide fine particles for use in the present invention are preferably hydrophobic spherical silica fine particles having $R^1{}_3 SiO_{1/2}$ units on their surface to thereby improve electrostatic stability even under severe conditions. In the aforementioned formula, $R^1$'s are identical or different monovalent hydrocarbon groups each having from 1 to 8 carbon atoms. Such hydrocarbon groups include, for example, a methyl group, an ethyl group, a propyl group, a butyl group, a pentyl group, a hexyl group, a heptyl group, an octyl group, a cyclohexyl group, a phenyl group, a vinyl group, an allyl group, and the like. Of those, a methyl group is preferred.

The $R^1{}_3 SiO_{1/2}$ units can be introduced into the surface of the oxide fine particles according to a conventional procedure for surface modification of silica fine particles. For example, the $R^1{}_3 SiO_{1/2}$ units can be introduced by bringing a silazane compound expressed by the formula, $R^1{}_3 SiNHSiR^1{}_3$, into contact with silica fine particles in the presence of water at 0° C. to 400° C. in a gas, liquid, or solid phase, heating the resulting mixture at 50° C. to 400° C. to thereby remove excess of the silazane compound.

Examples of the silazane compound expressed by the formula, $R^1{}_3 SiNHSiR^1{}_3$, are hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and the like. Among them, hexamethyldisilazane is preferred for higher hydrophobicity of the treated silica fine particles and easier removal of the silazane compound.

The electrostatic developer according to the present invention can be obtained by externally or internally adding the spherical silica fine particles to the base toner particles. If the amount of spherical silica fine particles is less than 0.01 part by weight relative to 100 parts by weight of the toner, the resulting toner may have insufficient fluidity. If it is more than 20 parts by weight, the toner may have deteriorated electrostatic properties and image-fixing properties. Thus, the amount of the spherical silica fine particles is preferably in a range from 0.01 part by weight to 20 parts by weight, and more preferably from 0.1 part by weight to 5 parts by weight, relative to 100 parts by weight of the toner. The base toner particles and the spherical silica fine particles can be mixed according to any procedure using a device such as a V-type blender, HENSCHEL MIXER, ribbon blender, Raikai mill, or the like. The spherical silica fine particles can be adhered to the surface of the base toner particles, be fused thereto or be incorporated in the base toner particles.

The oxide fine particles for use in the present invention preferably contains at least one metal element (a dopant compound) mentioned below as constitutional elements in addition to the silicon element (a silicon compound). As the dopant compound, compounds and oxides of at least one element belonging to Groups II, III, and IV and the third or higher period of the Periodic Table of Elements are more preferred. Examples of such metal elements are Mg, Ca, Ba, Al, Ti, V, Sr, Zr, Sn, Zn, Ga, Ge, Cr, Mn, Fe, Co, Ni, Cu, and the like. Among them, Ti and Zn are particularly preferred. Thus, the oxide fine particles preferably contain the metal element, Si element, and O element.

The oxide fine particles for use in the present invention are substantially spherical and have a primary particle diameter R of from 30 nm to 300 nm and preferably from 50 nm to 170 nm, a standard deviation σ of the particle size distribution of R within a range from R/4 to R and preferably from R/3 to 2/3R, a circularity SF1 of from 100 to 130 and preferably from 100 to 125, and a circularity SF2 of from 100 to 125 and preferably from 100 to 120. The primary particle diameter of the oxide fine particles is a number-average particle diameter.

The particle diameter of the inorganic fine particles for use in the present invention can be determined by using a dynamic light-scattering particle size distribution analyzer such as DLS-700 (trade name, available from Otsuka Electronics Co., Ltd.) and Coulter N4 (trade name, available from Coulter Electronics, Inc.). However, secondary aggregation of the inorganic fine particles after hydrophobing treatment cannot be significantly dissociated, and the particle diameter is preferably determined directly from photographs obtained by using a scanning electron microscope (SEM) or transmission electron microscope (TEM). When an SEM is used, the inherent dimensions and shapes of the particles may be deteriorated due to deposited platinum or another material. The particle diameter is preferably determined by reducing the thickness of a deposited film, if any, to about 1 nm. More preferably, the particle diameter is determined, without vapor deposition, at a low acceleration voltage of several electron volts to ten thousand electron volts using a high-resolution field emission scanning electron microscope (FE-SEM) that can sufficiently resolve even at a low acceleration voltage, such as S-5200 (trade name, available from Hitachi, Ltd.). When an SEM or TEM is used, at least a hundred oxide fine particles are observed, and the particle size distribution and the circularities SF1 and SF2 are statistically determined by calculation using Luzex and other image processors and image processing software. The SF1 and SF2 for use herein are preferably determined by analyzing the data in an image analyzer available from NIRECO Corporation under the trade name of Luzex AP and are calculated according to the following equations. The formation coefficients SF1 and SF2 are preferably determined using Luzex AP, but measuring and analyzing systems for use herein are not limited to FE-SEM and Luzex AP, as long as they can yield similar results.

$$SF1 = (L^2/A) \times (\pi/4) \times 100 \quad \text{equation (1)}$$

$$SF2 = (P^2/A) \times (1/4\pi) \times 100 \quad \text{equation (2)}$$

In the equations (1) and (2), "L" expresses the absolute maximum length of the oxide fine particle; "A" expresses the projected area of the oxide fine particle; and "P" expresses the maximum perimeter of the oxide fine particle. If a particle is exactly spherical, the particle has both SF1 and SF2 of 100. Increasing SF1 and SF2 from 100 means the particle becomes amorphous. The formation coefficient SF1 indicates the shape (oval, spherical, or the like.) of the entire toner particle, and the formation coefficient SF2 indicates the magnitude of depressions and protrusions on the surface of the toner particle.

In one embodiment, the elements of the oxide fine particles are uniformly dispersed between a surface of the oxide fine articles and an inner portion of the oxide fine particles.

The oxide fine particles preferably have a composition uniformly dispersed over their surface and inside thereof. Whether or not the composition is uniformly dispersed can be determined by subjecting the surface (a ¼ particle diameter surface) layer and the core of the oxide fine particles to elementary analyses mapping using a transmission electron microscope having scanning function and elementary analysis mapping function, such as HD-2000 (trade name, available from Hitachi, Ltd.). When the elementary ratio of the surface to the core is from 0.6 to 1.4, the composition can be assessed as being uniformly dispersed within the oxide fine particles.

The elemental ratio can be determined in the following manner. For example, when the oxide fine particles comprise a Ti element with $SiO_2$, the ratios A/C and B/C in the core of the particles are calculated, wherein "A" expresses the count of Si atoms, "B" expresses the count of Ti atoms, and "C" expresses the count of O atoms. The ratios A/C and B/C correspond to relative amounts of Si and Ti on the basis of O. Separately, the ratios A'/C' and B'/C' in the vicinity of the surface are determined in the similar manner, wherein A', B', and C' are the counts of Si atoms, Ti atoms, and O atoms detected in the vicinity of the surface. The elementary ratio of the surface to the core is then determined by dividing A'/C' by A/C or by dividing B'/C' by B/C.

In addition, elementary particles (clusters) in the oxide fine particles preferably have a uniform size. The term, "uniform size," as used herein means that the ratio of the maximum diameter to the minimum diameter among elementary particles is less than 10:1. The diameters of the elementary particles can be easily determined by using, for example, an image analyzing software. Preferably, about two hundreds particles of elements are analyzed.

Examples of surface treatment agents for the oxide fine particles are silane coupling agents such as dialkyldihalogenosilane, trialkylhalogenosilane, alkyltrihalogenosilane, hexaalkyldisilazane, or the like; silylating agents; silane coupling agents having a fluoroalkyl group; organic titanate coupling agents; aluminum coupling agents; silicone oil; silicone varnish, and the like. Organosilicon compound coupling agents and hydrophobing agents are more preferred.

(External Additives)

Inorganic fine particles and hydrophobed inorganic fine particles can be used in combination with the oxide fine particles, as the external additive. The external additive for use herein preferably comprises one or more types of hydrophobed inorganic fine particles having an average particle diameter of primary particles of 1 nm to 100 nm and preferably 5 nm to 70 nm. The external additive more preferably comprises one or more types of hydrophobed inorganic fine particles having an average particle diameter of primary particles of 20 nm or less and one or more types of inorganic fine particles having an average particle diameter of primary particles of 30 nm or more. These fine particles preferably have a specific surface area of 20 $m^2/g$ to 500 $m^2/g$ as determined according to the Brunauer-Emmett-Teller (BET) method.

Any of known fine particles can be used herein as long as they satisfy the requirements. For example, the external additive can comprise any of silica fine particles; hydrophobic silica; fatty acid metallic salts such as zinc stearate, aluminium stearate, or the like; metallic oxides such as titania, alumina, tin oxide, antimony oxide, or the like; fluoropolymers; and the like.

Among them, fine particles of hydrophobed silica, titania, titanium oxide, and aluminum are preferred as the external additives. Such silica fine particles are commercially available under the trade names of HDK H 2000, HDK H 2000/4, HDK H 2050EP, HVK21, and HDK H 1303 (available from Hoechst AG); R972, R974, RX200, RY200, R202, R805, and R812 (available from Nippon Aerosil Co., Ltd.), and the like. Titania fine particles are commercially available under the trade names of P-25 (available from Nippon Aerosil Co., Ltd.); STT-30 and STT-65C-S (available from Titan Kogyo Kabushiki Kaisha); TAF-140 (available from FUJI TITANIUM INDUSTRY CO., LTD.); and MT-150W, MT-500B, MT-600B, MT-150A (available from TAYCA Corporation), and the like. Hydrophobed titanium oxide fine particles are commercially available under the trade names of T-805 (available from Nippon Aerosil Co., Ltd.); STT-30A, and STT-65S-S (available from Titan Kogyo Kabushiki Kaisha); TAF-500T, and TAF-1500T (available from FUJI TITANIUM INDUSTRY CO., LTD.); MT-100S, and MT-100T (available from TAYCA Corporation); IT-S (available from Ishihara Sangyo Kaisha, Ltd.), and the like.

Such hydrophobed oxide fine particles, silica fine particles, titania fine particles, and alumina fine particles can be obtained by treating hydrophilic fine particles with a silane coupling agent. Such silane coupling agents include, for example, methyltrimethoxysilane, methyltriethoxysilane, octyltrimethoxysilane, and the like. In addition, silicone oil-treated oxide fine particles and inorganic fine particles are also preferred. Such treated fine particles are prepared by treating fine particles with silicon oil, if necessary, while heating.

Such silicone oils include, but are not limited to, dimethyl silicone oil, methyl phenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, acrylic or methacrylic-modified silicone oil, α-methylstyrene-modified silicone oil, and the like. Examples of the inorganic fine particles are fine particles of silica, alumina, titanium oxide, barium titanate, magnesium titanate, calcium titanate, strontium titanate, iron oxide, copper oxide, zinc oxide, tin oxide, silica sand, clay, mica, wollastonite, diatomaceous earth, chromium oxide, cerium oxide, iron oxide red, antimony trioxide, magnesium oxide, zirconium oxide, barium sulfate, barium carbonate, calcium carbonate, silicon carbide, silicon nitride, and the like. Among them, silica and titanium dioxide fine particles are preferred. The amount to be added is preferably 0.1% by weight to 5% by weight, and more preferably 0.3% by weight to 3% by weight based on the total weight of the toner. The inorganic fine particles should preferably have an average particle diameter of primary particles of 100 nm or less, and more preferably 3 nm to 70 nm. If the average particle diameter is less than this range, the inorganic fine particles are embedded in the toner to thereby fail to exhibit their functions effectively. If it is more than the range, the inorganic fine particles may non-uniformly damage the surface of the photoconductor.

The liberation degree of the silicone oil for use in the present invention can be determined by the following assay system. However, the determination method is not specifically limited to the system and any of appropriate systems can be employed.

1. Extraction of Free Silicone Oil

A sample dipped in and stirred with chloroform and is then left to stand. After removing the supernatant by centrifugation, the remained solid matters are diluted with chloroform, the mixture is stirred and is then left to stand. This procedure is repeated to thereby remove free silicone oil.

2. Determination of Carbon Content

The carbon content in the sample can be determined, for example, using a CHN elementary analyzer such as a CHN Corder MT-5 (trade name, available from Yanaco Analytical Instruments Corporation).

3. Determination of Liberation degree of Silicone Oil

The liberation degree of the silicone oil can be determined according to the following equation:

Silicone oil liberation degree $(\%)=(C_0-C_1)/C_0 \times 100$ wherein $C_0$ is the carbon content in the sample before extraction; and $C_1$ is the carbon content in the sample after extraction.

(Coupling Agents)

Examples of the coupling agents (surface treatment agents) for the external additives including oxide fine particles, are other silane coupling agents such as dialkyldihalogenosilane, trialkylhalogenosilane, alkyltrihalogenosilane, hexaalkyldisilazane, or the like; silylating agents; silane coupling agents having a fluoroalkyl group; organotitanate coupling agents; aluminum coupling agents; silicone oil; silicone varnish; and the like. Organosilicon compound coupling agents and hydrophobing agents are more preferred.

(Softening Point and Flow Beginning Temperature)

The softening point and the flow beginning temperature of the toner for electrophotography of the present invention can be determined using a softening point measuring system (available from Mettler Toledo GmbH under the trade name of FP90) at a heating rate of 1° C./min.

(Glass transition temperature (Tg))

The glass transition temperature (Tg) of the toner for electrophotogarphy of the present invention can be determined, for example, by using the following differential scanning calorimeter under the following conditions.

Differential scanning calorimeter: SEIKO DSC 100
SEIKO Disk Station SSC 5040 (trade names, available from Seiko Instruments Inc.)
Determination conditions:

| | |
|---|---|
| Range of temperature: | 25° C. to 150° C. |
| Heating rate: | 10° C./min |
| Sampling time: | 0.5 sec |
| Sample amount: | 10 mg |

(Molecular Weight)

The number-average molecular weight (Mn), weight-average molecular weight (Mw) and peak molecular weight (Mp) of the toner for electrophotography of the present invention, can be determined by gel permeation chromatography (GPC) in the following manner. A total of 80 mg of a sample is dissolved in 10 ml of tetrahydrofuran (THF) to yield a sample solution, and the sample solution is filtrated through a 5 μm-filter. A total of 100 μl of the sample solution is then injected into a column, and the retention time of the sample is determined under the following conditions. Separately, the retention time of polystyrene having a known average molecular weight as a reference material is determined to thereby yield a calibration curve. The number-average molecular weight of the sample in terms of polystyrene is determined based on the calibration curve.

Columns: Guard column, GLR 400M, GLR 400M, and GLR 400 (all available from Hitachi, Ltd.)
Column temperature: 40° C.
Mobile phase (flow rate): THF (1 ml/min)
Peak detection: UV (254 nm)
Needle penetration and Thermal Stability
(High-Temperature Storage Stability)

A total of 10 g of sample toners is weighed, is placed in a 20-cc glass container and is left to stand in a thermostat set at 50° C. for 5 hours. Thereafter, the needle penetration of the sample is determined using a penetrometer.

(Average Particle Diameter of Dispersed Wax)

The average particle diameter of wax to be dispersed for use in the present invention can be analyzed by observing ultra-thin sections of the toner using a transmission electron microscope (TEM). If necessary, the observed TEM images are input in a computer, and the average particle diameter of the wax to be dispersed is determined using an image processing software. In stead of TEM, any other methods or devices such as optical microscopes, CCD camera, laser microscopes, or the like can be used, as long as they can determine the average particle diameter.

(Binder Resins)

Binder resins for use in the toner of the present invention include, but are not limited to, polymers of styrene and substituted styrenes such as polystyrenes, poly-p-chlorostyrenes, polyvinyltoluenes, or the like; styrenic copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic ester copolymers, or the like; poly(methyl methacrylate), poly(butyl methacrylate), poly(vinyl chloride), poly(vinyl acetate), polyethylene, polypropylene, polyester, an epoxy resin, a polyol resin, polyurethane, polyamide, poly(vinyl butyral), a poly(acrylic acid) resin, rosin, modified rosin, a terpene resin, an aliphatic or an alicyclic hydrocarbon resins, an aromatic petroleum resin, chlorinated paraffins, paraffin wax, and the like. Each of these resins can be used either alone or in combination. Among them, polyester resins and polyol resins are more preferred.

The binder resin more preferably comprises a polyol resin or a polyol resin having an epoxy resin moiety and a polyoxyalkylene moiety in its main chain. Thus, the resulting toner has sufficient compressive strength, tensile strength at break, stability in even under severe conditions, and stable image-fixing properties. The toner can also prevent transfer or migration of toner images to a sheet made of a vinyl chloride resin when a copied fixed image bearing surface is brought into intimate contact with the sheet. When the toner is used as a color toner, the toner can exhibit satisfactory color reproducibility, stable glossiness and can prevent curling of copied fixed images. The polyol resin in the binder resin further preferably comprises a polyol resin moiety and a polyester resin moiety. The resulting toner has further improved compressive strength and well-balanced stretching properties and adhesion and exhibits further stable image transfer properties, development properties and image-fixing properties.

Epoxy resins for use in the present invention are preferably polyol resins (epoxy resins) prepared by a reaction between a bisphenol such as bisphenol A, bisphenol F, or the like with epichlorohydrin. More preferably, the epoxy resin comprises two or more bisphenol A epoxy resins having different number-average molecular weights to yield stable image-fixing properties and glossiness. A low molecular weight component of the epoxy resin preferably has a number-average molecular weight of 360 to 2000, and a high molecular weight component thereof preferably has a number-average molecular weight of 3000 to 10000. More preferably, the epoxy resin comprises 20% by weight to 50% by weight of the low molecular weight component and 5% by weight to 40% by weight of the high molecular weight component. If the epoxy resin comprises an excessively large amount of the low molecular weight component or comprises a low molecular weight component having an excessively low number-average molecular weight of less than 360, the resulting toner may have excessive glossiness or deteriorated storage stability. If the epoxy resin comprises an excessively large amount of the high molecular weight component or comprises a high molecular weight component having an excessively high number-average molecular weight more than 10000, the resulting toner may have insufficient glossiness or deteriorated image-fixing properties.

Examples of alkylene oxide adducts of dihydric phenol for use in the present invention, are reaction products of ethylene oxide, propylene oxide, butylene oxide, a mixture of these compounds with a bisphenol such as bisphenol A, bisphenol F, or the like. The resulting adducts may be glycidylated with epichlorohydrin or β-methylepichlorohydrin. Among them, diglycidyl ethers of alkylene oxide adducts of bisphenol A expressed by following Formula (1) are preferred:

The polyol resin preferably comprises 10% by weight to 40% by weight of the alkylene oxide adduct of a dihydric phenol or its glycidyl ether. If the content of the alkylene oxide adduct of a dihydric phenol is excessively low, the resulting toner may invite increased curling. If n+m is 9 or more, or the amount of the alkylene oxide adduct of a dihydric phenol is excessively large, the resulting toner may invite excessive glossiness or deteriorated storage stability. Examples of compounds having one active hydrogen capable of reacting with an epoxy group per molecule for use in the present invention, are monohydric phenols, secondary amines, and carboxylic acids. Such monohydric phenols include, but are not limited to, phenol, cresol, isopropylphenol, aminophenol, nonylphenol, dodecylphenol, xylenol, p-cumylphenol, and the like. Such secondary amines include, but are not limited to, diethylamine, dipropylamine, dibutylamine, N-methyl(ethyl)piperazine, piperidine, and the like. The carboxylic acids include, but are not limited to, propionic acid, caproic acid, and the like.

The polyol resin having an epoxy resin moiety and an alkylene oxide moiety in its main chain for use in the present invention can be obtained from various combinations of materials. For example, the polyol resin can be obtained by allowing an epoxy resin having glycidyl groups at both ends and an alkylene oxide adduct of a dihydric phenol having glycidyl groups at both ends to react with dihalide, diisocyanate, diamine, dithiol, polyhydric phenol, or a dicarboxylic acid. Among them, dihydric phenol is preferably used for a more stable reaction. It is also preferable to use polyhydric phenol and/or polycarboxylic acid in combination with the dihydric phenol within ranges not inviting gelation. The amount of the polyhydric phenol and the polycarboxylic acid is preferably 15% by weight or less, and more preferably 10% by weight or less, relative to the total amount of the materials.

Examples of the compounds having two or more active hydrogens per molecule for use in the present invention include dihydric phenols, polyhydric phenols, and polycarboxylic acids. Such dihydric phenols include, for example, bisphenol A, bisphenol F, and the like. Such polyhydric phenols include, for example, o-cresol novolacs, phenol novolacs, tris(4-hydroxyphenyl)methane, 1-[α-methyl-α-(4-hydroxyphenyl)ethyl]benzene, and the like. Examples of the polycarboxylic acids are malonic acid, succinic acid, glutaric acid, adipic acid, maleic acid, fumaric acid, phthalic acid, terephthalic acid, trimellitic acid, trimellitic anhydride, and the like.

The binder resin more preferably comprises a polyol resin having an epoxy resin moiety, a polyoxyalkylene moiety in its main chain, and at least one polyester moiety. Thus, the resin has changed viscoelasticity and rigidity to have softer (more Formula (1)

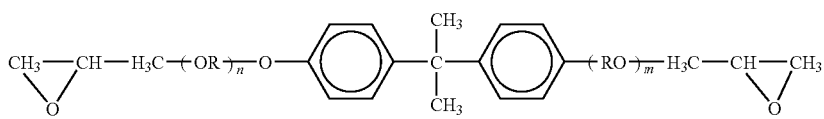

(in the above Formula (1), R is,

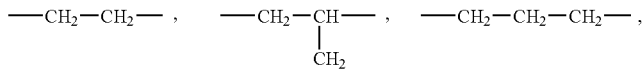

"n" and "m" are each the number of a repeated unit, are each 1 or more, and "n + m" is 2 to 8.)

flexible) physical properties to thereby suppress curing of images. The polyester moiety (component) mainly contributes to these advantages.

The binder resin preferably has an epoxy equivalent of 10000 or more, more preferably 30000 or more, and still more preferably 50000 or more. Thus, the resin can have satisfactorily controlled thermal properties and can contain reduced amounts of low molecular weight components such as epichlorohydrin which is reaction residues. The resulting toner can provide excellent safety and resinous properties.

Polyester resins are also preferably used as the binder resin. Such polyester resins can be any polyester resins, and are preferably polyester resins prepared as a result of the reaction among the following components (1), (2) and (3):

(1) at least one of dicarboxylic acid, lower alkyl ester and acid anhydride thereof;

(2) a diol component expressed by following Formula (2):

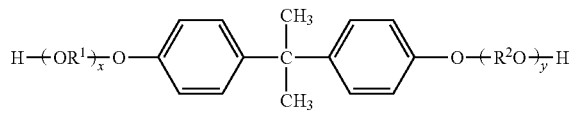

Formula (2)

wherein $R^1$ and $R^2$ may be identical or different and each express an alkylene group containing 2 to 4 carbon atoms; "x" and "y" each express the number of a repeated unit and are each 1 or more, and "x+y" is 2 to 16; and (3) at least one selected from trivalent or higher polycarboxylic acids, lower alkyl esters and acid anhydrides thereof, and trihydric or higher polyhydric alcohols.

Examples of the component (1), namely, dicarboxylic acid, lower alkyl ester and acid anhydrides thereof, are terephthalic acid, isophthalic acid, sebacic acid, isodecylsuccinic acid, maleic acid, and fumaric acid; monomethyl, monoethyl, dimethyl, and diethyl esters of these carboxylic acids; phthalic anhydride, maleic anhydride, and the like. Among them, terephthalic acid, isophthalic acid, and dimethyl esters thereof are preferred for higher blocking resistance and lower cost. These dicarboxylic acids, lower alkyl esters and acid anhydrides thereof largely affect the image-fixing properties and blocking resistance of the toner. While depending on the degree of condensation, the use of an aromatic carboxylic acid such as terephthalic acid or isophthalic acid in a large amount decreases the image-fixing properties although it increases the blocking resistance. In contrast, the use of sebacic acid, isodecylsuccinic acid, maleic acid, or fumaric acid in a large amount decreases the blocking resistance although it increases the image-fixing properties. These dicarboxylic acids and derivatives thereof should be appropriately selected and used alone or in combination depending on the composition of the other monomers, proportions thereof, and degree of condensation.

Examples of the diol component (2) expressed by Formula (2) are polyoxypropylene-(n)-polyoxyethylene-(n')-2,2-bis (4-hydr oxyphenyl)propane, polyoxypropylene-(n)-2,2-bis (4-hydroxyphenyl)propane, polyoxyethylene-(n)-2,2-bis(4-hydroxyphenyl)propane, and the like. Among them, the preferred are polyoxypropylene-(n)-2,2-bis(4-hydroxyphenyl)propane where "n" is 2.1 to 2.5, and polyoxyethylene-(n)-2,2-bis(4-hydroxyphenyl)propane where "n" is 2.0 to 2.5. These diol components serve to increase the glass transition temperature and to control the reaction more easily.

As the diol component, aliphatic diols such as ethylene glycol, diethylene glycol, 1,2-butanediol, 1,3-butanediol, 1,4-butanediol, neopentyl glycol, propylene glycol, or the like, can also be used.

Of the components (3), the trivalent or higher polycarboxylic acids, lower alkyl esters and acid anhydrides thereof include, for example, 1,2,4-benzenetricarboxylic acid (trimellitic acid), 1,3,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, tetra(methylenecarboxy)methane, 1,2,7,8-octanetetracarboxylic acid, empol trimer acid, and monomethyl, monoethyl, dimethyl, and diethyl esters of these polycarboxylic acids, and the like.

Examples of the trihydric or higher polyhydric alcohols as the components (3) are sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, diglycerol, 2-methylpropanetriol, 2-methyl-1,2,4-butanetriol, trimethylolethane, trimethylolpropane, 1,3,5-trihydroxymethylbenzene, and the like.

The amount of the trivalent or higher polyvalent monomers is preferably 1% by mole to 30% by mole relative to the total amount of the monomer composition. If the amount is 1% by mole or less, the toner may have decreased anti-offset performance and deteriorated durability. If it is 30% by mole or more, the toner may have deteriorated image-fixing properties.

Among these trivalent or higher polyvalent monomers, benzenetricarboxylic acids, anhydrides, esters, and other derivatives thereof are preferred. By using the benzenetricarboxylic acids or derivatives thereof, the toner can have both satisfactory image-fixing properties and high anti-offset performance at the same time.

These polyester resins and polyol resins are preferably not crosslinked or are weakly crosslinked (preferably have a content of THF-insoluble matters of 5% or less). If they are highly crosslinked, the resulting toner may not have satisfactory transparency and glossiness. These binder resins can be prepared according to any procedure such as bulk polymerization, solution polymerization, emulsion polymerization, suspension polymerization, or the like.

(Coloring agents)

Any conventional or known dyes and pigments can be used as the coloring agent for the toner of the present invention. Such dyes and pigments include, but are not limited to, carbon black, nigrosine dyes, black iron oxide, Naphthol Yellow S, Hansa Yellow (10G, 5G, and G), cadmium yellow, yellow iron oxide, yellow ochre, chrome yellow, Titan Yellow, Oil Yellow, Hansa Yellow (GR, A, RN, and R), Pigment Yellow L, Benzidine Yellow (G, GR), Permanent Yellow (NCG), Vulcan Fast Yellow (5G, R), Tartrazine Lake, Quinoline Yellow Lake, Anthragen Yellow BGL, isoindolinone yellow, red oxide, red lead oxide, red lead, cadmium red, cadmium mercury red, antimony red, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, eosine lake, Rhodamine Lake B, Rhodamine Lake Y, Alizarine Lake, Thioindigo Red B, Thioindigo Maroon, Oil Red, quinacridone red, Pyrazolone Red, Chrome Vermilion, Benzidine Orange, Perynone Orange, Oil Orange, cobalt blue, cerulean blue, Alkali Blue Lake, Peacock Blue Lake, Victoria Blue Lake, metal-free phthalocyanine blue, Phthalocyanine Blue, Fast Sky Blue, Indanthrene Blue (RS, BC), indigo, ultramarine, Prussian blue, Anthraquinone Blue, Fast Violet B, Methyl Violet Lake, cobalt violet, manganese violet, dioxazine violet, Anthraquinone Violet, chrome green, zinc green, chromium oxide, viridian emerald green, Pigment Green B, Naphthol Green B, Green Gold, Acid Green Lake, Malachite Green Lake, Phthalocyanine Green, Anthraquinone Green, titanium oxide, zinc white, lithopone, mixtures thereof, and the like. The amount of the coloring agent is generally from about 0.1 part by weight to 50 parts by weight relative to 100 parts by weight of the binder resin.

(Master Batch Pigments)

A coloring agent for use in the present invention may be a master batch pigment prepared by mixing and kneading a pigment with a resin in nearly equal proportions to thereby improve miscibility (compatibility) of the resin and the pigment. More preferably, a master batch pigment having excellent electrostatic stability even under severe conditions can be prepared by heating and kneading the pigment and a resin containing components soluble in a low polar solvent without the use of an organic solvent. The dispersibility of the master batch pigment can be further improved by using a dry powder pigment as the pigment and using water to yield wettability with the resin. An organic pigment used as a coloring agent is generally hydrophobic, but water can be penetrated into the inside of the aggregate by applying some force, since the organic pigment has been subjected to washing with water and drying processes during its manufacture. When the pigment containing water inside its aggregate is kneaded with a resin in an open kneader at temperature of 100° C. or higher, water inside the aggregate reaches its boiling point momentarily and expands, thus causing force to crush the aggregate from inside thereof. The force from inside the aggregate can much more efficiently crush the aggregate than external force.

The resin in this state is heated to a temperature higher than its softening point, has thereby a decreased viscosity and can efficiently wet the aggregate. In addition, the resin replaces the water heated at temperature around its boiling point inside the aggregate due to an effect similar to "flashing." The resulting master batch pigment contains the pigment substantially dispersed in the form of primary particles. During its vaporization, the water deprives the kneaded product of the heat of vaporization, and the kneaded product is held at a relatively low temperature of 100° C. or lower at relatively high viscosity. Thus, shearing force is effectively applied to the aggregate of the pigment. Open kneaders for use in the manufacture of the master batch pigment include regular two-roll kneaders, three-roll kneaders, as well as open-type Banbury mixers, and continuous two-roll kneaders available from Mitsui Mining Co., Ltd.

(Charge Control Agents)

The toner of the present invention may further comprise a charge control agent according to necessity. Such charge control agents for use in the present invention include known charge control agents such as nigrosine dyes, triphenylmethane dyes, chromium-containing metal complex dyes, molybdic acid chelate pigments, rhodamine dyes, alkoxyamines, quaternary ammonium salts including fluorine-modified quaternary ammonium salts, alkylamides, simple substance or compounds of phosphorus, simple substance or compounds of tungsten, fluorine-containing active agents, metal salts of salicylic acid, metal salts of salicylic acid derivatives, or the like. Specific examples of the charge control agents include commercially available products under the trade names of BONTRON 03 (Nigrosine dyes), BONTRON P-51 (quaternary ammonium salt), BONTRON S-34 (metal-containing azo dye), BONTRON E-82 (metal complex of oxynaphthoic acid), BONTRON E-84 (metal complex of salicylic acid), and BONTRON E-89 (phenolic condensation product) available from Orient Chemical Industries Co., Ltd.; TP-302 and TP-415 (molybdenum complex of quaternary ammonium salt) available from Hodogaya Chemical Co., Ltd.; COPY CHARGE PSY VP2038 (quaternary ammonium salt), COPY BLUE PR (triphenylmethane derivative), COPY CHARGE NEG VP2036 and COPY CHARGE NX VP434 (quaternary ammonium salt) available from Hoechst AG; LRA-901, and LR-147 (boron complex) available from Japan Carlit Co., Ltd.; as well as copper phthalocyanine pigments, perylene pigments, quinacridone pigments, azo pigments, and polymeric compounds having a functional group such as sulfonic group, carboxyl group, quaternary ammonium salt, and the like.

The amount of the charge control agent is not specifically limited, can be set depending on the type of the binder resin, additives, if any, used according to necessity, and the process for preparing the toner including a dispersing process. The amount is preferably from 0.1 part by weight to 10 parts by weight, and more preferably from 2 parts by weight to 5 parts by weight, relative to 100 parts by weight of the binder resin. If the amount is more than 10 parts by weight, the toner may have excessively high charges, the charge control agent may not sufficiently play its role, the developer may have an increased electrostatic attraction to a development roller, may have a decreased fluidity or may induce a decreased concentration of images.

(Carriers)

The toner of the present invention can be used in combination with a magnetic carrier in a double-component developer. The amount of the toner in the developer is preferably from 1 part by weight to 10 parts by weight relative to 100 parts by weight of the carrier. Such magnetic carriers include, for example, conventional magnetic particles with a particle diameter of about 20 µm to about 200 µm, made of iron, ferrite, magnetite, magnetic resin carriers, and the like. Coating materials for use herein include, but are not limited to, amine resins such as urea-formaldehyde resins, melamine resins, benzoguanamine resins, urea resins, polyamide resins, epoxy resins, or the like; halogenated olefin resins such as polyvinyl and polyvinylidene resins such as acrylic resins, poly(methyl methacrylate) resins, polyacrylonitrile resins, poly(vinyl acetate) resins, poly(vinyl alcohol) resins, poly (vinyl butyral) resins, polystyrene resins, styrene-acrylic copolymer resins, poly(vinyl chloride) or the like; polyester resins such as poly(ethylene terephthalate) resins, poly(butylene terephthalate) resins, or the like; polycarbonate resins; polyethylene resins; poly(vinyl fluoride) resins, poly(vinylidene fluoride) resins, polytrifluoroethylene resins, polyhexafluoropropylene resins, copolymers of vinylidene fluoride and acrylic monomer, vinylidene fluoride-vinyl fluoride copolymers, terpolymers of tetrafluoroethylene, vinylidene fluoride, a non-fluorinated monomer, and other fluoroterpolymers; silicone resins, and the like.

The thickness of the resulting coating film is preferably 0.01 µm to 3 µm, and more preferably 0.1 µm to 0.3 µm. If the thickness is 0.01 µm or less, the coating film may not be satisfactorily formed to thereby fail to exhibit its function as a coating film. If it is more than 3 µm, no conductivity may be obtained. The resin for use in the coating material may further comprise a conductive powder according to necessity. Such conductive powders include, for example, powders of metals, carbon black, titanium oxide, tin oxide, zinc oxide, and the like. These conductive powders preferably have an average particle diameter of 1 µm or less. If the average particle diameter is more than 1 µm, the electric resistance of the developer may not sufficiently be controlled.

The toner for electrophotography of the present invention can also be used as a single-component magnetic or non-magnetic toner without a carrier.

(Magnetic Materials)

The toner for electrophotography of the present invention may further comprise a magnetic material and can be used as a magnetic toner. To use the toner as a magnetic toner, fine particles of a magnetic material may be contained into the toner. Such magnetic materials include, but are not limited to, ferrite, magnetite, and ferromagnetic metals such as iron, cobalt, nickel, or the like, and alloys thereof, compounds containing these elements; alloys which do not contain a ferromagnetic element but show ferromagnetism by being subjected to an appropriate heat treatment, such as whistler alloys containing manganese and copper such as manganese-copper-aluminum alloys and manganese-copper-tin alloys; chromium dioxide, and the like. The magnetic material is preferably uniformly dispersed in the toner in the form of a fine powder having an average particle diameter of 0.1 µm to 1 µm. The amount of the magnetic material is preferably from 10 parts by weight to 70 parts by weight, and more preferably from 20 parts by weight to 50 parts by weight, relative to 100 parts by weight of the toner.

(Wax)

The toner or the developer preferably comprises wax to thereby have good releasability in image-fixing. In particular, when an oilless fixing device which does not use oil in an image-fixing unit is employed, the toner specifically preferably comprises wax. The wax has a melting point of preferably from 40° C. to 120° C. and more preferably from 50° C. to 110° C. If the wax has an excessively high melting point, the toner may have insufficient image-fixing properties at low temperature. If the wax has an excessively low melting point, the toner may have decreased anti-offset performance and durability. The melting point of the wax can be determined by differential scanning calorimetry (DSC). More specifically, several milligrams of a sample is heated at a constant heating rate, such as 10° C./min, and the melting peak obtained in this procedure is defined as the melting point. The content of the wax is preferably from 0 part by weight to 20 parts by weight, and more preferably from 0 part by weight to 10 parts by weight, relative to 100 parts by weight of the toner.

Such wax for use in the present invention include, but are not limited to, solid paraffin wax, microcrystalline wax, rice wax, fatty acid amide wax, fatty acid wax, aliphatic monoketones, fatty acid metal salt wax, fatty acid ester wax, partially saponified fatty acid ester wax, silicone varnish, higher alcohol, carnauba wax, and the like. In addition, low molecular weight polyethylenes, polypropylenes, and other polyolefins can be used as the wax. Among them, polyolefins and esters having a softening point of 60° C. to 150° C., and more preferably 70° C. to 120° C. as determined by a ball and ring method are preferred.

The toner more preferably comprises at least one wax selected from free-fatty-acid-free type carnauba wax having an acid value of 5 mgKOH/g or less, montan ester wax, oxidized rice wax having an acid value of 10 mgKOH/g to 30 mgKOH/g, sasol wax, and the like. Such free-fatty-acid-free type carnauba wax is prepared by removing free fatty acids from material carnauba wax and have an acid value of 5 mgKOH/g or less. These treated carnauba waxes contain crystals having a smaller particle diameter than conventional carnauba wax and can be dispersed in the form of fine particles having an average particle diameter of 1 µm or less in the binder resin. The montan ester wax is purified from minerals, have a smaller particle diameter and can be dispersed in the form of fine particles having an average particle diameter of 1 µm or less into the binder resin as in the treated carnauba wax. The montan ester wax preferably has an acid value of 5 mgKOH/g to 14 mgKOH/g.

The dispersed particles of the wax in the toner have a diameter of preferably 3 µm or less, more preferably 2 µm or less, and still more preferably 1 µm or less. When the dispersed particles have a diameter more than 3 µm, the resulting toner may have deteriorated durability at high temperature and high humidity and a decreased charging stability, although the wax flowability and releasability of the transferring medium increase.

The oxidized rice waxes are prepared by oxidizing rice bran wax with the air. The oxidized rice bran wax preferably has an acid value of 10 mgKOH/g to 30 mgKOH/g. If the acid value is less than 10 mgKOH/g, the lower limit temperature for image-fixing may rise to thereby deteriorate image-fixing properties at low temperatures. If it is more than 30 mgKOH/g, the cold-offset temperature may increase to thereby deteriorate image-fixing properties at low temperature. Examples of the sasol wax are commercially available under the trade names of Sasol Wax Hi, Sasol Wax H2, Sasol Wax A1, Sasol Wax A2, Sasol Wax A3, Sasol Wax A4, Sasol Wax A6, Sasol Wax A7, Sasol Wax A14, Sasol Wax C1, Sasol Wax C2, SPRAY30, and SPRAY40 available from Sasol Co., Ltd. Among them, Sasol Wax H1, Sasol Wax H2, SPRAY30, and SPRAY 40 are preferred for their good image-fixing properties at low temperature and good storage stability. Each of the wax can be used either alone or in combination. By using the wax in an amount of from 1 part by weight to 15 parts by weight and preferably from 2 parts by weight to 10 parts by weight, relative to 100 parts by weight of the binder resin, the aforementioned advantages can be obtained.

(Cleaning Improvers)

The toner and the developer of the present invention preferably further comprise, or carry on their surface, a cleaning improver to remove a residual developer on a photoconductor or a primary transfer after the transfer. Such cleaning improves include, but are not limited to, metal salts of stearic acid and other fatty acids such as zinc stearate, calcium stearate, stearic acid; and poly(methyl methacrylate) fine particles, polystyrene fine particles, and other fine polymer particles prepared by, for example, soap-free emulsion polymerization. Such fine polymer particles preferably have a relatively narrow particle size distribution and a volume-average particle diameter of 0.01 µm to 1 µm. The amount of the cleaning improver is preferably from 0.001 part by weight to 5 parts by weight and more preferably from 0.001 part by weight to 1 part by weight, relative to 100 parts by weight of the toner or the developer.

(Process for Manufacturing Toners)

The toner of the present invention can be manufactured by a process including the steps of mechanically mixing a developer composition containing at least a binder resin, a main charge control agent and a pigment (coloring agent), melting and kneading the resulting mixture, pulverizing the kneaded article, and classifying the pulverized article. The process for manufacturing toners may further comprise the step of recycling other powders than product particles obtained in the step of pulverizing, in the step of classifying, in the step of mechanically mixing or in the step of melting and kneading.

The term "the other powders (by-products) than the product particles" as used herein means fine particles or crude particles other than the product component having a set particle diameter obtained in the step of pulverizing after the step of melting and kneading, or fine particles or crude particles other than the product component having a set particle diameter obtained in the subsequent step of classifying. These by-products are preferably mixed with the raw materials in the step of mixing or in the step of melting and kneading. The weight ratio of the by-products to the raw materials is preferably 1:99 to 50:50.

In the step of mixing, the developer composition containing at least the binder resin, the main charge control agent, the pigment and the by-products, if any, can be mechanically mixed using a regular mixer such as the one with a rotating blade, or the like, under any conditions.

After the completion of the step of mixing, the resulting mixture is charged into a kneader and is melted and kneaded therein. Such melting kneaders include, for example, single-screw or twin-screw continuous kneaders, roll-mill batch-system kneaders, and the like. These kneaders are commercially available, for example, as a twin-screw extruder Model KTK from Kobe Steel Co., Ltd., a TEM series co-rotating twin-screw compounder from TOSHIBA MACHINE Co., Ltd., a twin-screw extruder from KCK Tool & Die, Co., a twin-screw extruder Model PCM from Ikegai, Ltd., a co-kneader from Buss Co., Ltd, and the like.

The step of melting and kneading must be performed under appropriate conditions so as not to cause cleavage of molecular chains of the binder resin. More specifically, temperature for the step of melting and kneading should be set in consideration of the softening point of the binder resin. If it is excessively lower than the softening point, the molecular chains of the binder resin are significantly cleaved. In contrast, if it is excessively higher than the softening point, the components may not be sufficiently dispersed. To control the amount of volatile components in the toner, it is preferable to set optimum conditions of the temperature, time, and atmosphere of the step of the melting and kneading while monitoring the amount of residual volatile components.

After completing the step of melting and kneading, the resulting kneaded product is pulverized. The step of pulverizing preferably comprises the step of roughly pulverizing the kneaded product and the process of finely pulverizing the roughly pulverized article. The step of pulverizing is preferably performed according to a collision pulverization process in which the article is allowed to collide with a breaker disc in a jet stream to be pulverized or a process in which the article is pulverized in a narrow gap between a mechanically rotating rotor and a stator.

After completing the step of pulverizing, the pulverized product is classified in a gas stream by action of, for example, centrifugal force to thereby yield toner particles having a set particle diameter such as a volume-average particle diameter of 2 μm to 7 μm. The volume-average particle diameter can be determined using, for example, an instrument COULTER TA-II available from Coulter Electronics, Inc, or the like.

To further improve the fluidity, storage stability, development properties, and transfer properties of the toner, inorganic fine particles such as the aforementioned oxide fine particles, hydrophobic silica fine particles, or the like, may be added to the above-prepared toner. These external additives can be mixed with the toner particles using a regular mixer for powders. The mixer for use herein preferably has a jacket or another unit to control its inner temperature. To change the hysteresis of a load applied to the external additive, the external additive may be added in the course of the step of mixing or sequentially during the step of mixing. Alternatively, the number of revolutions, the speed of tumbling, time period, and temperature of the mixer can be changed to change the hysteresis of the load. It is acceptable that a relatively high load is applied at early stages, and a relatively low load is then applied, or they can be applied in a reverse order.

Examples of mixing systems for use herein are V mixers, rocking mixers, Ledige mixers, nauta mixers, Henshel mixers, and the like. The toner can also be prepared by a polymerization method or a capsulation method. These methods will be schematically described below.

(Polymerization Method 1)

(1) A polymerizable monomer, and where necessary a polymerization initiator, a coloring agent, wax and the like, are granulated in a water-based disperse medium.

(2) The granulated monomer composition particles are classified into an appropriate particle diameter.

(3) The monomer composition particles having a specific particle diameter are polymerized.

(4) The dispersing agent (dispersion medium) is removed by an appropriate treatment, and the resulting polymerization product is subjected to filtration, washing with water, and drying to thereby yield base toner particles.

(Polymerization Method 2)

(1) A low molecular weight resin, a high molecular weight resin, a coloring agent, wax, wax-dispersing agent, and where necessary a charge control agent and the like, are dispersed in an oily disperse medium using a solvent such as ethyl acetate, or the like.

(2) The dispersion is added dropwise to water containing organic fine particles and an elongation agent for emulsification and convergence.

(3) The resulting dispersion is heated, for polymerization and removal of the solvent.

(4) The reaction mixture is aged in water, is washed, collected, dried and thereby yields base toner particles.

(Polyester Elongation)

Materials for an elongated polyester toner will be described.

(Modified Polyesters)

The elongated polyester toner comprises a modified polyester (i) as a binder resin. The term, "modified polyester (i)" for use herein means and includes a polyester resin having another bonding group than ester bonds or comprising a resin component having a different composition combined, for example, through a covalent bond or an ionic bond. More specifically, the modified polyester (i) means and includes a polyester having a modified polyester terminal obtained by introducing a functional group such as isocyanate group that can react with a carboxyl group and/or a hydroxyl group and allowing the resulting substance to react with an active-hydrogen-containing compound.

Examples of the modified polyester (i) are urea-modified polyesters obtained as a result of the reaction between a polyester prepolymer (A) having an isocyanate group and amines (B), and the like. The polyester prepolymer (A) having an isocyanate group can be prepared by, for example, allowing a polyester as a polycondensate between a polyhydric alcohol (PO) and a polycarboxylic acid (PC) and having an active hydrogen group to react with a polyvalent isocyanate compound (polyisocyanate compound; PIC). The active hydrogen group of the polyester includes, for example, hydroxyl groups (alcoholic hydroxyl groups and phenolic hydroxyl groups), amino groups, carboxyl groups, mercapto groups, and the like, of which alcoholic hydroxyl groups are preferred.

Materials and a production method for the urea-modified polyesters are as follows.

The polyhydric alcohol compound (PO) includes dihydric alcohol (DIO) and trihydric or higher alcohol (TOs). As the polyhydric alcohol (PO), a dihydric alcohol (DIO) alone or a mixture of a dihydric alcohol (DIO) and a small amount of a trihydric alcohol (TO) is preferred. Examples of the dihydric alcohols (DIO) include alkylene glycols such as ethylene glycol, 1,2-propylene glycol, 1,3-propylene glycol, 1,4-butanediol, 1,6-hexanediol, or the like; alkylene ether glycols such as diethylene glycol, triethylene glycol, dipropylene glycol, polyethylene glycol, polypropylene glycol, polytetramethylene ether glycol, or the like; alicyclic diols such as 1,4-cyclohexanedimethanol, hydrogenated bisphenol A, or the like; bisphenols such as bisphenol A, bisphenol F, bisphenol S, or the like; alkylene oxide such as ethylene oxide, propylene oxide, butylene oxide, or the like; adducts of the aforementioned alicyclic diols; alkylene oxide such as ethylene oxide, propylene oxide, butylene oxide, or the like; adducts of the aforementioned bisphenols such as ethylene oxide, propylene oxide, butylene oxide, or the like. Among them, alkylene glycols each having 2 to 12 carbon atoms, and alkylene oxide adducts of bisphenols are preferred, of which alkylene oxide adducts of bisphenols alone or in combination with any of alkylene glycols having 2 to 12 carbon atoms are preferred. The trihydric or higher alcohols (TO) include, for example, trihydric or higher aliphatic alcohols such as glycerol, trimethylolethane, trimethylolpropane, pentaerythritol, sorbitol, and the like; trihydric or higher phenols such as trisphenol PA, phenol novolacs, resol novolacs, or the like; alkylene oxide adducts of these trihydric or higher polyphenols, and the like.

The polycarboxylic acid (PC) includes, for example, dicarboxylic acids (DIC) and tri- or higher polycarboxylic acids (TC), and the like. As the polycarboxylic acid (PC), a dicarboxylic acid (DIC) alone or in combination with a small amount of a tri- or higher polycarboxylic acid (TC) is preferred. The dicarboxylic acids (DIC) include, but are not limited to, alkylenedicarboxylic acid such as succinic acid, adipic acid, sebacic acid, and the like; alkenylenedicarboxylic acid such as maleic acid, fumaric acid, or the like; aromatic dicarboxylic acids such as phthalic acid, isophthalic acid, terephthalic acid, naphthalenedicarboxylic acid, or the like. Among them, the preferred are alkenylenedicarboxylic acids each having 4 to 20 carbon atoms and aromatic dicarboxylic acids each having 8 to 20 carbon atoms. The tri- or higher polycarboxylic acids (TC) include, for example, aromatic polycarboxylic acids each having 9 to 20 carbon atoms, such as trimellitic acid, pyromellitic acid, or the like. An acid anhydride or lower alkyl ester such as methyl ester, ethyl ester, propyl ester, or the like, of any of the polycarboxylic acids can be used as the polycarboxylic acid (PC) to react with the polyol (PO).

The ratio of the polyhydric alcohol (PO) to the polycarboxylic acid (PC) in terms of the equivalence ratio [OH]/[COOH] of the hydroxyl groups [OH] to the carboxyl groups [COOH] is generally from 2/1 to 1/1, preferably from 1.5/1 to 1/1, and more preferably from 1.3/1 to 1.02/1.

The polyisocyanate compound (PIC) includes, but is not limited to, aliphatic polyisocyanates such as tetramethylene diisocyanate, hexamethylene diisocyanate, 2,6-diisocyanatomethyl caproate, or the like; alicyclic polyisocyanates such as isophorone diisocyanate, cyclohexylmethane diisocyanate, or the like; aromatic diisocyanates such as tolylene diisocyanate, diphenylmethane diisocyanate, or the like; aromatic-aliphatic diisocyanates such as $\alpha,\alpha,\alpha',\alpha'$-tetramethylxylylene diisocyanate; isocyanurates; blocked products of the polyisocyanates with, for example, phenol derivatives, oximes, caprolactams, or the like; mixtures of these compounds, and the like.

The amount of the polyisocyanate compound (PIC) in terms of the equivalence ratio [NCO]/[OH] of isocyanate groups [NCO] to hydroxyl groups [OH] of the polyester is generally from 5/1 to 1/1, preferably from 4/1 to 1.2/1, and more preferably from 2.5/1 to 1.5/1. If the ratio [NCO]/[OH] is more than 5, image-fixing properties at low temperatures may deteriorate. If the molar ratio of [NCO] is less than 1, the urea content in a urea-modified polyester may decrease and thereby hot offset resistance may deteriorate.

The content of the polyisocyanate compound (PIC) in the polyester prepolymer (A) having an isocyanate group is generally from 0.5% by weight to 40% by weight, preferably from 1% by weight to 30% by weight, and more preferably from 2% by weight to 20% by weight. If the content is less than 0.5% by weight, the hot offset resistance may deteriorate, and satisfactory storage stability at high temperatures and image-fixing properties at low temperatures may not be obtained concurrently. If the content is more than 40% by weight, the image-fixing properties at low temperatures may deteriorate.

The polyester prepolymer (A) generally has, in average, 1 or more, preferably 1.5 to 3, and more preferably 1.8 to 2.5 isocyanate groups per molecule. If the amount of the isocyanate group per molecule is less than 1, the urea-modified polyester may have a low molecular weight and the hot offset resistance may deteriorate.

The amines (B) to react with the polyester prepolymer (A) includes, for example, divalent amines (diamines) (B1), tri- or higher polyamines (B2), amine alcohols (B3), aminomercaptans (B4), amino acids (B5), and amino-blocked products (B6) of the amines (B1) to (B5).

The diamines (B1) include, but are not limited to, aromatic diamines such as phenylenediamine, diethyltoluenediamine, 4,4'-diaminodiphenylmethane, or the like; alicyclic diamines such as 4,4'-diamino-3,3'-dimethyldicyclohexylmethane, diaminocyclohexanes, isophoronediamine, or the like; aliphatic diamines such as ethylenediamine, tetramethylenediamine, hexamethylenediamine, or the like; and the like. The tri- or higher polyamines (B2) include, for example, diethylenetriamine, triethylenetetramine, and the like. The amino alcohols (B3) include, but are not limited to, ethanolamine, hydroxyethylaniline, and the like. The aminomercaptans (B4) include, for example, aminoethyl mercaptan, aminopropyl mercaptan, and the like. The amino acids (B5) include, but are not limited to, aminopropionic acid, aminocaproic acid, and the like. The amino-blocked products (B6) of the amines (B1) to (B5) include ketimine compounds and oxazoline compounds derived from the amines (B1) to (B5); ketones such as acetone, methyl ethyl ketone, methyl isobutyl ketone, and the like. Among these amines (B), preferred are the diamine (B1) alone or in combination with a small amount of the polyamine (B2), and the like.

The content of the amines (B) in terms of the equivalence ratio [NCO]/[NHx] of isocyanate groups [NCO] in the polyester prepolymer (A) to amino groups [NHx] of the amine (B) is generally from 1/2 to 2/1, preferably from 1.5/1 to 1/1.5 and more preferably from 1.2/1 to 1/1.2. If the ratio [NCO]/[NHx] is more than 2/1 or is less than 1/2, the urea-modified polyester may have a low molecular weight, and the hot offset resistance may deteriorate.

The urea-modified polyester for use in the present invention may have a urethane bond in addition to the urea bond. The molar ratio of the urea bond to the urethane bond is generally from 100/0 to 10/90, preferably from 80/20 to 20/80, and more preferably from 60/40 to 30/70. If the molar ratio of the urea bond to the urethane bond is less than 10/90, the hot offset resistance may deteriorate.

The modified polyester (i) for use in the present invention can be prepared, for example, by a one-shot method or a prepolymer method. The weight-average molecular weight of the modified polyester (i) is generally 10000 or more, preferably from 20000 to 10000000, and more preferably from 30000 to 1000000. The peak molecular weight herein is preferably from 1000 to 10000. If the peak molecular weight is less than 1000, the modified polyester is resistant to an elongation reaction, and the resulting toner may have decreased elasticity and thereby have deteriorated hot off-set resistance. If it is more than 10000, the image-fixing properties may deteriorate, and granulation or pulverization procedure in its production may become difficult. The number-average molecular weight of the modified polyester (i) is not specifically limited when an unmodified polyester (ii) mentioned later is used in combination and may be such a number-average molecular weight so as to yield the above-specified weight-average molecular weight. If the modified polyester (i) is used alone, the number-average molecular weight thereof is generally 20000 or less, preferably from 1000 to 10000, and more preferably from 2000 to 8000. If the number-average molecular weight is more than 20000, the image-fixing properties at low temperatures and glossiness upon use in a full-color apparatus may deteriorate.

Where necessary, the molecular weight of the modified polyester (i) can be controlled by using a reaction terminator in the crosslinking and/or elongation reaction between the polyester prepolymer (A) and the amines (B) for the production of the modified polyester (i). Such reaction terminators include, but are not limited to, monoamines such as diethylamine, dibutylamine, butylamine, laurylamine, or the like; blocked products (ketimine compounds) of these monoamines, and the like.

(Unmodified Polyesters)

In the present invention, the modified polyester (i) can be used alone or in combination with an unmodified polyester (ii) as the binder resin component of the toner. The combination use of the modified polyester (i) with the unmodified polyester (ii) may improve the image-fixing properties at low temperature and glossiness upon use in a full-color apparatus and is more preferred than the use of the modified polyester (i) alone. Examples and preferred examples of the unmodified polyester (ii) are polycondensation products of polyol (PO) and polycarboxylic acid (PC) as in the polyester components of the modified polyester (i). The unmodified polyesters (ii) include unmodified polyesters as well as polyesters modified with a urethane bond and other chemical bonds except urea bonds. The modified polyester (i) and the unmodified polyester (ii) are preferably at least partially compatible or miscible with each other for better image-fixing properties at low temperatures and hot offset resistance. Accordingly, the polyester components of the modified polyester (i) and the unmodified polyester (ii) preferably have similar compositions to each other. The weight ratio of the modified polyester (i) to the unmodified polyester (ii), if any, is generally from 5/95 to 80/20, preferably from 5/95 to 30/70, more preferably from 5/95 to 25/75, and still more preferably from 7/93 to 20/80. If the weight ratio is less than 5/95, the hot offset resistance may deteriorate, and satisfactory storage stability at high temperature and image fixing properties at low temperature may not be obtained concurrently.

The peak molecular weight of the unmodified polyester (ii) is generally from 1000 to 10000, preferably from 2000 to 8000, and more preferably from 2000 to 5000. If the peak molecular weight is less than 1000, the storage stability at high temperature may deteriorate. If it is more than 10000, the image-fixing properties at low temperature may deteriorate.

The hydroxyl value of the unmodified polyester (ii) is preferably 5 or more, more preferably from 10 to 120, and still more preferably from 20 to 80. If the hydroxyl value is less than 5, satisfactory storage stability at high temperature and image-fixing properties at low temperature may not be obtained concurrently. The acid value of the unmodified polyester (ii) is generally from 1 to 5, and preferably from 2 to 4. Wax having a high acid value is used as the wax, and therefore a binder resin having a low acid value is preferred as the binder resin for use in a double-component developer, since such a binder resin having a low acid value can yield satisfactory charges and high volume resistance.

The glass transition temperature (Tg) of the binder resin is generally from 35° C. to 70° C., and preferably from 55° C. to 65° C. If the glass transition temperature is lower than 35° C., the storage stability at high temperature of the toner may deteriorate. If it is more than 70° C., the image-fixing properties at low temperature may be insufficient. By using the urea-modified polyester resin, the toner for electrophotography of the present invention, even with a low glass transition temperature, shows more satisfactory storage stability at high temperature than conventional polyester toners.

(Process for Manufacturing Binder resins for the Toner)

The binder resin can be manufactured, for example, by the following process. A polyol (PO) and a polycarboxylic acid (PC) are heated at 150° C. to 280° C. in the presence of a known esterification catalyst such as tetrabutyl titanate, dibutyltin oxide, or the like, and produced water is removed by distillation where necessary under a reduced pressure to thereby yield a polyester having a hydroxyl group. The polyester is allowed to react with a polyisocyanate compound (PIC) at 40° C. to 140° C. and thereby yields a prepolymer (A) having an isocyanate group. The prepolymer (A) is allowed to react with amines (B) at 0° C. to 140° C. and thereby yields a polyester modified with a urea bond.

In the reactions between the polyester and the polyisocyanate (PIC) and between the prepolymer (A) and the amine (B), solvents can be used according to necessity. Such solvents for use herein include, for example, solvents inert to the isocyanate (PIC), including aromatic solvents such as toluene, xylene, or the like; ketones such as acetone, methyl ethyl ketone, methyl isobutyl ketone, or the like; esters such as ethyl acetate, or the like; amides such as dimethylformamide, dimethylacetamide, or the like; ethers such as tetrahydrofuran, or the like; and the like.

When the unmodified polyester (ii) is used in combination with the modified polyester (i), the unmodified polyester (ii) is prepared in the same manner as in the polyester having a hydroxyl group, and the prepared unmodified polyester (ii) is added to and dissolved in a solution of the modified polyester (i) after completing the reaction.

(Process for Manufacturing Toners)

(1) A coloring agent, an unmodified polyester (i), a polyester prepolymer (A) having an isocyanate group, and a release agent are dispersed in an organic solvent and thereby yield a toner material composition.

Such organic solvents for use herein are preferably volatile and have a boiling point of lower than 100° C. for easier removal from toner particles after formation. Such solvents include, but are not limited to, toluene, xylenes, benzene, carbon tetrachloride, methylene chloride, 1,2-dichloroethane, 1,1,2-trichloroethane, trichloroethylenes, chloroform, monochlorobenzene, dichloroethylidene, methyl acetate, ethyl acetate, methyl ethyl ketone, methyl isobutyl ketone, and the like. Each of these solvents can be used alone or in combination. Among them, preferred solvents are halogenated hydrocarbons such as toluene, xylenes, and other aromatic solvents, methylene chloride, 1,2-dichloroethane, chloroform, carbon tetrachloride, or the like. The amount of the organic solvent is generally from 0 part by weight to 300 parts by weight, preferably from 0 part by weight to 100 parts by weight, and more preferably from 25 parts by weight to 70 parts by weight, relative to 100 parts by weight of the polyester prepolymer (A).

(2) The toner material composition is emulsified in a water-based medium in the presence of a surfactant and resin fine particles.

Water-based media for use herein may comprise water alone or in combination with an organic solvent that is miscible with water. Such organic solvents include, but are not limited to, alcohols such as methanol, isopropyl alcohol, ethylene glycol, or the like; dimethylformamide; tetrahydrofuran; Cellosorves such as methyl cellosolve; lower ketones such as acetone, methyl ethyl ketone, or the like; and the like.

The amount of the water-based medium is generally from 50 parts by weight to 2000 parts by weight, and preferably from 100 parts by weight to 1000 parts by weight relative to 100 parts by weight of the toner material composition. If the amount is less than 50 parts by weight, the toner material composition may not be dispersed sufficiently, and the resulting toner particles may not have a predetermined average particle diameter. If it is more than 2000 parts by weight, it is not economical.

Where necessary, a dispersing agent such as surfactants and resin fine particles can be used for better particle size distribution and more stable dispersion in the water-based medium.

Such surfactants include, but are not limited to, anionic surfactants such as alkylbenzene sulfonates, α-olefin sulfonates, phosphoric esters, or the like; amine salts cationic surfactants such as alkylamine salts, amino alcohol fatty acid derivatives, polyamine fatty acid derivatives, imidazoline, or the like; quaternary ammonium salts cationic surfactants such as alkyltrimethylammonium salts, dialkyldimethylammonium salts, alkyldimethylbenzylammonium salts, pyridinium salts, alkylisoquinolinum salts, benzethonium chloride, or the like; nonionic surfactants; alanine such as fatty acid amide derivatives, polyhydric alcohol derivatives, or the like; amphoteric surfactants such as dodecyl di(aminoethyl) glycine, di(octylaminoethyl) glycine, N-alkyl-N,N-dimethylammonium betaines, or the like; and the like.

The effects of the surfactants can be obtained in a small amount by using a surfactant having a fluoroalkyl group. Preferred examples of fluoroalkyl-containing anionic surfactants are fluoroalkylcarboxylic acids each containing 2 to 10 carbon atoms, and metallic salts thereof, disodium perfluorooctanesulfonyl glutamate, sodium 3-[omega-fluoroalkyl $(C_6-C_{11})$ oxy]-1-alkyl $(C_3-C_4)$ sulfonate, sodium 3-[omega-fluoroalkanoyl $(C_6-C_8)$-N-ethylamino]-1-propanesulfonate, fluoroalkyl $(C_{11}-C_{20})$ carboxylic acids and metallic salts thereof, perfluoroalkyl carboxylic acids $(C_7-C_{13})$ and metallic salts thereof, perfluoroalkyl $(C_4-C_{12})$ sulfonic acids and metallic salts thereof, perfluorooctanesulfonic acid diethanolamide, N-propyl-N-(2-hydroxyethyl) perfluorooctanesulfonamide, perfluoroalkyl $(C_6-C_{10})$ sulfonamide propyl trimethyl ammonium salts, perfluoroalkyl $(C_6-C_{10})$-N-ethylsulfonyl glycine salts, monoperfluoroaklyl $(C_6-C_{16})$ ethyl phosphoric esters, and the like.

Such fluoroalkyl-containing anionic surfactants are commercially available under the trade names of, for example, SURFLON S-111, S-112 and S-113 (available from Asahi Glass Co., Ltd.), FLUORAD FC-93, FC-95, FC-98 and FC-129 (available from Sumitomo 3M Limited), UNIDYNE DS-101 and DS-102 (available from Daikin Industries, Ltd.), MEGAFAC F-110, F-120, F-113, F-191, F-812 and F-833 (available from Dainippon Ink & Chemicals, Incorporated), EFTOP EF-102, EF-103, EF-104, EF-105, EF-112, EF-123A, EF-123B, EF-306A, EF-501, EF-201 and EF-204 (from JEMCO Inc.), FTERGENT F-100 and F-150 (from Neos Co., Ltd.), and the like.

Examples of fluoroalkyl-containing cationic surfactants for use in the present invention include aliphatic primary, secondary and tertiary amic acids each having a fluoroalkyl group; aliphatic quaternary ammonium salts such as perfluoroalkyl $(C_6-C_{10})$ sulfonamide propyltrimethylammonium salts; benzalkonium salts; benzethonium chloride; pyridinium salts; imidazolinium salts, and the like. Such fluoroalkyl-containing cationic surfactants are commercially available, for example, under the trade names of SURFLON S-121 (from Asahi Glass Co., LTD.), FLUORAD FC-135 (from Sumitomo 3M Limited), UNIDYNE DS-202 (from Daikin Industries, LTD.), MEGAFAC F-150, and F-824 (from Dainippon Ink & Chemicals, Incorporated), EFTOP EF-132 (from JEMCO Inc.), FTERGENT F-300 (from Neos Co., Ltd.), and the like.

The resin fine particles are used for stabilizing the toner particles formed in the water-based medium. To this end, they are preferably added so as to cover 10% to 90% of the surface of the toner particles. Examples of such resin fine particles include poly(methyl methacrylate) fine particles (1 μm, and 3 μm), polystyrene fine particles (0.5 μm and 2 μm), and poly(styrene-acrylonitrile) fine particles (1 μm). These resin fine particles are commercially available, for example, under the trade names of PB-200H (from Kao Corporation), SGP (from Soken Chemical & Engineering Co., Ltd.), Techpolymer SB (from Sekisui Plastics Co., Ltd.), SGP-3G (from Soken Chemical & Engineering Co., Ltd.), Micro-pearl (from Fine Chemical Division, Sekisui Chemical Co., Ltd.), and the like.

In addition, inorganic compounds such as tricalcium phosphate, calcium carbonate, titanium oxide, colloidal silica, and hydroxyapatite can be also used as the dispersing agent.

For further stabilizing the primary particles in the dispersion, a polymeric protective colloid can be used as a dispersing agent in combination with any of the resin fine particles and inorganic compound dispersing agent. Examples of the polymeric protective colloid include homopolymers and copolymers of acids such as acrylic acid, methacrylic acid, α-cyanoacrylic acid, α-cyanomethacrylic acid, itaconic acid, crotonic acid, fumaric acid, maleic acid, maleic anhydride, or the like; hydroxyl-group-containing (meth)acrylic monomers such as β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylic ester, diethylene glycol monomethacrylic ester, glycerol monoacrylic ester, glycerol monomethacrylic ester, N-methylolacrylamide, N-methylolmethacrylamide, and the like; vinyl alcohol and ethers thereof such as vinyl methyl ether, vinyl ethyl ether, vinyl propyl ether, and the like; esters of vinyl alcohol and a carboxyl-group-containing compound, such as vinyl acetate, vinyl propionate, and vinyl butyrate; acrylamide, methacrylamide, diacetone acrylamide, methylol compounds thereof, or the like; acid chlorides such as acryloyl chloride, methacryloyl chloride, or the like; nitrogen-containing or heterocyclic compounds such as vinylpyridine, vinylpyrrolidone, vinylimidazole, ethyleneimine, and the like; polyoxyethylene compounds such as polyoxyethylene, polyoxypropylene, polyoxyethylene alkyl amines, polyoxypropylene alkyl amines, polyoxyethylene alkyl amides, polyoxypropylene alkyl amides, polyoxyethylene nonyl phenyl ether, polyoxyethylene lauryl phenyl ether, polyoxyethylene stearyl phenyl ester, polyoxyethylene nonyl phenyl ester, and the like; cellulose derivatives such as methyl cellulose, hydroxyethyl cellulose, hydroxypropyl cellulose, and the like.

The dispersing procedure is not specifically limited and includes known procedures such as low-speed shearing, high-speed shearing, dispersing by friction, high-pressure jetting, ultrasonic dispersion, and the like. To allow the dispersed particles to have an average particle diameter of 2 μm to 20 μm, the high-speed shearing procedure is preferred. When a high-speed shearing dispersing machine is used, the number of rotation is not specifically limited and is generally from 1000 rpm to 30000 rpm and preferably from 5000 rpm to 20000 rpm. The dispersion time is not specifically limited and is generally from 0.1 to 5 minutes in a batch system. The dispersing temperature is generally from 0° C. to 150° C. under a pressure (under a load) and preferably from 40° C. to 98° C.

(3) Concurrently with the preparation of the emulsion, the amines (B) are added to the emulsion for the reaction with the polyester prepolymer (A) having an isocyanate group.

This reaction is attended with crosslinking and/or elongation of molecular chains. The reaction time for elongation and/or crosslinking is appropriately set depending on the reactivity derived from the combination of the isocyanate structure of the polyester prepolymer (A) and the amines (B) and is generally from 10 minutes to 40 hours and preferably from 2 hours to 24 hours. The reaction temperature is generally from 0° C. to 150° C. and preferably from 40° C. to 98° C. Where necessary, a known catalyst such as dibutyltin laurate, dioctyltin laurate, or the like, can be used.

(4) After completing the reaction, the organic solvent is removed from the emulsified dispersion (reaction mixture), and the residue is washed, is dried and thereby yields toner particles.

The entire system is gradually raised in temperature while stirring as a laminar flow, is vigorously stirred at set temperature, and the organic solvent is removed to thereby yield fusiform toner particles. When calcium phosphate or another dispersion stabilizer that is soluble in acid or base is used, the dispersion stabilizer is removed from the fine particles by dissolving the dispersion stabilizer by action of an acid such as hydrochloric acid and washing the fine particles. Alternatively, the component can be removed, for example, by enzymatic decomposition.

(5) A charge control agent is implanted into the prepared toner particles, and inorganic fine particles such as silica fine particles and titanium oxide fine particles are externally added to the toner particles and thereby yield a toner for electrophotography.

The charge control agent can be implanted and the inorganic fine particles can be externally added according to a conventional procedure using, for example, a mixer.

Thus, a toner having a small particle diameter and sharp particle size distribution can be easily obtained. By subjecting the material to vigorous stirring in the process of removing the organic solvent, the shape of the toner particles can be controlled within ranges from exact sphere to oval. In addition, the surface of the toner particles can be morphologically controlled within ranges from smooth surface to shriveled surface.

(Capsulation Method)

(1) A resin, and a coloring agent and other necessary components are kneaded, for example, using a kneader to thereby yield a molten toner core.

(2) The toner core is placed in water and is strongly stirred to thereby yield core fine particles.

(3) The core fine particles are placed in a solution of a shell material, is stirred and is treated with a poor solvent added dropwise to cover the surface of the toner core with the shell material to thereby form capsules.

(4) The capsules are filtrated and dried to thereby yield base toner particles.

(Intermediate Transfer)

Intermediate transfers can be used in the present invention. An embodiment of such intermediate transfers in an image transfer system will be described below. FIG. 1 is a schematic view of a copying machine (copier) containing the intermediate transfer according to the first embodiment. The copier includes a photoconductive drum (hereinafter referred to as "photoconductor") 10 serving as a latent electrostatic image-bearing member. Arranged around the photoconductor 10 are a charge roller 20 as a charger, an exposing device 30 as a light-irradiator, a cleaning unit 60 including a cleaning blade, a discharge lamp or discharger 70, a developing device 40 as an image-developer, and an endless transfer belt 50 as an intermediate transfer. The intermediate belt 50 is passed over a plurality of rollers 51 and driven by a motor or similar driving device (not shown) in the direction indicated by an arrow in FIG. 1. One of the rollers 51 serves as a bias roller for applying a bias for image-transfer to the intermediate transfer belt 50. A power supply (not shown) applies a preset voltage for image-transfer to the above roller. A cleaning unit 90 for cleaning the intermediate transfer belt 50 includes a cleaning blade. A transfer roller or a transfer 80 faces the intermediate transfer belt 50 and transfers a toner image from the intermediate transfer 50 to a paper or similar transferring medium 100 serving as a recording medium. A power supply (not shown) applies a bias for image-transfer to the transfer roller 80. A corona charger or charging device 52 is arranged around the intermediate transfer belt 50.

The developing device 40 serving as the image-developer includes a developer bearing member serving as an endless developing belt 41. A black (referred to as Bk) developing unit 45 Bk, a yellows (referred to as Y) developing unit 45Y, a magenta (referred to as M) developing unit 45M and a cyan (referred to as C) developing unit 45C are arranged side by side in the vicinity of the developing belt 41. The developing belt 41 is spanned around a plurality of rollers and driven by a motor or similar driving device (not shown) in the direction indicated by an arrow in FIG. 1. At a position where the developing belt 41 comes in contact with the photoconductor 10, the developing belt 41 moves at substantially the same speed as the photoconductor 10.

The Bk, Y, M and C developing units 45Bk, 45Y, 45M, and 45C are identical in configuration with each other. The following description will concentrate on the Bk developing unit 45Bk by way of an example. The other developing units 45Y, 45M and 45C are simply distinguished from the developing unit 45Bk by suffixes Y, M and C attached to the reference numerals. The Bk developing unit 45Bk includes a developer tank 42Bk storing a viscous, dense developer comprised of toners and carriers. A scoop roller 43Bk has its lower portion immersed in the developer stored in the tank 42Bk. A conductive applicator roller 44Bk applies the developer introduced by the roller 43Bk to the developing belt 41 in the form of a thin layer. A power supply (not shown) applies a set bias to the applying roller 44Bk.

Figure 2:
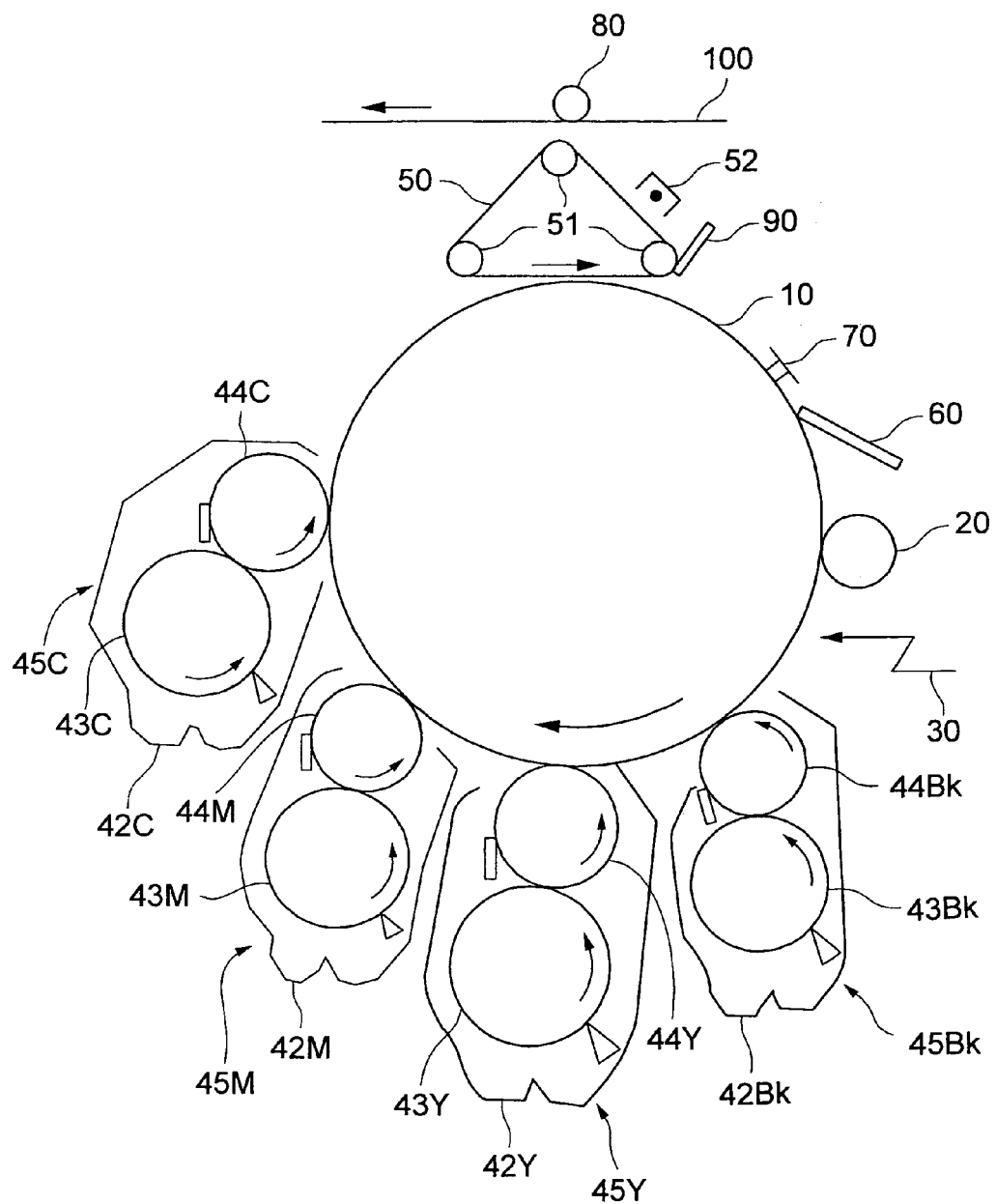
FIG. 2 is a schematic view showing another example of a preferable embodiment in which the toner for electrophotography of the present invention and the developer of the present invention are used.

As for the developing units of the copying machine according to this embodiment, if desired, the developing units 45Bk, 45Y, 45M and 45C may be sequentially arranged around the photoconductor 10, as shown in FIG. 2, in addition to the arrangement of the developing units shown in FIG. 1.

The operation of the copying machine according to this embodiment will be described below. With reference to FIG. 1, the photoconductor 10 is rotated and moved in the direction indicated by the arrow and is uniformly charged by the charge roller 20. The exposing device 30 serving as a light-irradiator focuses a reflected light from an original paper using its optical system (not shown) onto the photoconductor 10 to thereby form a latent electrostatic image on the photoconductor 10. The developing device 40 serving as the image-developer visualizes the latent electrostatic image so as to form a visible toner image as a developed image. The thin layer of the developer on the developing belt 41 is brought into contact with the photoconductor 10 in a development region, is peeled off from the developing belt 41 and moves to a region bearing the image on the photoconductor 10. The toner image developed by the developing device 40 is transferred to the surface of the intermediate transfer belt 50 in an area (primary transfer area) in contact with the intermediate transfer belt 50 which moves at the same speed as the photoconductor 10 in a primary transferring step. To obtain an image of three or four colors, this primary transferring step is repeated on each color to thereby form a color image on the intermediate transfer belt 50.

To apply charges to the toner image sequentially disposed on the intermediate transfer belt 50, the corona charger 52 is arranged downstream in a contact area between the photoconductor 10 and the intermediate transfer belt 50 in a rotation direction of the intermediate transfer belt 50 and upstream in a contact area between the intermediate transfer belt 50 and the transferring medium 100 serving as a recording medium. The corona charger 52 applies a true electric charge to the toner image so as to sufficiently charge the toner image to be transferred to the transfer sheet 100, which true electric charge has the same polarity as that of the charged toners which forms the toner image. The entire portion of the toner image is thus charged by the corona charger 52 and is transferred by action of the transfer bias applied from the transfer roller 80 to the transfer sheet 100 transported in a direction indicated by the arrow from a paper-feeder unit (not shown) in a secondary transferring step. The transfer sheet 100 bearing the transferred toner image is separated from the photoconductor 10 by action of a separation device (not shown), is subjected to image-fixing in an image-fixing device (not shown) and is ejected from the copying machine. Untransferred toners on the photoconductor 10 after the transferring step(s) are recovered and removed by the cleaning device 60, followed by elimination of residual charges by the eliminating lamp 70 to be subjected to another charging step.

As described above, the intermediate transfer has a coefficient of static friction of preferably 0.1 to 0.6, and more preferably 0.3 to 0.5 and has a volume resistivity of several ohm-centimeters to thousand ohm-centimeters. Such a volume resistivity within this range can prevent the intermediate transfer itself from charging and can prevent the charges applied by the charging device serving as the charger from remaining on the intermediate transfer. Thus, irregular or non-uniform transferring in the secondary transferring step can be prevented and the transfer bias in the secondary transferring step can be easily applied.

Materials for the intermediate transfer are not specifically limited and include any known or conventional materials. Examples of the intermediate transfer are as follows. (1) The intermediate transfer may be a single-layer belt comprising a material having a high Young's modulus (modulus of elasticity in tension). Such materials having a high Young's modulus include, for example, polycarbonates (PCs), poly(vinylidene fluoride) (PVDF), poly(alkylene terephthalate) (PAT), blends of a polycarbonate (PC) and a poly(alkylene terephthalate) (PAT), blends of an ethylene-tetrafluoroethylene copolymer (ETFE) and a PC, blends of ETFE and PAT, blends of PC and PAT, thermosetting polyimides containing dispersed carbon black, and the like. The resulting single-layer belt having a high Young's modulus less deforms under the application of a stress in the image-forming process and yields less misregistration particularly in the formation of color images. (2) The intermediate transfer may also be a double- or triple-layer belt comprising the belt having a high Young's modulus as a base layer, and a surface layer or an intermediate layer disposed on the periphery of the base layer. The double- or triple-layer belt can prevent dropouts of line images due to the stiffness or rigidity of a single-layer belt. (3) The intermediate transfer member may also be a belt comprising a rubber and/or an elastomer and having a relatively low Young's modulus. This belt yields substantially no dropout of a line image due to its softness (flexibility). By setting the width of the belt larger than those of the driving roll and suspension roll, the belt can prevent itself from meandering using elasticity of protruded portions of the belt protruded from the rolls and can thereby achieve low cost without the use of ribs or a meandering prevention mechanism.

Intermediate transfer belts comprising any of fluororesins, polycarbonate resins, and polyimide resins have been conventionally used as the intermediate transfer. Recently, elastic belts comprising an elastic member partially or entirely have also been used. Image-transferring of color images using resinous belts have the following problems.

Generally four color toners serve to form a color image. One color image has four toner layers. The toner layers are applied with a pressure to thereby have increased adhesion or cohesion among toner particles while undergoing the primary transferring step (transfer form the photoconductor to the intermediate transfer belt) and the secondary transferring step (transfer from the intermediate transfer belt to the transfer sheet (recording medium)). Such increased adhesion among the toners frequently causes dropouts of characters or edge missing of filled-in images. The resinous belt has high stiffness or rigidity, is resistant to deformation with respect to the toner layers and serves to compress the toner layers, thus inviting aforementioned problems.

In some cases, such a full color image must be formed on various types of paper such as Japanese paper or embossed paper. However, such paper having low smoothness often causes gaps with respect to the toner during transferring steps, thus inviting transfer dropout. If the transfer pressure in the secondary transfer unit is increased to thereby improve adhesion, the toner layers have increased cohesion among the toners, thus inviting dropouts of characters.

In contrast, the elastic belt can deform corresponding to the toner layers and rough paper in the transfer unit. In other words, the elastic belt can deform following to local protrusions and depressions, can achieve good adhesion and can thereby yield satisfactorily transferred images uniformly even on such rough paper, without dropouts of characters.

Materials for the elastic belt include, but are not limited to, resins such as polycarbonates, fluororesins such as ETFE and PVDF, polystyrenes, chloropolystyrens, poly($\alpha$-methylstyrene), styrene-butadiene copolymers, styrene-vinyl chloride copolymers, styrene-vinyl acetate copolymers, styrene-maleic acid copolymers, styrene-acrylate copolymers such as styrene-methyl acrylate copolymers, styrene-ethyl acrylate copolymers, styrene-butyl acrylate copolymers, styrene-octyl acrylate copolymers, and styrene-phenyl acrylate copolymers, styrene-methacrylate copolymers such as styrene-methyl methacrylate copolymers, styrene-ethyl methacrylate copolymers, and styrene-phenyl methacrylate copolymers, styrene-methyl α-chloroacrylate copolymers, styrene-acrylonitrile-acrylate copolymers, other styrenic resins (homopolymers and copolymers containing styrene or a substituted styrene), and the like; methyl methacrylate resins, butyl methacrylate resins, ethyl acrylate resins, butyl acrylate resins, modified acrylic resins such as silicone-modified acrylic resins, vinyl-chloride-modified acrylic resins, and acrylic-urethane resins, vinyl chloride resins, styrene-vinyl acetate copolymers, vinyl chloride-vinyl acetate copolymers, rosin-modified maleic acid resins, phenolic resins, epoxy resins, polyester resins, polyester polyurethane resins, polyethylenes, polypropylenes, polybutadienes, poly(vinylidene chloride), ionomer resins, polyurethane resins, silicone resins, ketone resins, ethylene-ethyl acrylate copolymers, xylene resins, poly(vinyl butyral) resins, polyamide resins, modified polyphenylene oxide resins, and the like. Each of these resins can be used alone or in combination.

The materials for the elastic belt further include elastic rubbers, elastomers and the like. Such elastic rubbers and elastomers include, but are not limited to, butyl rubber, fluorocarbon rubber, acrylic rubber, ethylene-propylene rubber (EPDM), acrylonitrile-butadiene rubber (NBR), acrylonitrile-butadiene-styrene rubber, natural rubber, isoprene rubber, styrene-butadiene rubber, butadiene rubber, ethylene-propylene rubber, ethylene-propylene terpolymers, chloroprene rubber, chlorosulfonated polyethylenes, chlorinated polyethylenes, urethane rubber, syndiotactic 1,2-polybutadiene, epichlorohydrin rubber, silicone rubber, fluorocarbon rubber, polysulfide rubber, polynorbornene rubber, hydrogenated nitrile rubber, thermoplastic elastomers such as polystyrene elastomers, polyolefin elastomers, poly(vinyl chloride) elastomers, polyurethane elastomers, polyamide elastomers, polyurea elastomers, polyester elastomers, fluororesin elastomers, and the like. Each of these substances can be used alone or in combination.

The conducting agents are not specifically limited and include, for example, carbon black, graphite, powders of aluminum, nickel, and other metals, tin oxide, titanium oxide, antimony oxide, indium oxide, potassium titanate, antimony-tin complex oxide (ATO), indium-tin complex oxide (ITO), and other conductive metal oxides. These conductive metal oxides may be covered with insulative fine particles such as barium sulfate, magnesium silicate, calcium carbonate fine particles, or the like.

The surface layer of the intermediate transfer belt and the material thereof must prevent contamination or deposition of the elastic material to the photoconductor and must reduce the surface frictional resistance of the surface. Specifically, they must reduce the deposition of the toner to thereby satisfactorily perform the cleaning and the secondary transferring step. Accordingly, the surface layer may comprise, for example, a material comprising one or more of polyurethanes, polyesters, and epoxy resins and one or more materials for reducing the surface energy and increasing smoothness dispersed in the material. Such materials may be powders and particles of fluororesins, fluorine compounds, carbon fluoride, titanium dioxide, silicon carbide, and the like, and may preferably have varying particle diameters. Alternatively, a fluorine rubber is subjected to heat treatment to thereby form a layer rich in fluorine in the surface of the belt to thereby reduce the surface energy.

Preparation processes of the belt are not specifically limited and include, for example: a centrifugal molding process in which materials are placed in a rotating cylindrical mold to form a belt; a spray coating method in which a liquid coating composition is sprayed to form a film; a dipping method in which a cylindrical mold is dipped in a solution of the material and is taken out; an injection method in which a material composition is injected into an inner mold or an outer mold; and a process in which a compound is placed around a cylindrical mold and is subjected to vulcanization and polishing. Two or more of these processes or methods are generally employed in combination to form the belt. Other processes or methods can also be employed.

To prevent elongation of the elastic belt, a rubber layer may be formed around a core resin layer with less elongation, or a material for preventing the elongation may be incorporated into the core layer. The preparation process thereof is not specifically limited. Materials for the core layer for preventing elongation include, but are not limited to, natural fibers such as cotton, silk, or the like; synthetic fibers such as polyester fibers, nylon fibers, acrylic fibers, polyolefin fibers, poly(vinyl alcohol) fibers, poly(vinyl chloride) fibers, poly(vinylidene chloride) fibers, polyurethane fibers, polyacetal fibers, polyfluoroethylene fibers, phenol fibers, or the like; carbon fibers, glass fibers, boron fibers, and other inorganic fibers; iron fibers, copper fibers, and other metallic fibers. Woven or knitted fabrics, threads and yarns formed from one or more of such materials can be used.

The threads or yarns can be single twist yarns, plied yarns, two ply yarns, and other strands of one or plural filaments twisted by any twisting procedure. The yarns can also be blends of plural fibers selected from the materials. The yarns can be subjected to an appropriate conducting treatment before use.

The woven or knitted fabrics can be looped fabrics and any other woven or knitted fabrics. They can be union fabrics and can be subjected to a conducting treatment before use. Preparation processes for forming the core layer are not specifically limited and include, for example, a process in which a cylindrically woven fabric is placed around a mold, and a coating layer is formed on the woven fabric; a process in which a cylindrically woven fabric is dipped in a liquid rubber to thereby form a coating layer on one or both sides of the core layer; and a process in which a yarn is spirally placed around a mold at an optional pitch, and a coating layer is formed on the yarn.

The elastic layer may preferably have a relatively small thickness, for example, around 1 mm or less, depending on the hardness of the elastic layer. If the thickness is excessively large, the surface layer may undergo cracking and the resulting images may elongate excessively due to large elongation of the elastic layer.

(Tandem Color Image Forming Apparatus)

Figure 3:
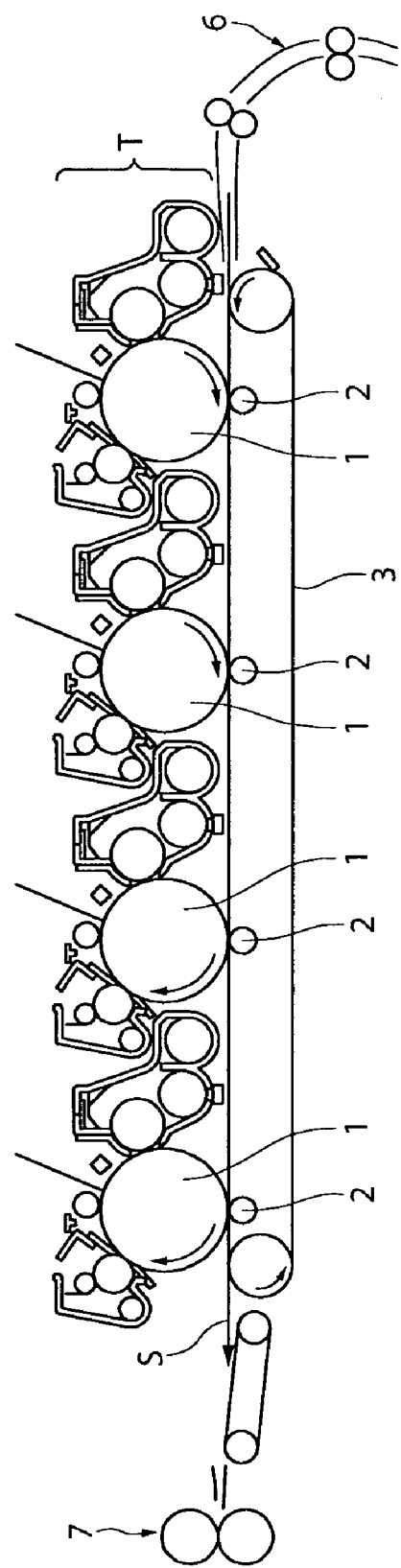
FIG. 3 is a schematic view showing another example of a preferable embodiment in which the toner for electrophotography of the present invention and the developer of the present invention are used.
Figure 4:
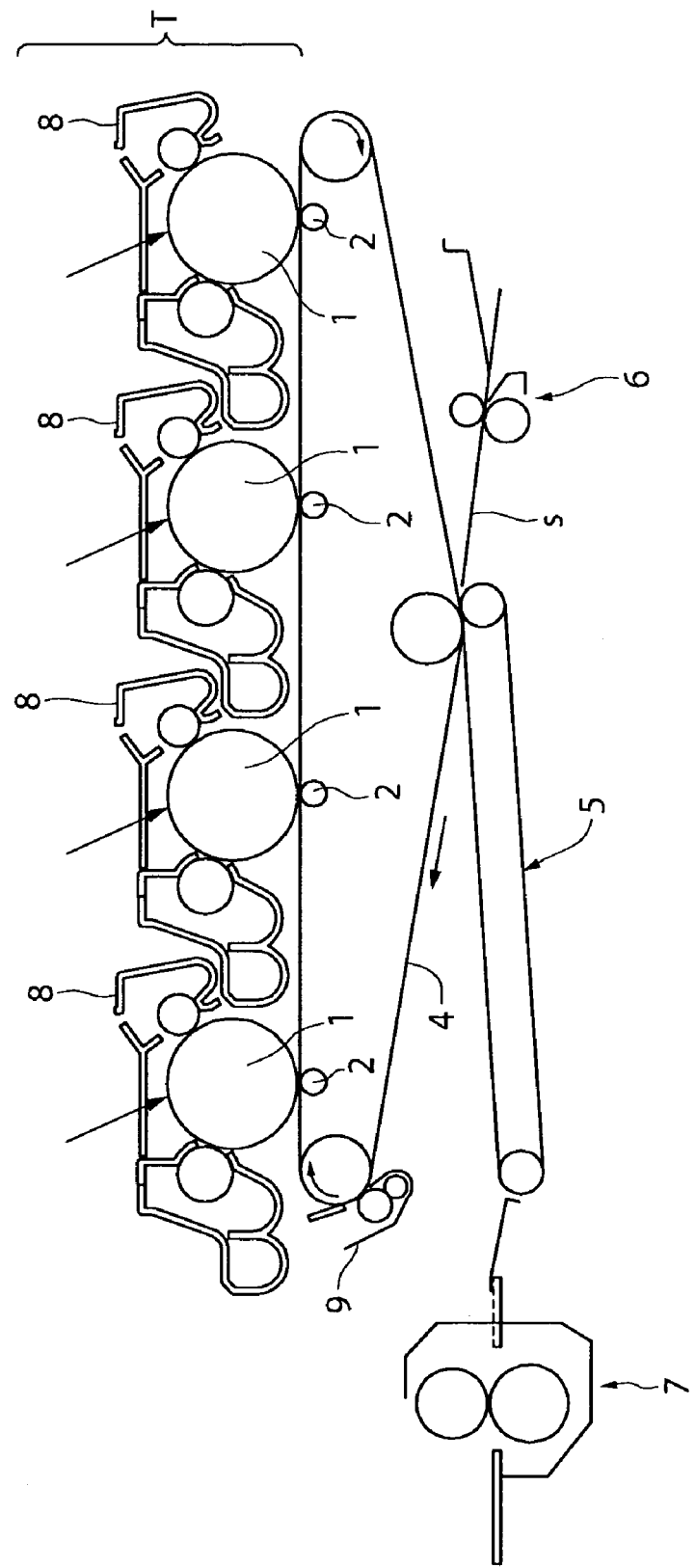
FIG. 4 is a schematic view showing another example of a preferable embodiment in which the toner for electrophotography of the present invention and the developer of the present invention are used.

The present invention can also be applied to a color-image forming apparatus of a tandem system. An embodiment of such a color-image forming apparatus of the tandem system will be described below. Such tandem electrophotographic apparatus are roughly classified as a direct transfer system and an indirect transfer system. In the direct transfer system as shown in FIG. 3, a transfer device 2 serving as a transfer, transfers images on individual photoconductors 1 sequentially to a sheet "s," serving as a recording medium, transported by a sheet conveyer belt 3. In the indirect transfer system as shown in FIG. 4, a primary transfer device 2 sequentially transfers images on individual photoconductors 1 to an intermediate transfer 4, and a secondary transfer device 5 transfers the resulting images on the intermediate transfer 4 to the sheet "s" at once. The transfer device 5 serving as the transfer, may be in the form of a transfer conveyer belt or a roller.

The direct transfer system must comprise a sheet feeder 6 upstream to the sequentially arrayed photoconductors 1 of the tandem image forming apparatus T and an image-fixing device 7 downstream thereof. The system inevitably increases in its size in a sheet conveying direction. In contrast, in the indirect transfer system, the secondary transfer mechanism can be relatively freely arranged, and the sheet feeder 6 and the image-fixing device 7 can be arranged above and/or below the tandem image forming apparatus T. The apparatus of the indirect transfer system can therefore be downsized.

In the direct transfer system, the image-fixing device 7 should be arranged in the vicinity of the tandem image forming apparatus T to prevent upsizing of the apparatus in a sheet conveying direction. The sheet "s" cannot sufficiently bend in such a small space between the image-fixing device 7 and the tandem image forming apparatus T. Accordingly, image formation upstream to the image-fixing device 7 is affected by an impact, specifically in a thick sheet, formed when the tip of the sheet "s" enters the image-fixing device 7 and by the difference between the conveying speed of the sheet when it passes through the image-fixing device 7 and the conveying speed of the sheet by the transfer conveyor belt.

In contrast, in the indirect transfer system, the sheet "s" can sufficiently bend in a space between the image-fixing device 7 and the tandem image forming apparatus T. Thus, the image-fixing device 7 does not significantly affect the image formation.

For these reasons, tandem electrophotographic apparatus of the indirect transfer system have become a focus of attention.

In the color electrophotographic apparatus of this type as shown in FIG. 4, a photoconductor cleaning device 8 removes a residual toners on the photoconductor 1 after transferring and cleans the surface of the photoconductor 1 for another image forming process. In addition, an intermediate transfer cleaning device 9 removes residual toners on the intermediate transfer 4 after the secondary transferring step to thereby clean the surface of the intermediate transfer 4 for another image-forming process.

Some other embodiments of the use of the toners and developers of the present invention will be described below with reference to the attached drawings.

Figure 5:
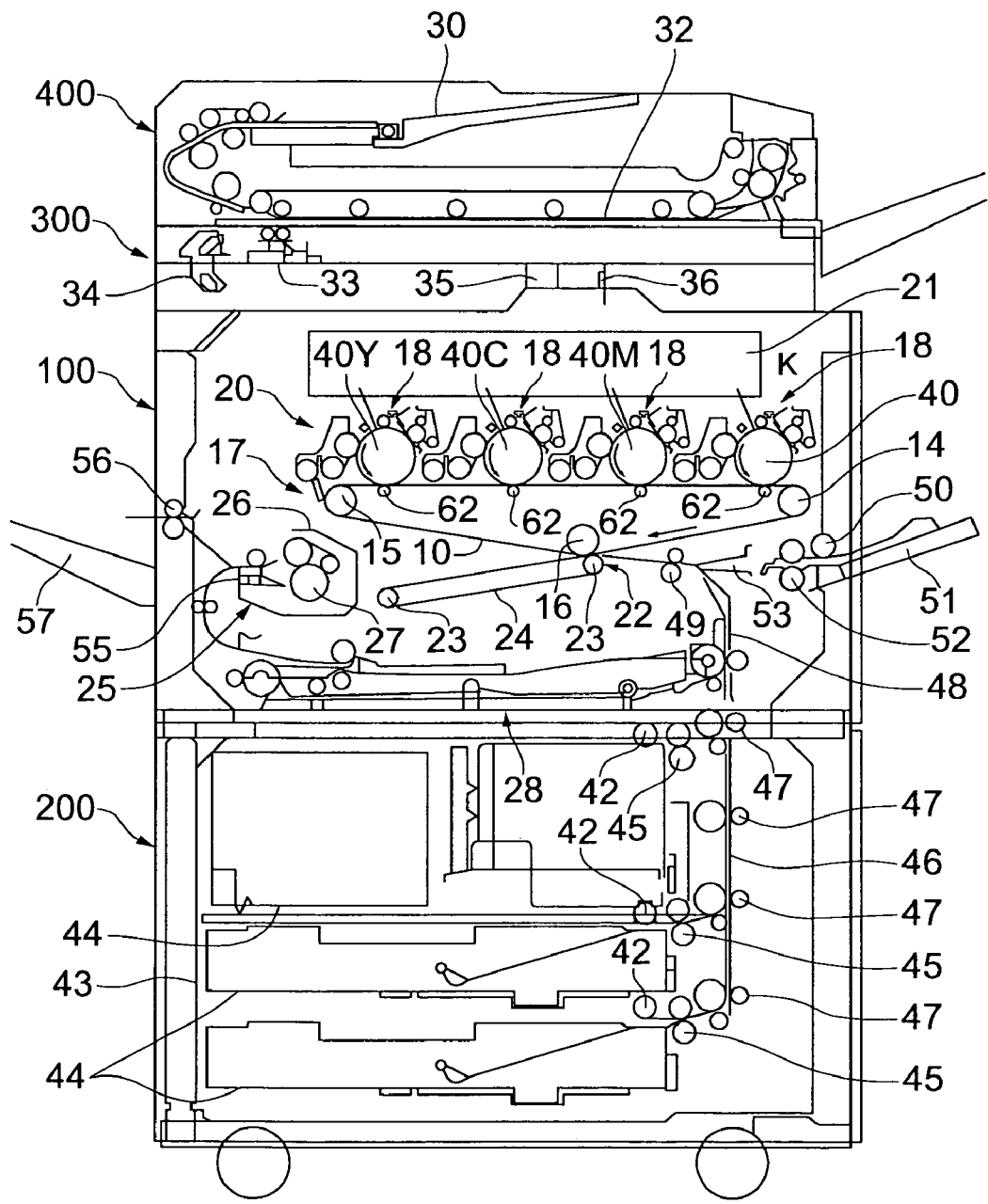
FIG. 5 is a schematic view showing another example of a preferable embodiment in which the toner for electrophotography of the present invention and the developer of the present invention are used.

FIG. 5 is a schematic view showing an example of an electrophotographic apparatus of the tandem indirect image transfer system as an embodiment using the toner and the developer of the present invention. The apparatus includes a copying machine main body 100, a feeder table 200 on which the copying machine main body 100 is placed, a scanner 300 arranged on the copying machine main body 100, and an automatic document feeder (ADF) 400 arranged on the scanner 300. The copying machine main body 100 includes an endless-belt intermediate transfer 10.

The intermediate transfer member 10 shown in FIG. 5 is spanned around three support rollers 14, 15 and 16 and is capable of rotating and moving in a clockwise direction in the figure.

This apparatus includes an intermediate transfer cleaning device 17 on the left side of the second support roller 15. The intermediate transfer cleaning device 17 is capable of removing a residual toner on the intermediate transfer 10 after image-transfer.

Above the intermediate transfer 10 spanned between the first and second support rollers 14 and 15, yellow, cyan, magenta, and black image-forming device 18 are arrayed in parallel in a moving direction of the intermediate transfer 10 to thereby constitute a tandem image forming unit 20.

The apparatus further includes an exposing device 21 serving as an image-developer, above the tandem image forming unit 20 and a secondary transfer 22 below the intermediate transfer 10 as shown in FIG. 5. The secondary transfer 22, shown in FIG. 5 comprises an endless belt serving as a secondary transfer belt 24 spanned around two rollers 23. The secondary transfer belt 24 is pressed on the third support roller 16 with the interposition of the intermediate transfer 10 and is capable of transferring an image on the intermediate transfer 10 to a sheet.

An image-fixing device 25 is arranged on the side of the secondary transfer 22 and is capable of fixing a transferred image on the sheet. The image-fixing device 25 comprises an endless image-fixing belt 26 and a pressure roller 27 pressed on the image-fixing belt 26.

The secondary transfer 22 is also capable of transporting a sheet after image transfer to the image-fixing device 25. Naturally, a transfer roller or a non-contact charger can be used as the secondary transfer 22. In this case, the secondary transfer 22 may not have the capability of transporting the sheet.

The apparatus shown in FIG. 5 also includes a sheet reverser 28 below the secondary transfer 22 and the image-fixing device 25 in parallel with the tandem image forming unit 20. The sheet reverser 28 is capable of reversing the sheet so as to form images on both sides of the sheet.

A copy is made using the color electrophotographic apparatus in the following manner. Initially, a document is placed on a document platen 30 of the automatic document feeder 400. Alternatively, the automatic document feeder 400 is opened, the document is placed on a contact glass 32 of the scanner 300, and the automatic document feeder 400 is closed to press the document.

At the push of a start switch (not shown), the document, if any, placed on the automatic document feeder 400 is transported onto the contact glass 32. When the document is initially placed on the contact glass 32, the scanner 300 is immediately driven to operate a first carriage 33 and a second carriage 34. Light is applied from a light source to the document, and reflected light from the document is further reflected toward the second carriage 34 at the first carriage 33. The reflected light is further reflected by a mirror of the second carriage 34 and passes through an image-forming lens 35 into a read sensor 36 to thereby read the document.

At the push of the start switch (not shown), a drive motor (not shown) rotates and drives one of the support rollers 14, 15 and 16 to thereby allow the residual two support rollers to rotate following the rotation of the one support roller to thereby rotatively convey the intermediate transfer 10. Simultaneously, the individual image forming device 18 rotates their photoconductors 40 to thereby form black, yellow, magenta, and cyan monochrome images on the photoconductors 40, respectively. With the conveying intermediate transfer 10, the monochrome images are sequentially transferred to form a composite color image on the intermediate transfer 10.

Separately at the push of the start switch (not shown), one of feeder rollers 42 of the feeder table 200 is selectively rotated, sheets are ejected from one of multiple feeder cassettes 44 in a paper bank 43 and are separated in a separation roller 45 one by one into a feeder path 46, are transported by a transport roller 47 into a feeder path 48 in the copying machine main body 100 and are bumped against a resist roller 49.

Alternatively, the push of the start switch rotates a feeder roller 50 to eject sheets on a manual bypass tray 51, the sheets are separated one by one on a separation roller 52 into a manual bypass feeder path 53 and are bumped against the resist roller 49.

The resist roller 49 is rotated synchronously with the movement of the composite color image on the intermediate transfer 10 to transport the sheet into between the intermediate transfer 10 and the secondary transfer 22, and the composite color image is transferred onto the sheet by action of the secondary transfer 22 to thereby record a color image.

The sheet bearing the transferred image is transported by the secondary transfer 22 into the image-fixing device 25, is applied with heat and pressure in the image-fixing device 25 to fix the transferred image, changes its direction by action of a switch blade 55, is ejected by an ejecting roller 56 and is stacked on an output tray 57. Alternatively, the sheet changes its direction by action of the switch blade 55 into the sheet reverser 28, turns therein, is transported again to the transfer position, followed by image formation on the back surface of the sheet. The sheet bearing images on both sides thereof is ejected through the ejecting roller 56 onto the output tray 57.

Separately, the intermediate transfer cleaning device 17 removes a residual toner on the intermediate transfer 10 after image transfer for another image forming procedure by the tandem image forming unit 20.

The resist roller 49 is generally grounded, but it is also acceptable to apply a bias thereto for the removal of paper dust of the sheet.

Figure 6:
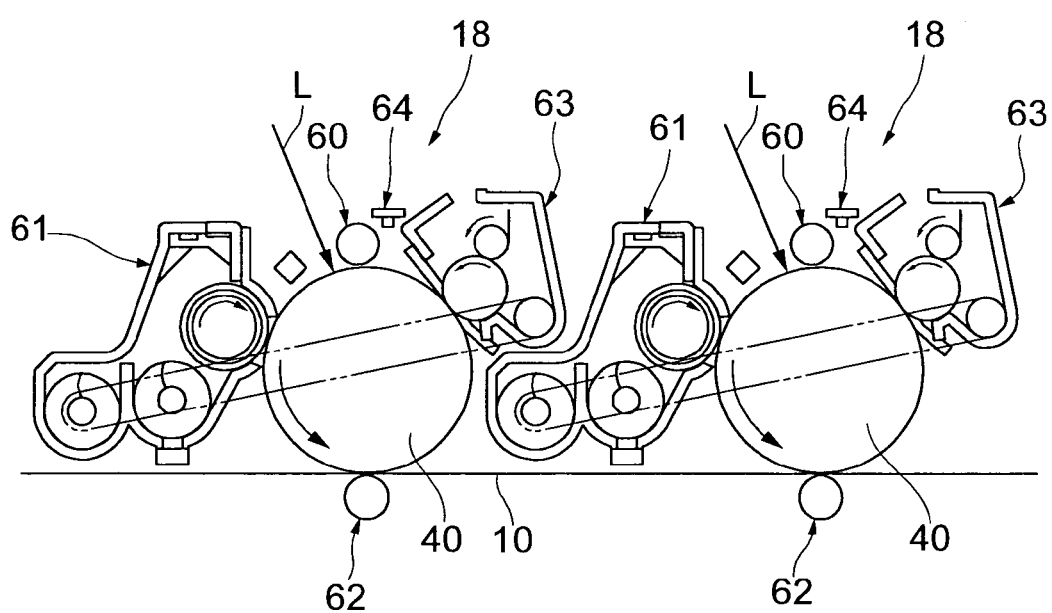
FIG. 6 is a schematic view showing another example of a preferable embodiment in which the toner for electrophotography of the present invention and the developer of the present invention are used.

Each of the image forming devices 18 in the tandem image forming unit 20 comprises the drum-like photoconductor 40 serving as a latent electrostatic image bearing member, as well as a charger 60, a developing device 61 serving as an image-developer, a primary transfer 62, a photoconductor cleaning device 63, a discharger 64, and other components and devices arranged around the photoconductor 40 according to necessity, as shown in FIG. 6.

The present invention will be described in further detail with reference to several examples and comparative examples below, which are not intended to limit the scope of the present invention. All parts and percentages are referred to by weight unless otherwise specified. The test machines, the tested properties of samples and other results are shown in Table 1. The properties of the samples in the following examples were determined in the following manner.

(Test Machines)

One of following Test Machines A, B, C, D, and E was used to determine the properties or qualities of images under test.

Test Machine A

Test Machine A was a modified and tuned to tandem full-color laser printer IPSiO Color 8000 available from Ricoh Company, Ltd., including a four-color non-magnetic double-component developing unit and four-color photoconductors, in which an original image-fixing unit was replaced with an oilless image-fixing unit. Full-color images were printed at a varying printing speed of 20 to 50 A4-sized sheets (210 mm×297 mm) per minute in a high-speed printing mode.

Test Machine B

Test Machine B was a modified and tuned tandem full-color laser printer IPSiO Color 8000 available from Ricoh Company, Ltd., including a four-color non-magnetic double-component developing unit and four-color photoconductors, in which the system was changed to an intermediate transfer system, and an original image-fixing unit was replaced with an oilless image-fixing unit. In the intermediate transfer system, a toner image was primarily transferred to an intermediate transfer, and the resulting toner image was secondly transferred to a transfer sheet. Full-color images were printed at a varying printing speed of 20 to 50 A4-sized sheets per minute in a high-speed printing mode.

Test Machine C

Test Machine C was a modified and tuned full-color laser copier IMAGIO Color 2800 available from Ricoh Company, Ltd in which an original image-fixing unit was replaced with an oilless image-fixing unit. This machine was of a system in which four color developing units develop four color images on one drum-like photoconductor using double-component developers, the four color images are sequentially transferred onto an intermediate transfer member and are then transferred at once to a transferring medium.

Test Machine D

Test Machine D was a modified and tuned full-color laser printer IPSiO Color 5000 available from Ricoh Company Ltd., in which an original image-fixing unit was replaced with an oilless image-fixing unit but the entire machine was tuned as an oil-applied machine. This machine was of a system in which four color development units sequentially develop four color images on one belt photoconductor using non-magnetic single-component developers, the four color images are sequentially transferred onto an intermediate transfer and are then transferred to a transferring medium at once.

Test Machine E

Test Machine E was a tuned tandem full-color laser printer IPSiO Color 8000 available from Ricoh Company, Ltd., including a four-color non-magnetic double-component developing unit and four-color photoconductors, in which an original oil-coated image-fixing unit was used as intact. Full-color images were printed at a varying printing speed of 20 to 50 A4-sized sheets per minute in a high-speed printing mode.

(Tested Properties)

1) Embedding of External Additive

A sample toner was stored t 40° C. and 80% humidity for one week, was then stirred in a development unit for 1 hour, and the surface thereof was observed using a field emission scanning electron microscope (FE-SEM) (a product of Hitachi, Ltd., under the trade name of S-4200). The embedding of the external additive was rated based on the observation as ×, Δ, ○, and ◉ in this order with a decreasing embedding of the external additive according to the following criteria.

×: The external additive was fully embedded and was not observed on the surface.

Δ: The external additive was embedded but little of them was observed on the surface.

○: The external additive was embedded to about a half.

◉: The external additive was not substantially embedded as compared with that before stirring.

2) Scattering of Toners

After outputting 30000 copies of an image chart in a monochrome mode with an image area of 80% as running output, the development unit was opened and the amount of toners scattered from the development part was visually determined and was rated as ×, Δ, ○, and ◉ in this order with a decreasing amount of scattered toners according to the following criteria.

×: The amount was 100 mg or more.

Δ: The amount was 30 mg or more and less than 100 mg.

○: The amount was 5 mg or more and less than 30 mg.

◉: The amount was less than 5 mg.

3) Hollow Defects in Character Images

A total of 30000 copies of an image chart in a monochrome mode with an image area of 50% were output as running output. Four color character images were then output and disposed one on another on an OHP transparency (Type DX, available from Ricoh Company, Ltd.), and the output image was compared with stepwise quality grade samples on a frequency of untransferred toner which invites line images of characters with hollow defects. The hollow defects were rated as ×, Δ, ○, and ⊚ in this order with a decreasing degree of hollow defects according to the following criteria.

×: Apparent hollow defects were observed in the image.
Δ: Little amount of the toners remained in the image.
○: The line image was with substantially no hollow or little hollow defect within acceptable ranges.
⊚: The line image was with completely no hollow defect.

4) Toner Transfer Ratio

After outputting 200000 copies of an image chart in a monochrome mode with an image area of 7% as running output, the transfer ratio was determined by calculation based on the amounts of the supplied toner and wasted toner according to the following equation.

Transfer Ratio (%)=100×[(Supplied toner amount)−(Wasted toner amount)]/(Supplied toner amount)

The toner transfer property was rated based on the toner transfer ratio according to the following criteria.

×: The transfer ratio was less than 60%.
Δ: The transfer ratio was 60% or more and less than 75%.
○: The transfer ratio was 75% or more and less than 90%.
⊚: The transfer ratio was 90% or more.

5) Toner Feedability

An image chart with an image area of 90% and another image chart with an image area of 5% were output alternately every 4000 sheets. The toner feedability in this procedure was rated as ×, Δ, ○, and ⊚ in this order with an increasing feedability according to the following criteria.

×: The feeding of the toner became impossible.
Δ: The toner was fed unstably, and clogging of the fed toner occurred approximately once per five times.
○: The toner could be supplied without any problems but remained little in the bottle.
⊚: The toner could be supplied without any problems and without residual toners.

6) Transfer Dust

After outputting 30000 copies of an image chart in a monochrome mode with an image area of 50% as running output, each four-color solid images 10 mm wide and 10 mm long were sequentially disposed and output on a Type 6000 paper (available from Ricoh Company, Ltd.), and the transfer dust was compared with stepwise quality grade samples and was rated as ×, Δ, ○, and ⊚ in this order with an increasing rating according to the following criteria.

×: The image carried a large amount of transfer dust and was of low quality.
Δ: The image carried some of transfer dust and was of low quality.
○: The image carried little transfer dust but was of acceptable quality equivalent to that of conventional electrophotographic images.
⊚: The image carried no transfer dust without any problems.

7) Thin Line Reproducibility

After outputting 30000 copies of an image chart in a monochrome mode with an image area of 50% as running output, an image of a thin line of 600 dpi was output on a Type 6000 Paper available from Ricoh Company, Ltd. The bleeding of the thin line was determined by a comparison with stepwise quality grade samples and was rated as ×, Δ, ○, and ⊚ in this order with a decreasing bleeding according to the following criteria. This procedure was repeated on four colors on a single paper.

×: The thin line image bled much significantly with very low image quality.
Δ: The thin line image bled with low image quality.
○: The thin line image bled to little extent with acceptable image quality equivalent to that of conventional electrophotographic images.
⊚: The thin line image showed no bleeding without any problems.

8) Toner Deposition on the Background of Images

After outputting 30000 copies of an image chart in a monochrome mode with an image area of 7% as running output, a test machine was stopped in the course of development of a blank image. A developer on the photoconductor after development was transferred onto a tape. The difference in image density (ΔID) between the transferred tape and an untransferred tape was determined using a Model 938 spectrodensitometer available from X-Rite, Inc. The toner deposition on the background of images was rated as ×, Δ, ○, and ⊚ in this order with a decreasing difference in image density (ΔID) according to the following criteria.

×: ΔID was 0.05 or more.
Δ: ΔID was 0.02 or more and less than 0.05.
○: ΔID was 0.01 or more and less than 0.02.
⊚: ΔID was less than 0.01.

9) Image Density

A total of 150000 copies of an image chart in a monochrome mode with an image area of 50% were output as running output, and a solid image was output on a Type 6000 paper available from Ricoh Company, Ltd. The image density of the solid image was determined using an X-Rite spectrodensitometer available from X-Rite, Inc. This procedure was repeated on four colors, respectively, and an average density of four colors was determined. The image density was rated according to the following criteria.

×: The average image density was less than 1.2.
Δ: The average image density was 1.2 or more and less than 1.4.
○: The average image density was 1.4 or more and less than 1.8.
⊚: The average image density was 1.8 or more and less than 2.2.

10) High-temperature Storage Stability

A total of 10 g of each color toner was weighed and was placed in a 20-ml glass vessel, the glass vessel was then tapped hundred times and was left to stand in a thermostat at 55° C. for 24 hours. The depth of needle penetration of the sample toner was determined using a penetrometer, and the high-temperature storage stability of the toner was rated according to the following criteria.

×: The depth of needle penetration was less than 10 mm.
Δ: The depth of needle penetration was 10 mm or more and less than 15 mm.
○: The depth of needle penetration was 15 mm or more and less than 20 mm.
⊚: The depth of needle penetration was 20 mm or more.

11) Transparency

A total of 100000 copies of an image chart in a monochrome mode with an image area of 50% were outputted as running output, and images of each color were fixed on an OHP transparency Type DX available from Ricoh Company, Ltd. at an image density of 1.0 mg/cm$^2$ and at an image-fixing temperature of 140° C. The haze of the fixed image was determined using a Digital Haze Computer Model HGM-2DP available from Suga Test Instruments Co., Ltd., and the transparency was rated as ×, Δ, ○, and ⊚ in this order with a decreasing haze according to the following criteria.

×: The haze was 50 or more.
Δ: The haze was 35 or more and less than 50.
○: The haze was 20 or more and less than 35.
⊚: The haze was less than 20.

12) Chromaticness and Color Reproducibility

After outputting 100000 copies of an image chart in a monochrome mode with an image area of 50% as running output, an image was output on a 6000 Paper available from Ricoh Company, Ltd. The chromaticness and color reproducibility of the image were visually observed and were rated as ×, Δ, ○, and ⊚ in this order with increasing visually observed chromaticness and color reproducibility according to the following criteria.

×: The image carried dull color not acceptable.
Δ: The chromaticness and color reproducibility were somewhat inferior to those of conventional electrophotographic images.
○: The chromaticness and color reproducibility were equivalent to those of conventional electrophotographic images.
⊚: The chromaticness and color reproducibility were equivalent to those of offset printing images.

13) Glossiness

After outputting 100000 copies of an image chart in a monochrome mode with an image area of 50% as running output, an image was output on a 6000 Paper available from Ricoh Company, Ltd. The glossiness of the image was determined using a gloss meter VG-1D available from Nippon Denshoku Industries, Co., Ltd. at a transmission angle of 60 degrees and an acceptance angle of 60 degrees with an S mode in an S-S/10 switch after zero point adjustment and calibration using a standard plate. The glossiness was rated according to the following criteria.

×: The glossiness was less than 3.
Δ: The glossiness was 3 or more and less than 6.
○: The glossiness was 6 or more and less than 15.
⊚: The glossiness was 15 or more.

14) Electrostatic Stability at High Temperature and High Humidity

While outputting 100000 copies of an image chart in a monochrome mode with an image area of 7% at a temperature of 40° C. and a humidity of 90%, a part of a tested developer was sampled every 1000 copies. The amount of charges of the sampled developer was determined according to a blow-off method, and the electrostatic stability was rated as ⊚, ○, Δ, and × in this order with an increasing variation and a decreasing stability in the charge amount according to the following criteria.

×: The variation in the charge amount was 20 μc/g or more.
Δ: The variation in the charge amount was 15 μc/g or more and less than 20 μc/g.
○: The variation in the charge amount was 10 μc/g or more and less than 15 c/g.
⊚: The variation in the charge amount was less than 10 μc/g.

15) Electrostatic Stability at Low Temperatures and Low Humidity

While outputting 100000 copies of an image chart in a monochrome mode with an image area of 7% at a temperature of 10° C. and a humidity of 15%, a part of a tested developer was sampled every 1000 copies. The amount of charges of the sampled developer was determined according to a blow-off method, and the electrostatic stability was rated as ⊚, ○, Δ, and × in this order with an increasing variation and a decreasing stability in the charge amount according to the following criteria.

×: The variation in the charge amount was 20 μc/g or more.
Δ: The variation in the charge amount was 15 μc/g or more and less than 20 μc/g.
○: The variation in the charge amount was 10 μc/g or more and less than 15 μc/g.
⊚: The variation in the charge amount was less than 10 μc/g.

16) Image-fixing Properties

Overall image-fixing properties of a tested toner were determined as ⊚, ○, Δ, and × in this order with decreasing image-fixing properties. A toner with excellent image-fixing properties has an image-fixing temperature with sufficient margin of its lower limit and upper limit within acceptable image-fixing temperature, does not invite hot offset and cold offset and is resistant to transportation problems such as wraparound and paper jamming. In particular, as an essential factor among the image-fixing properties, the lower limit of image-fixing temperature was rated according to the following criteria.

×: The lower limit of image-fixing temperature was 160° C. or higher.
Δ: The lower limit of image-fixing temperature was 145° C. or higher and lower than 160° C.
○: The lower limit of image-fixing temperature was 130° C. or higher and lower than 145° C.
⊚: The lower limit of image-fixing temperature was 100° C. or higher and lower than 130° C.

(Determination on Double-component Developers)

A double-component developer to be tested was prepared by uniformly mixing 5 parts by weight of an each color toner with 100 parts by weight of a carrier in a tumbler mixer, in which its housing was tumbled to mix the contents, and charging the resulting mixture. The carrier used herein was a ferrite carrier having an average particle diameter of 50 μm and being coated with a silicone resin having an average thickness of 0.3 μm prepared in the following manner.

| | Preparation of Carrier | |
|---|---|---|
| Core Material | Cu—Zn ferrite particles (weight-average particle diameter: 35 μm) | 5000 parts |
| Coating Materials | Toluene | 450 parts |
| | Silicone resin SR 2400 (available from Dow Corning Toray Silicone Co., Ltd.; nonvolatile content: 50%) | 450 parts |
| | Aminosilane SH 6020 (available from Dow Corning Toray Silicone Co., Ltd.) | 10 parts |
| | Carbon black | 10 parts |

The coating materials were mixed and dispersed for 10 minutes using a stirrer and thereby yielded a coating composition. The coating composition and the core material were placed in a coating apparatus to thereby coat the core material with the coating composition. The apparatus had a rotary base plate disk and an impeller in a fluidized bed and served to coat while forming a revolving current. The coated article was then fired in an electric oven at 250° C. for 2 hours and thereby yielded the carrier.

EXAMPLE 1

Oxide Fine Particles 1

Methyltrimethoxysilane purified by distillation was heated, followed by bubbling of nitrogen gas into the heated methyltrimethoxysilane. The methyltrimethoxysilane was then introduced into an oxyhydrogen flame burner with flow of nitrogen gas and was burnt and decomposed in the oxyhydrogen flames. The amounts of methyltrimethoxysilane, oxygen gas, hydrogen gas, and nitrogen gas were 1270 g/hr, 2.9

Nm³/hr, 2.1 Nm³/hr, and 0.58 Nm³/hr, respectively. The formed spherical silica fine powder was collected using a bag filter. A total of 1 kg of the spherical silica fine powder was placed in a 5-liter planetary mixer, and 10 g of pure water was added to the spherical silica fine powder with stirring. After sealing the mixer, the mixture was stirred at 55° C. for 14 hours. After cooling to room temperature, the stirred mixture was treated with 20 g of hexamethyldisilazane with stirring. After sealing the mixer, the mixture was stirred for further 24 hours. The reaction mixture was raised in temperature to 115° C., followed by removal of the remained raw materials and formed ammonia under flow of nitrogen gas, and thereby yielded oxide fine particles 1. The primary particle diameter, the standard deviation thereof, circularities SF1 and SF2, and uniformity of elementary composition of the oxide fine particles 1 are shown in Table 2.

Oxide Fine Particles 2

Oxide fine particles 2 were prepared by the procedure of the oxide fine particles 1, except that the amounts of methyltrimethoxysilane, oxygen gas, and hydrogen gas were changed to 880 g/hr, 2.3 Nm³/hr, and 1.8 Nm³/hr, respectively. The primary particle diameter, the standard deviation thereof, circularities, and uniformity of elementary composition of the oxide fine particles 2 are shown in Table 2.

Oxide Fine Particles 3

Oxide fine particles 3 were prepared by the procedure of the oxide fine particles 1, except that the amounts of methyltrimethoxysilane, oxygen gas, and hydrogen gas were changed to 1430 g/hr, 3.1 Nm³/hr, and 2.3 Nm³/hr, respectively. The primary particle diameter, the standard deviation thereof, circularities, and uniformity of elementary composition of the oxide fine particles 3 are shown in Table 2.

Oxide Fine Particles 4

Oxide fine particles 4 were prepared by the procedure of the oxide fine particles 1, except that the amounts of methyltrimethoxysilane, oxygen gas, and hydrogen gas were changed to 1520 g/hr, 3.4 Nm³/hr, and 2.5 Nm³/hr, respectively. The primary particle diameter, the standard deviation thereof, circularities, and uniformity of elementary composition of the oxide fine particles 4 are shown in Table 2.

Oxide Fine Particles 5

Methyltrimethoxysilane purified by distillation was heated, followed by bubbling of nitrogen gas into the heated methyltrimethoxysilane. The methyltrimethoxysilane and titanium (Ti) metal particles were then introduced into an oxyhydrogen flame burner with flow of nitrogen gas and were burnt and decomposed in the oxyhydrogen flames. The amounts of methyltrimethoxysilane, titanium metal particles, oxygen gas, hydrogen gas, and nitrogen gas were 1270 g/hr, 127 g/hr, 2.9 Nm³/hr, 2.1 Nm³/hr, and 0.58 Nm³/hr, respectively. The formed spherical fine Ti-containing silica powder was collected using a bag filter. A total of 1 kg of the spherical silica fine powder was placed in a 5-liter planetary mixer, and 10 g of pure water was added to the spherical silica fine powder with stirring. After sealing the mixer, the mixture was stirred at 55° C. for 14 hours. After cooling to room temperature, the stirred mixture was treated with 20 g of hexamethyldisilazane with stirring. After sealing the mixer, the mixture was stirred for further 24 hours. The reaction mixture was raised in temperature to 115° C., followed by removal of the remained raw materials and formed ammonia under flow of nitrogen gas, and thereby yielded oxide fine particles 5. The primary particle diameter, the standard deviation thereof, circularities SF1 and SF2, and uniformity of elementary composition of the oxide fine particles 5 are shown in Table 2.

Oxide Fine Particles 6

Oxide fine particles 6 were prepared by the procedure of the oxide fine particles 5, except that zinc was used instead of titanium. The primary particle diameter, the standard deviation thereof, circularities SF1 and SF2, and uniformity of elementary composition of the oxide fine particles 6 are shown in Table 2.

Oxide Fine Particles 7

Oxide fine particles 7 were prepared by the procedure of the oxide fine particles 1, except that 100 g of the prepared oxide fine particles was dispersed in 400 g of toluene, and the dispersion was treated with 5 g of dimethylsilicone oil having a viscosity of 300 cs, and toluene was removed by heating and distillation. The primary particle diameter, the standard deviation thereof, circularities SF1 and SF2, and uniformity of elementary composition of the oxide fine particles 7 are shown in Table 2. The liberation degree of the silicone oil in the oxide fine particles was 75%.

Oxide Fine Particles 8

Methyltrimethoxysilane purified by distillation was heated, followed by bubbling of nitrogen gas into the heated methyltrimethoxysilane. The methyltrimethoxysilane was then introduced into an oxyhydrogen flame burner with flow of nitrogen gas and was burnt and decomposed in the oxyhydrogen flames. The amounts of methyltrimethoxysilane, oxygen gas, hydrogen gas, and nitrogen gas were 980 g/hr, 3.3 Nm³/hr, 5.0 Nm³/hr, and 1.23 Nm³/hr, respectively. The formed spherical silica fine powder was collected using a bag filter. A total of 1 kg of the spherical silica fine powder was placed in a 5-liter planetary mixer, and 10 g of pure water was added to the spherical silica fine powder with stirring. After sealing the mixer, the mixture was stirred at 55° C. for 14 hours. After cooling to room temperature, the stirred mixture was treated with 20 g of hexamethyldisilazane with stirring. After sealing the mixer, the mixture was stirred for further 24 hours. The reaction mixture was raised in temperature to 115° C., followed by removal of the remained raw materials and formed ammonia under flow of nitrogen gas, and thereby yielded oxide fine particles 8. The primary particle diameter, the standard deviation thereof, circularities SF1 and SF2, and uniformity of elementary composition of the oxide fine particles 8 are shown in Table 2.

Oxide Fine Particles 9

Silicon tetrachloride was burnt and hydrolyzed in oxyhydrogen flames to yield silica, and the silica was deposited and concurrently melted on a thermally stable carrier and thereby yielded silica fine particles. The silica fine particles were converted into a porous glass material, and the porous glass material was melted to yield oxide fine particles 9. The primary particle diameter, the standard deviation thereof, circularities SF1 and SF2, and uniformity of elementary composition of the oxide fine particles 9 are shown in Table 2.

Oxide Fine Particles 10

An alkoxysilane was hydrolyzed in an alcohol solvent (ethanol) in the presence of an acidic catalyst and thereby yielded a silica sol. The silica sol was converted into gel, was dried, calcined, sintered and thereby yielded oxide fine particles 10. The primary particle diameter, the standard deviation thereof, circularities SF1 and SF2, and uniformity of elementary composition of the oxide fine particles 10 are shown in Table 2.

Oxide Fine Particles 11

Methyltrimethoxysilane purified by distillation was heated, followed by bubbling of nitrogen gas into the heated methyltrimethoxysilane. The methyltrimethoxysilane was then introduced into an oxyhydrogen flame burner with flow of nitrogen gas and was burnt and decomposed in the oxyhydrogen flames. The amounts of methyltrimethoxysilane, oxygen gas, hydrogen gas, and nitrogen gas were 1270 g/hr, 1.1 Nm³/hr, 0.9 Nm³/hr, and 1.2 Nm³/hr, respectively. The formed spherical silica fine powder was collected using a bag filter. A total of 1 kg of the spherical silica fine powder was placed in a 5-liter planetary mixer, and 10 g of pure water was added to the spherical silica fine powder with stirring. After sealing the mixer, the mixture was stirred at 55° C. for 1 hour. After cooling to room temperature, the stirred mixture was treated with 20 g of hexamethyldisilazane with stirring. After sealing the mixer, the mixture was stirred for further 8 hours. The reaction mixture was raised in temperature to 115° C., followed by removal of the remained raw materials and formed ammonia under flow of nitrogen gas, and thereby yielded oxide fine particles 11. The primary particle diameter, the standard deviation thereof, circularities SF1 and SF2, and uniformity of elementary composition of the oxide fine particles 11 are shown in Table 2.

(Polyol Resin 1)

In a separable flask with a stirrer, a thermometer, a nitrogen gas inlet, and a cooling tube (condenser tube) were placed 378.4 g of a low-molecular-weight bisphenol A epoxy resin (number-average molecular weight: about 360), 86.0 g of a high-molecular-weight bisphenol A epoxy resin (number-average molecular weight: about 2700), 191.0 g of a glycidylated adduct of bisphenol A propylene oxide of Formula (1) where n+m is about 2.1, 274.5 g of bisphenol F, 70.1 g of p-cumylphenol, and 200 g of xylene. The resulting mixture was raised in temperature to 70° C. to 100° C. in an atmosphere of nitrogen gas, was further treated with 0.183 g of lithium chloride and was further raised in temperature to 160° C. Water was then added to the mixture under reduced pressure and was bubbled together with xylene to thereby remove water, xylene, other volatile components, and polar-solvent-soluble matters. The residue was allowed to react at 180° C. for 6 to 9 hours and thereby yielded a polyol resin (Polyol Resin 1) having Mn of 3800, a molecular weight distribution Mw/Mn of 3.9, Mp of 5000, a softening point of 109° C., Tg of 58° C., and a weight per epoxy equivalent of 20000 or more. In the polymerization reaction, reaction conditions were controlled so that monomer components did not remain. A polyoxyalkylene moiety in a main chain was identified by NMR.

(Manufacture of Toners)

| Black Toner | |
|---|---|
| Water | 1000 parts |
| Phthalocyanine Green hydrous cake (solid content 30%) | 200 parts |
| Carbon black (MA 60, Mitsubishi Chemical Corp.) | 540 parts |
| Polyol Resin 1 | 1200 parts |

The above raw materials were mixed in a HENSCHEL MIXER and thereby yielded a mixture in which pigment aggregates were impregnated with water. The mixture was kneaded in a twin-roll mill at a roll surface temperature of 130° C. for 45 minutes, was rolled and cooled, was pulverized using a pulverizer and thereby yielded a pigment master batch (Master Batch).

| | |
|---|---|
| Polyol Resin 1 | 100 parts |
| Master Batch | 8 parts |
| Charge Control Agent (BONTRON E-84, Orient Chemical Industries, Ltd.) | 2 parts |
| Wax (fatty acid ester wax, melting point: 83° C., viscosity: 280 mPa · s (90° C.)) | 5 parts |

The above materials were mixed in a mixer, were then melted and kneaded in a two-roll mill three or more times, and the kneaded article was rolled and cooled. The resulting article was pulverized in a pulverizer (I-Type Mill, available from Nippon Pneumatic MFG. Co., Ltd.) of a jet mill breaker disc system, was subjected to air classification by action of a revolving current using a DS classifier (available from Nippon Pneumatic MFG. Co., Ltd.) and thereby yielded black particles having a volume-average particle diameter of 5.5 µm. The black particles were further mixed with 3.0% by weight of the oxide fine particles 1 and 1.0% by weight of a hydrophobic silica (a product of Clariant Japan K.K. under the trade name of HDK H 2000) having a primary particle diameter of 10 nm in a HENSCHEL MIXER, the resulting mixture was allowed to pass through a sieve with an aperture of 50 µm to remove aggregates and thereby yielded a black toner (Black Toner 1). The wax was dispersed in the toner in a diameter of 0.5 µm.

| Yellow Toner 1 | |
|---|---|
| Water | 600 parts |
| Pigment Yellow 17 hydrous cake (solid content 50%) | 1200 parts |
| Polyol Resin 1 | 1200 parts |

The above raw materials were mixed in a HENSCHEL MIXER and thereby yielded a mixture in which pigment aggregates were impregnated with water. The mixture was kneaded in a two-roll mill at a roll surface temperature of 130° C. for 45 minutes, was rolled and cooled, was pulverized in a pulverizer and thereby yielded a pigment master batch (Master Batch).

| | |
|---|---|
| Polyol Resin 1 | 100 parts |
| Master Batch | 8 parts |
| Charge Control Agent (BONTRON E-84, Orient Chemical Industries, Ltd.) | 2 parts |
| Wax (a fatty acid ester wax, melting point: 83° C., viscosity: 280 mPa · s (90° C.)) | 5 parts |

The above materials were mixed in a mixer, were then melted and kneaded in a two-roll mill three or more times, and the kneaded article was rolled and cooled. The resulting article was pulverized in a pulverizer (I-Type Mill, available from Nippon Pneumatic MFG. Co., Ltd.) of a jet mill breaker disc system, was subjected to air classification by action of a revolving current using a DS classifier (available from Nippon Pneumatic MFG. Co., Ltd.) and thereby yielded yellow particles having a volume-average particle diameter of 5.5 µm. The yellow particles were further mixed with 3.0% by weight of the oxide fine particles 1 and 1.0% by weight of a hydrophobic silica (a product of Clariant Japan K.K. under the trade name of HDK H 2000) having a primary particle diameter of 10 nm in a HENSCHEL MIXER, the resulting mixture was allowed to pass through a sieve with an aperture of 50 µm to remove aggregates and thereby yielded a yellow toner (Yellow Toner 1). The wax was dispersed in the toner in a diameter of 0.5 µm.

| Magenta Toner 1 | |
| --- | --- |
| Water | 600 parts |
| Pigment Red 57 hydrous cake (solid content 50%) | 1200 parts |
| Polyol Resin 1 | 1200 parts |

The above raw materials were mixed in a HENSCHEL MIXER and thereby yielded a mixture in which pigment aggregates were impregnated with water. The mixture was kneaded in a two-roll mill at a roll surface temperature of 130° C. for 45 minutes, was rolled and cooled, was pulverized in a pulverizer and thereby yielded a pigment master batch (Master Batch).

| | |
| --- | --- |
| Polyol Resin 1 | 100 parts |
| Master Batch | 8 parts |
| Charge Control Agent (BONTRON E-84, Orient Chemical Industries, Ltd.) | 2 parts |
| Wax (fatty acid ester wax, melting point: 83° C., viscosity: 280 mPa·s (90° C.)) | 5 parts |

The above raw materials were mixed in a mixer, were then melted and kneaded in a two-roll mill three or more times, and the kneaded article was rolled and cooled. The resulting article was pulverized in a pulverizer (I-Type Mill, available from Nippon Pneumatic MFG. Co., Ltd.) of a jet mill breaker disc system, was subjected to air classification by action of a revolving current using a DS classifier (available from Nippon Pneumatic MFG. Co., Ltd.) and thereby yielded magenta particles having a volume-average particle diameter of 5.5 μm. The magenta particles were further mixed with 3.0% by weight of the oxide fine particles 1 and 1.0% by weight of a hydrophobic silica (a product of Clariant Japan K.K. under the trade name of HDK H 2000) having a primary particle diameter of 10 nm in a HENSCHEL MIXER, the resulting mixture was allowed to pass through a sieve with an aperture of 50 μm to remove aggregates and thereby yielded a magenta toner (Magenta Toner 1). The wax was dispersed in the toner in a diameter of 0.5 μm.

| Cyan Toner 1 | |
| --- | --- |
| Water | 600 parts |
| Pigment Blue 15:3 hydrous cake (solid content 50%) | 1200 parts |
| Polyol Resin 1 | 1200 parts |

The above raw materials were mixed in a HENSCHEL MIXER and thereby yielded a mixture in which pigment aggregates were impregnated with water. The mixture was kneaded in a two-roll mill at a roll surface temperature of 130° C. for 45 minutes, was rolled and cooled, was pulverized in a pulverizer and thereby yielded a pigment master batch (Master Batch).

| | |
| --- | --- |
| Polyol Resin 1 | 100 parts |
| Master Batch | 8 parts |
| Charge Control Agent (BONTRON E-84, Orient Chemical Industries, Ltd.) | 2 parts |
| Wax (a fatty acid ester wax, melting point: 83° C., viscosity: 280 mPa·s (90° C.)) | 5 parts |

The above materials were mixed in a mixer, were then melted and kneaded in a two-roll mill three or more times, and the kneaded article was rolled and cooled. The resulting article was pulverized in a pulverizer (I-Type Mill, available from Nippon Pneumatic MFG. Co., Ltd.) of a jet mill breaker disc system, was subjected to air classification by action of a revolving current using a DS classifier (available from Nippon Pneumatic MFG. Co., Ltd.) and thereby yielded cyan particles having a volume-average particle diameter of 5.5 μm. The cyan particles were further mixed with 3.0% by weight of the oxide fine particles 1 and 1.0% by weight of a hydrophobic silica (a product of Clariant Japan K.K. under the trade name of HDK H 2000) having a primary particle diameter of 10 nm in a HENSCHEL MIXER, the resulting mixture was allowed to pass through a sieve with an aperture of 50 μm to remove aggregates and thereby yielded a cyan toner (Cyan Toner 1). The wax was dispersed in the toner in a diameter of 0.5 μm.

EXAMPLES 2 TO 7

Toners and developers were prepared and properties thereof were determined by the procedure of Example 1, except that Oxide Fine Particles 2 to 7 were used instead of Oxide Fine Particles 1, respectively, as shown in Table 2.

EXAMPLE 8

Toners and developers were prepared and properties thereof were determined by the procedure of Example 1, except that the resin was changed to a polyester resin prepared from fumaric acid, polyoxypropylene-(2.2)-2,2-bis(4-hydroxyphenyl)propane, polyoxyethylene-(2.3)-2,2-bis(4-hydroxyphenyl)propane, and trimellitic anhydride. The polyester resin had an acid value of 10, a hydroxyl value of 30, Mn of 5000, Mw/Mn of 10, Mp (peak molecular weight) of 9000, Tg of 61° C., and a softening point of 108° C.

EXAMPLE 9

Toners and developers were prepared and properties thereof were determined by the procedure of Example 1, except that Test Machine B was used as the test machine.

EXAMPLE 10

Toners and developers were prepared and properties thereof were determined by the procedure of Example 1, except that Test Machine C was used as the test machine.

EXAMPLE 11

Toners and developers were prepared and properties thereof were determined by the procedure of Example 1, except that Test Machine D was used as the test machine.

EXAMPLE 12

Toners and developers were prepared and properties thereof were determined by the procedure of Example 1, except that no wax was used in the preparation of toners, and that Test Machine E was used as the test machine.

COMPARATIVE EXAMPLEs 1 TO 4

Toners and developers were prepared and properties thereof were determined by the procedure of Example 1, except that Oxide Fine Particles 8 to 11 were used instead of Oxide Fine Particles 1, respectively, as shown in Table 2.

The external additives used in toners for electrophotography in the above examples comprise oxide fine particles containing at least a silicon element, the oxide fine particles having a primary particle diameter R of from 30 nm to 300 nm and having a standard deviation σ of particle size distribution of R within a range from R/4 to R, having a circularity SF1 of from 100 to 130 and a circularity SF2 of from 100 to 125 and being substantially spherical. Table 1 shows that the resulting toners according to the examples have sufficient fluidity, the external additive is not embedded in the toners and can sufficiently exhibit functions as a fluidizing agent and a charge auxiliary agent, even after the toners are stored at high temperature and high humidity. The toners can suppress irregularly or abnormally increased charges and can thereby yield images with stable quality even after storage at low temperatures and low humidity. In addition, the aggregation of the toner particles after undergoing stress in transfer and compression of the toner and aggregation of the toner particles in a developing device serving as an image-developer, can be appropriately controlled, the toners have excellent image transfer properties, development properties, and image-fixing properties and can form high-quality images.

In addition, the toners can have further improved image transfer properties, can avoid formation of irregular images such as hollow defects of character images and can have improved image transfer ratio to thereby reduce the amount of wasted toner and the amount of consumed toner. The toners can be supplied more satisfactorily to thereby improve uniformity in solid images, to reduce transfer dust and to improve thin line reproducibility. They can have improved electrostatic stability at high temperatures and high humidity or at low temperatures and low humidity to thereby reduce toner deposition on the background of images and to prevent scattering of toners. In addition, the resulting printed matters have excellent high-temperature storage stability, color reproducibility, chromaticness, glossiness, transparency, and image-fixing properties.

TABLE 1

Determined Properties

|  | Test machine | External additive embedding | Toner scattering | Hollow defects | Toner transfer ratio | Toner feedability | Transfer dust | Thin line reproducibility | Toner deposition on the background |
|---|---|---|---|---|---|---|---|---|---|
| Ex.1 | A | ○ | ○ | ○ | ○ | ○ | ○ | ○ | ○ |
| Ex.2 | A | Δ | ○ | ○ | ○ | ○ | ○ | ○ | ○ |
| Ex.3 | A | ◉ | ○ | ○ | ○ | ○ | ○ | ○ | ○ |
| Ex.4 | A | ◉ | ○ | ○ | ○ | ○ | ○ | ○ | ○ |
| Ex.5 | A | ○ | ○ | ○ | ○ | ○ | ○ | ○ | ○ |
| Ex.6 | A | ○ | ○ | ○ | ○ | ○ | ○ | ○ | ○ |
| Ex.7 | A | ○ | ○ | ◉ | ◉ | Δ | ◉ | ◉ | ○ |
| Ex.8 | A | ◉ | ○ | ○ | ◉ | ○ | ○ | ○ | ○ |
| Ex.9 | B | ○ | ○ | ○ | ○ | ○ | Δ | ○ | ○ |
| Ex.10 | C | ○ | Δ | ○ | Δ | ○ | Δ | ○ | ○ |
| Ex.11 | D | ○ | ○ | ○ | ○ | ○ | Δ | ○ | ○ |
| Ex.12 | E | ○ | ○ | ○ | ○ | ◉ | ○ | ○ | ○ |
| Ex.13 | A | Δ | ◉ | ○ | ○ | ○ | ◉ | ○ | ◉ |
| Com. Ex. 1 | A | ◉ | X | X | X | X | X | Δ | X |
| Com. Ex. 2 | A | Δ | X | X | X | ○ | X | Δ | X |
| Com. Ex. 3 | A | X | X | X | ○ | ○ | ○ | X | ○ |
| Com. Ex. 4 | A | ○ | X | X | X | X | X | Δ | X |

|  | Image density | High-temperature storage stability | Transparency | Chromaticness | Color reproducibility | Glossiness | Electrostatic stability at high temperatures and humidity | Electrostatic stability at low temperatures and humidity | Image-fixing properties |
|---|---|---|---|---|---|---|---|---|---|
| Ex. 1 | ◉ | ○ | ○ | ○ | ◉ | ◉ | ○ | ○ | ○ |
| Ex. 2 | ◉ | ○ | ○ | ○ | ◉ | ◉ | ○ | ○ | ○ |
| Ex. 3 | ◉ | ○ | ○ | ○ | ◉ | ◉ | Δ | Δ | ○ |
| Ex. 4 | ◉ | ○ | ○ | ○ | ◉ | ◉ | ○ | ◉ | ○ |
| Ex. 5 | ◉ | ○ | ○ | ○ | ◉ | ◉ | ◉ | ◉ | ○ |
| Ex. 6 | ◉ | Δ | ○ | ○ | ◉ | ◉ | ◉ | ◉ | ○ |
| Ex. 7 | ◉ | Δ | ○ | ○ | ◉ | ◉ | ○ | ○ | ○ |
| Ex. 8 | ◉ | ◉ | ◉ | ◉ | ◉ | ◉ | ○ | ○ | ◉ |
| Ex. 9 | ◉ | ○ | ○ | ○ | ◉ | ◉ | ○ | ○ | ○ |
| Ex. 10 | ◉ | ○ | ○ | ○ | ○ | ◉ | Δ | Δ | ○ |
| Ex. 11 | ◉ | ○ | ○ | ○ | ○ | ◉ | ○ | ○ | ○ |
| Ex. 12 | ◉ | ○ | ○ | ○ | ○ | ◉ | ○ | ○ | ○ |
| Ex. 13 | ○ | ◉ | Δ | ○ | ◉ | ◉ | ○ | ○ | ○ |
| Comp. Ex. 1 | Δ | ○ | Δ | ○ | ○ | Δ | X | X | X |
| Comp. Ex. 2 | Δ | Δ | Δ | ○ | ○ | ○ | X | X | ○ |
| Comp. Ex. 3 | ◉ | ○ | ○ | ○ | ◉ | ◉ | ○ | ○ | ○ |
| Comp. Ex. 4 | X | Δ | Δ | ○ | ○ | ○ | X | X | ○ |

TABLE 2

Preparation Examples of Oxide Fine Particles, and Examples

|  | Oxide fine particles | Primary particle diameter (nm) | Standard deviation of primary particle diameter (nm) | Circularity SF1 | Circularity SF2 | Dispersion of Elements |
|---|---|---|---|---|---|---|
| Ex. 1 and Ex. 13 | Oxide Fine Particles 1 | 110 | 50 | 120 | 109 | uniform |
| Ex. 2 | Oxide Fine Particles 2 | 80 | 70 | 125 | 121 | uniform |
| Ex. 3 | Oxide Fine Particles 3 | 170 | 60 | 128 | 110 | non-uniform |
| Ex. 4 | Oxide Fine Particles 4 | 210 | 70 | 115 | 117 | uniform |
| Ex. 5 | Oxide Fine Particles 5 | 120 | 40 | 118 | 106 | uniform |
| Ex. 6 | Oxide Fine Particles 6 | 150 | 75 | 119 | 110 | uniform |
| Ex. 7 | Oxide Fine Particles 7 | 140 | 50 | 121 | 123 | uniform |
| Comp. Ex. 1 | Oxide Fine Particles 8 | 310 | 150 | 122 | 110 | uniform |
| Comp. Ex. 2 | Oxide Fine Particles 9 | 28 | 10 | 121 | 121 | uniform |
| Comp. Ex. 3 | Oxide Fine Particles 10 | 120 | 11 | 118 | 110 | uniform |
| Comp. Ex. 4 | Oxide Fine Particles 11 | 121 | 65 | 131 | 127 | uniform |

EXAMPLE 13

Toners and developers were prepared and the properties thereof were determined by the procedure of Example 1, except that toner particles before addition of additives were prepared in the following manner.

Preparation of Organic Fine Particle Emulsion

In a reactor equipped with a stirring rod and a thermometer were placed 683 parts of water, 11 parts of a sodium salt of methacrylic acid ethylene oxide adduct sulfuric ester (a product of Sanyo Chemical Industries, Ltd. under the trade name of Eleminol RS-30), 83 parts of styrene, 83 parts of methacrylic acid, 110 parts of butyl acrylate, and 1 part of ammonium persulfate. The mixture was stirred at a rate of 3800 rpm for 30 minutes and thereby yielded a white suspension. The suspension was heated to an inside temperature of the system of 75° C. and was allowed to react for 4 hours. The reaction mixture was further treated with 30 parts of 1% aqueous ammonium persulfate solution, was aged at 75° C. for 6 hours and thereby yielded a water-based dispersion of a vinyl resin (a copolymer of styrene, methacrylic acid, butyl acrylate, and a sodium salt of methacrylic acid ethylene oxide adduct sulfuric ester) [Fine Particle Dispersion 1]. The volume average particle diameter of Fine Particle Dispersion 1 was determined using a laser scattering particle size distribution analyzer LA-920 (trade name, available from Horiba, Ltd.) and was found to be 110 nm. A part of Fine Particle Dispersion 1 was dried to thereby isolate a resin component. The resin component had Tg of 58° C. and a weight average molecular weight of 130000.

(Preparation of Aqueous Phase)

A total of 990 parts of water, 83 parts of Fine Particle Dispersion 1, 37 parts of 48.3% aqueous solution of sodium dodecyl diphenyl ether disulfonate (a product of Sanyo Chemical Industries, Ltd. under the trade name of Eleminol MON-7), and 90 parts of ethyl acetate were mixed by stirring and thereby yielded an opaque white liquid (Aqueous Phase 1).

Synthesis of Low-molecular-weight Polyester

In a reactor equipped with a condenser tube, a stirrer, and a nitrogen inlet tube were placed 724 parts of an adduct of bisphenol A with two moles of ethylene oxide, and 276 parts of terephthalic acid. The mixture was subjected to polycondensation at 230° C. at normal pressure for 7 hours, followed by a reaction at reduced pressure of 10 mmHg to 15 mmHg for further 5 hours, and thereby yielded Low-molecular-weight Polyester 1. Low-molecular-weight Polyester 1 had a number-average molecular weight of 2300, a weight-average molecular weight of 6700, a peak molecular weight of 3800, Tg of 43° C., and an acid value of 4.

Synthesis of Polyester Prepolymer

In a reactor equipped with a condenser tube, a stirrer, and a nitrogen inlet tube were placed 682 parts of an adduct of bisphenol A with two moles of ethylene oxide, 81 parts of an adduct of bisphenol A with two moles of propylene oxide, 283 parts of terephthalic acid, 22 parts of trimellitic anhydride, and 2 parts of dibutyltin oxide. The mixture was subjected to a reaction at 230° C. at normal pressure for 7 hours, followed by a reaction at reduce pressure of 10 mmHg to 15 mmHg for further 5 hours, and thereby yielded Polyester Intermediate 1. Polyester Intermediate 1 had a number-average molecular weight of 2200, a weight-average molecular weight of 9700, a peak molecular weight of 3000, Tg of 54° C., an acid value of 0.5, and a hydroxyl value of 52.

In a reactor equipped with a condenser tube, a stirrer, and a nitrogen inlet tube were placed 410 parts of Polyester Intermediate 1, 89 parts of isophorone diisocyanate, and 500 parts of ethyl acetate. The mixture was allowed to react at 100° C. for 5 hours and thereby yielded Prepolymer 1. Prepolymer 1 had a free isocyanate content of 1.53% by weight.

Synthesis of Ketimine

In a reactor equipped with a stirring rod and a thermometer were placed 170 parts of isophorone diamine and 75 parts of methyl ethyl ketone. The mixture was allowed to react at 50° C. for 4.5 hours and thereby yielded Ketimine Compound 1. Ketimine Compound 1 had an amine value of 417.

Synthesis of Master Batch

To 1200 parts of water were added 540 parts of a carbon black (a product of Degussa AG under the trade name of Printex 35) [DBP oil absorption: 42 ml/100-mg, pH: 9.5] and 1200 parts of a polyester resin. The mixture was blended in a HENSCHEL MIXER (a product of Mitsui Mining Co., Ltd.), was kneaded using a two-roll mill at 130° C. for 1 hour, was rolled and cooled, was pulverized in a pulverizer and thereby yielded Master Batch 1.

Preparation of Oil Phase

In a vessel equipped with a stirring rod and a thermometer were placed 378 parts of Low-molecular-weight Polyester 1, 100 parts of carnauba wax, and 947 parts of ethyl acetate. The mixture was raised in temperature to 80° C. with stirring, was held at 80° C. for 5 hours and was cooled to 30° C. over 1 hour. A total of 500 parts of Master Batch 1 and 500 parts of ethyl acetate were added to the vessel were stirred for 1 hour and thereby yielded Material Solution 1.

A total of 1324 parts of Material Solution 1 was placed into another vessel, and the carbon black and wax therein were dispersed using a bead mill (a product of Aimex Co., Ltd. under the trade name of ULTRA VISCO MILL) at a solution feed rate of 1 kg/hr, a disk peripheral speed of 6 m/sec at three passes, in which the mill was filled with 80% by volume of 0.5-mm zirconia beads. To the resulting substance was added 1324 parts of a 65% ethyl acetate solution of Low-molecular-weight Polyester 1, the mixture was subjected to two passes of the procedure in the bead mill under the aforementioned conditions and thereby yielded Pigment-wax Dispersion 1. Pigment-wax dispersion 1 had a solid concentration of 50%.

(Emulsification to Solvent Removal)

In a vessel were placed 749 parts of Pigment-wax Dispersion 1, 115 parts of Prepolymer 1, and 2.9 parts of Ketimine Compound 1, the mixture was stirred using a TK Homo Mixer (trade name, a product of Tokushu Kika Kogyo Co., Ltd.) at 5000 rpm for 2 minutes. A total of 1200 parts of Aqueous Phase 1 was added to the mixture, the mixture was blended using a TK Homo Mixer at 13000 rpm for 25 minutes and thereby yielded Emulsified Slurry 1.

Emulsified Slurry 1 was placed in a vessel equipped with a stirrer and a thermometer, was subjected to removal of the solvent at 30° C. for 7 hours, was aged at 45° C. for 7 hours and thereby yielded Dispersed Slurry 1.

(From Washing to Drying)

After filtrating 100 parts of Dispersed Slurry 1 under reduced pressure, the filter cake was subjected to the following procedures.

(1) The filter cake was diluted with 100 parts of ion-exchanged water, was mixed in a TK Homo Mixer at 12000 rpm for 10 minutes and was filtrated.
(2) The filter cake obtained in (1) was diluted with 100 parts of 10% aqueous solution of sodium hydroxide, was mixed in a TK Homo Mixer at 12000 rpm for 10 minutes and was filtrated under reduced pressure.
(3) The filter cake obtained in (2) was diluted with 100 parts of 10% hydrochloric acid, was mixed in a TK Homo Mixer at 12000 rpm for 10 minutes and was filtrated.
(4) The filter cake obtained in (3) was diluted with 300 parts of ion-exchanged water, was mixed in a TK Homo Mixer at 12000 rpm for 10 minutes and was filtrated. This procedure was repeated a total of two times and thereby yielded Filter Cake 1.

Filter Cake 1 was dried in a circulating air drier at 45° C. for 48 hours, was sieved though a mesh with an aperture of 75 μm and thereby yielded Toner particles 1. Toner particles 1 were mixed with 3.0% by weight of Oxide Fine Particles 1 and 1.0% by weight of a hydrophobic silica (a product of Clariant Japan K.K. under the trade name of HDK H 2000) having a primary particle diameter of 10 nm in a HENSCHEL MIXER, the mixture was allowed to pass through a sieve with an aperture of 50 μm to remove aggregates and thereby yielded a toner. The determined properties of the toner and physical properties of the oxide fine particles used are shown in Tables 1 and 2, respectively.

What is claimed is:

1. An external additive for a toner for electrophotography, comprising:

oxide fine particles which contain silicon, wherein the oxide fine particles have a primary particle diameter of 50 nm to 170 nm in number average, a standard deviation σ of a particle size distribution of the primary particle diameter satisfies a relation of: $R/4 \leq \sigma \leq R$, in which the R expresses the primary particle diameter, the oxide fine particles are substantially spherical having a circularity SF1 of 100 to 130 and a circularity SF2 of 100 to 125, the circularity SF1 is defined as an equation (1) and the circularity SF2 is defined as an equation (2);

$$SF1=(L^2/A)\times(\pi/4)\times100 \qquad \text{equation (1)}$$

$$SF2=(P^2/A)\times(1/4\pi)\times100 \qquad \text{equation (2)}$$

wherein "L" expresses the absolute maximum length of the oxide fine particles; "A" expresses a projected area of the oxide fine particles; and "P" expresses a maximum perimeter of the oxide fine particles;

further comprising hydrophobed inorganic fine particles having an average particle diameter of primary particles of 1 to 100 nm.

2. The external additive for a toner for electrophotography according to claim 1, wherein the standard deviation σ of the particle size distribution of the primary particle diameter satisfies a relation of: $R/3 \leq \sigma \leq 2R/3$ in which the R expresses the primary particle diameter.

3. The external additive for a toner for electrophotography according to claim 1, wherein the oxide fine particles have the circularity SF1 of 100 to 125 and the circularity SF2 of 100 to 120.

4. The external additive for a toner for electrophotography according to claim 1, wherein the oxide fine particles further comprises a metal element.

5. The external additive for a toner for electrophotography according to claim 4, comprising Si and wherein the metal element is at least one selected from Mg, Ca, Ba, Al, Ti, V, Sr, Zr, Sn, Zn, Ga, Ge, Cr, Mn, Fe, Co, Ni, and Cu.

6. The external additive for a toner for electrophotography according to claim 4, wherein the metal element is a titanium element.

7. The external additive for a toner for electrophotography according to claim 4, wherein the metal element, Si element, and O element of the oxide fine particles are evenly dispersed between a surface part and an inside part of the oxide fine particles.

8. The external additive for a toner for electrophotography according to claim 1, wherein a surface of the oxide fine particles are treated with an organosilicon compound coupling agent.

9. The external additive for a toner for electrophotography according to claim 1, wherein the oxide fine particles are hydrophobic oxide fine particles having a $R^1{}_3SiO_{1/2}$ unit on a surface thereof, in which the $R^1$ is an identical or a different monovalent carbon hydrogen group having 1 to 8 carbon atoms.

10. The external additive for a toner for electrophotography according to claim 1, wherein the oxide fine particles are treated with silicone oil, and a liberation degree of the silicone oil is 10% to 95%.

11. A toner for electrophotography, comprising:

base toner particles which contain a binder resin and a coloring agent; and an external additive, wherein the base toner particles have a volume average particle diameter of 2 μm to 7 μm, the external additive is mixed with the base toner particle, and the external additive comprises:

oxide fine particles which contain silicon, wherein the oxide fine particles have a primary particle diameter of 50 nm to 170 nm in number average, a standard deviation σ of a particle size distribution of the primary particle diameter satisfies a relation of: $R/4 \leq \sigma \leq R$, in which the R expresses the primary particle diameter, the oxide fine particles are substantially spherical having a circularity SF1 of 100 to 130 and a circularity SF2 of 100 to 125, the circularity SF1 is defined as an equation (1) and the circularity SF2 is defined as an equation (2);

$$SF1=(L^2/A)\times(\pi/4)\times100 \qquad \text{equation (1)}$$

$$SF2=(P^2/A)\times(1/4\pi)\times100 \qquad \text{equation (2)}$$

wherein "L" expresses the absolute maximum length of the oxide fine particles; "A" expresses a projected area of the oxide fine particles; and "P" expresses a maximum perimeter of the oxide fine particles;

the external additive further comprising hydrophobed inorganic fine particles having an average particle diameter of primary particles of 1 to 100 nm.

12. The toner for electrophotography according to claim 11, wherein a content of the external additive is 0.01 part by weight to 20 parts by weight, relative to 100 parts by weight of the toner.

13. The toner for electrophotography according to claim 12, wherein a content of the external additive is 0.1 part by weight to 5 parts by weight, relative to 100 parts by weight of the toner.

14. The toner for electrophotography according to claim 11, wherein the binder resin comprises a polyol resin.

15. The toner for electrophotography according to claim 11, wherein the binder resin comprises a polyester resin.

16. A double-component developer comprising:
a toner for electrophotography; and
a carrier, wherein the toner comprises:
base toner particles which contain a binder resin and a coloring agent; and
an external additive, wherein the base toner particles have a volume average particle diameter of 2 μm to 7 μm, the external additive is mixed with the base toner particles, and the external additive comprises:

oxide fine particles which contain silicon, wherein the oxide fine particles have a primary particle diameter of 50 nm to 170 nm in number average, a standard deviation σ of a particle size distribution of the primary particle diameter satisfies a relation of: $R/4 \leqq \sigma \leqq R$, in which the R expresses the primary particle diameter, the oxide fine particles are substantially spherical having a circularity SF1 of 100 to 130 and a circularity SF2 of 100 to 125, the circularity SF1 is defined as an equation (1) and the circularity SF2 is defined as an equation (2);

$$SF1=(L^2/A)\times(\pi/4)\times100 \qquad \text{equation (1)}$$

$$SF2=(P^2/A)\times(1/4\pi)\times100 \qquad \text{equation (2)}$$

wherein "L" expresses the absolute maximum length of the oxide fine particles; "A" expresses a projected area of the oxide fine particles; and "P" expresses a maximum perimeter of the oxide fine particles;

the external additive further comprising hydrophobed inorganic fine particles having an average particle diameter of primary particles of 1 to 100 nm.

* * * * *